United States Patent
Ouchi et al.

(10) Patent No.: US 11,283,537 B2
(45) Date of Patent: Mar. 22, 2022

(54) TERMINAL APPARATUS AND METHOD

(71) Applicant: Sharp Kabushiki Kaisha, Sakai (JP)

(72) Inventors: Wataru Ouchi, Sakai (JP); Tatsushi Aiba, Sakai (JP); Shoichi Suzuki, Sakai (JP); Takashi Hayashi, Sakai (JP); Kazunari Yokomakura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/074,464

(22) PCT Filed: Jan. 23, 2017

(86) PCT No.: PCT/JP2017/002080
§ 371 (c)(1),
(2) Date: Aug. 1, 2018

(87) PCT Pub. No.: WO2017/135077
PCT Pub. Date: Aug. 10, 2017

(65) Prior Publication Data
US 2019/0044639 A1 Feb. 7, 2019

(30) Foreign Application Priority Data
Feb. 2, 2016 (JP) .............................. JP2016-017735

(51) Int. Cl.
*H04W 52/18* (2009.01)
*H04J 11/00* (2006.01)
(Continued)

(52) U.S. Cl.
CPC ........... *H04J 11/0073* (2013.01); *H04J 11/00* (2013.01); *H04J 11/0076* (2013.01);
(Continued)

(58) Field of Classification Search
CPC .... H04J 11/0073; H04J 11/0076; H04J 11/00; H04W 72/14; H04W 72/04; H04W 52/38; H04W 52/18; H04W 52/34
See application file for complete search history.

(56) References Cited

U.S. PATENT DOCUMENTS

| | | | |
|---|---|---|---|
| 9,215,672 B2 | 12/2015 | Seo et al. | |
| 2016/0095137 A1* | 3/2016 | Chen | H04L 25/0224 370/329 |

(Continued)

OTHER PUBLICATIONS

LG Electronics: "Uplink multiple channel transmission under UE transmit power limitation", Mar. 2009, 3GPP Draft; R1-091206 LTEA_UL TXP Limitation, 3rd Generation Partnership Project (3GPP), Mobile Competence Centre).*

(Continued)

*Primary Examiner* — Lakeram Jangbahadur
(74) *Attorney, Agent, or Firm* — Keating & Bennett, LLP

(57) ABSTRACT

In order to perform efficient communications. An apparatus includes a reception unit configured to receive an uplink grant for a certain cell, and a transmission unit configured to perform an uplink transmission, based on reception of the uplink grant, wherein in a first case that (a) a duration from when receiving the uplink grant until when performing the uplink transmission is different between a first cell and a second cell, (b) the duration corresponding to the first cell is a first duration and the duration corresponding to the second cell is a second duration, and (c) an uplink transmission in the first duration collides with an uplink transmission in the second duration, the transmission unit sets a transmit power for the first cell and a transmit power for the second cell, based on values of the first duration and/or the second duration.

3 Claims, 7 Drawing Sheets

(51) Int. Cl.
  *H04W 52/34* (2009.01)
  *H04W 52/38* (2009.01)
  *H04W 72/04* (2009.01)
  *H04W 72/14* (2009.01)
  *H04L 5/00* (2006.01)
  *H04W 52/36* (2009.01)

(52) U.S. Cl.
  CPC ............ *H04L 5/001* (2013.01); *H04W 52/18* (2013.01); *H04W 52/34* (2013.01); *H04W 52/38* (2013.01); *H04W 72/04* (2013.01); *H04W 72/0446* (2013.01); *H04W 72/14* (2013.01); *H04W 52/367* (2013.01)

(56) References Cited

U.S. PATENT DOCUMENTS

| | | | |
|---|---|---|---|
| 2016/0205631 A1* | 7/2016 | Chen | H04W 52/146 455/522 |
| 2016/0309466 A1* | 10/2016 | Chen | H04L 5/0035 |
| 2018/0192418 A1* | 7/2018 | Chen | H04W 72/0413 |
| 2018/0375619 A1* | 12/2018 | Hwang | H04B 7/26 |
| 2019/0223204 A1* | 7/2019 | Kim | H04B 1/00 |

OTHER PUBLICATIONS

Eunsun Kim, Nov. 2015, Method of Multiplexing and Transmission/Reception of Different TTI sized channels, p. 1-25,.*
Chen et al. ( U.S. Appl. No. 62/147,947 ), filed Apr. 2015.*
Ericsson, "5G-Key Component of the Networked Society", 3GPP RAN Workshop on 5G, RWS-150009, Sep. 17-18, 2015, 55 pages.
LG Electronics, "Remaining issues on power control for dual connectivity", 3GPP TSG RAN WG1 Meeting #78bis, R1-144032, Oct. 6-10, 2014, 4 pages.
Texas Instruments, "UL Power Control Considerations for Dual Connectivity", 3GPP TSG RAN WG1 #76bis, R1-141604, Mar. 31-Apr. 4, 2014, pp. 1-3.

* cited by examiner

TERMINAL APPARATUS AND METHOD

TECHNICAL FIELD

Embodiments of the present invention relate to a technique of a terminal apparatus and a method that enable efficient communication.

This application claims priority based on JP 2016-017735 filed on Feb. 2, 2016, the contents of which are incorporated herein by reference.

BACKGROUND ART

The 3rd General Partnership Project (3GPP), which is a standardization project, has standardized the Evolved Universal Terrestrial Radio Access (EUTRA), in which high-speed communication is realized by adopting an Orthogonal Frequency Division Multiplexing (OFDM) communication scheme and flexible scheduling in a unit of prescribed frequency and time called a resource block. The overall communications that have employed the standardized EUTRA technology may be referred to as Long Term Evolution (LTE) communications.

Moreover, the 3GPP discusses the Advanced EUTRA (A-EUTRA), which realizes higher-speed data transmission and has upper compatibility with the EUTRA. The EUTRA relates to a communication system based on a network in which base station apparatuses have substantially an identical cell configuration (cell size); however, regarding the A-EUTRA, discussion is made on a communication system based on a network (heterogeneous wireless network, heterogeneous network) in which base station apparatuses (cells) having different configurations coexist in the same area.

Furthermore, in the 3GPP, a proposal has been made on the 5th generation communication (NPL 1). The 5th generation radio communication technology/5th generation radio access technology may be referred to as NX or NGRAT (Next Generation Radio Access Technology).

CITATION LIST

Non Patent Literature

NPL 1: RWS-150009, Ericsson, 3GPP RAN Workshop on 5G, 17-18 Sep. 2015.

SUMMARY OF INVENTION

Technical Problem

However, in the radio communication system described in PTL 1, a terminal apparatus actually detects interference of radio and then perform change of frequency band in LAA communication according to handover, and thus there is a problem that avoiding radio interference immediately after starting communication is difficult.

In light of the foregoing, an object of the present invention is to provide a terminal apparatus and a method that enable transmit power control or transmission control for efficient communication.

Solution to Problem (1) To accomplish the object described above, the present invention is contrived to provide the following means. Specifically, a terminal apparatus according to an aspect of the present invention includes a reception unit configured to receive an uplink grant for a certain cell, and a transmission unit configured to perform an uplink transmission, based on reception of the uplink grant, wherein in a first case that (a) a duration from when receiving the uplink grant until when performing the uplink transmission is different between a first cell and a second cell, (b) the duration corresponding to the first cell is a first duration and the duration corresponding to the second cell is a second duration, and (c) an uplink transmission in the first duration collides with an uplink transmission in the second duration, the transmission unit sets a transmit power for the first cell and a transmit power for the second cell, based on values of the first duration and/or the second duration.

(2) A terminal apparatus according to an aspect of the present invention includes a reception unit configured to receive an uplink grant for a certain cell, and a transmission unit configured to perform an uplink transmission, based on reception of the uplink grant, wherein in a first case that (a) a duration from when receiving the uplink grant until when performing the uplink transmission is different between a first cell and a second cell, (b) the duration corresponding to the first cell is a first duration and the duration corresponding to the second cell is a second duration, (c) an uplink transmission in the first duration collides with an uplink transmission in the second duration, and (d) the second duration is shorter as compared with the first duration, the transmission unit shifts a timing of the uplink transmission in the first cell.

(3) A method according to an aspect of the present invention includes the steps of receiving an uplink grant for a certain cell, performing an uplink transmission, based on reception of the uplink grant, and in a first case that (a) a duration from when receiving the uplink grant until when performing the uplink transmission is different between a first cell and a second cell, (b) the duration corresponding to the first cell is a first duration and the duration corresponding to the second cell is a second duration, and (c) an uplink transmission in the first duration collides with an uplink transmission in the second duration, setting a transmit power for the first cell and a transmit power for the second cell, based on values of the first duration and/or the second duration.

(4) A method according to an aspect of the present invention includes the steps of receiving an uplink grant for a certain cell, performing an uplink transmission, based on reception of the uplink grant, and in a first case that (a) a duration from when receiving the uplink grant until when performing the uplink transmission is different between a first cell and a second cell, (b) the duration corresponding to the first cell is a first duration and the duration corresponding to the second cell is a second duration, (c) an uplink transmission in the first duration collides with an uplink transmission in the second duration, and (d) the second duration is shorter as compared with the first duration, shifting a timing of the uplink transmission in the first cell.

Advantageous Effects of Invention

The present invention can provide improved transmission efficiency in a radio communication system in which a base station apparatus and a terminal apparatus communicate with each other.

DESCRIPTION OF EMBODIMENTS

First Embodiment

Figure 1:
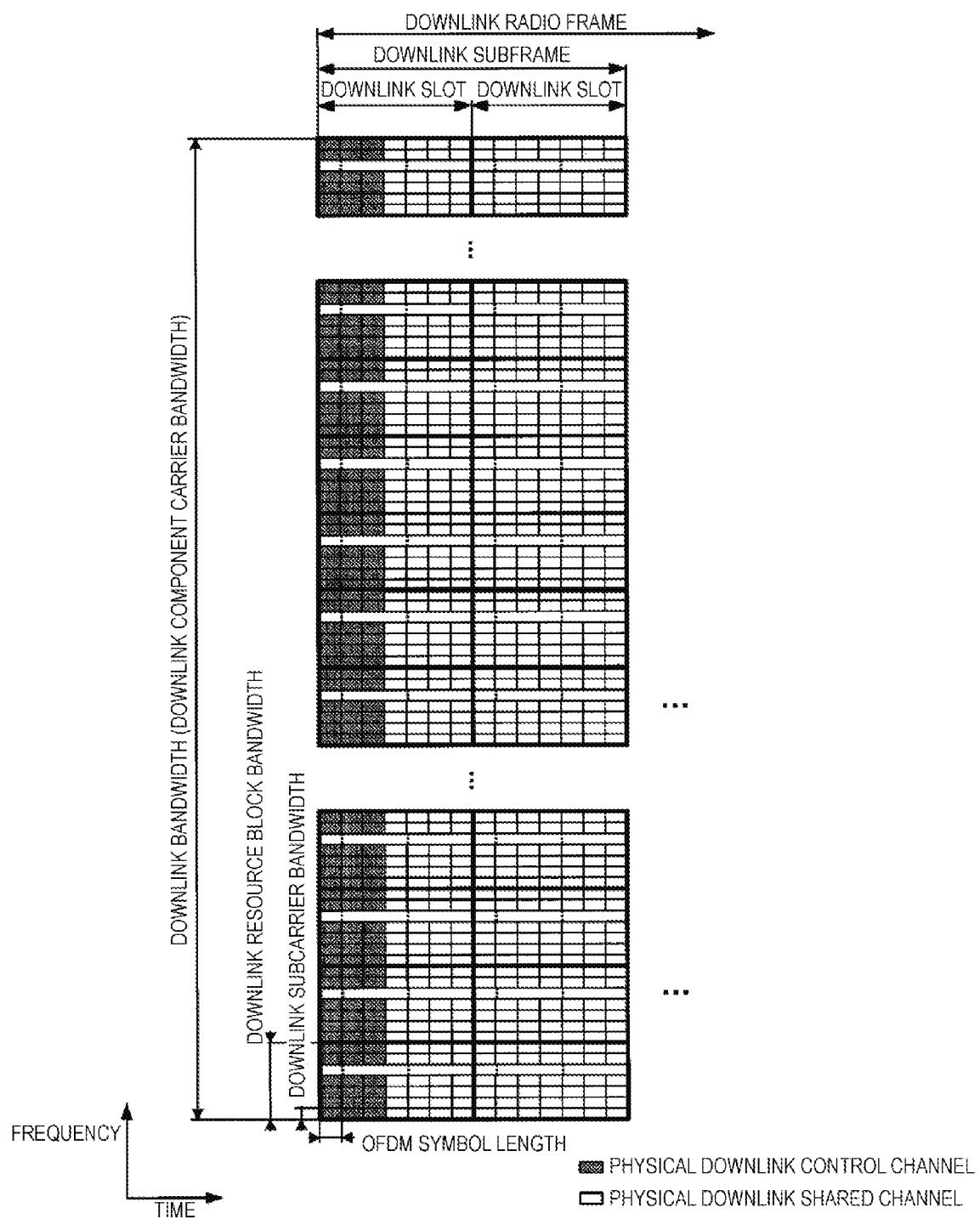
FIG. 1 is a diagram illustrating an example of a downlink radio frame configuration in LTE.

A first embodiment of the present invention will be described below. A description will be given by using a communication system in which a base station apparatus (base station, NodeB, or EUTRAN NodeB (eNB)) and a terminal apparatus (terminal, mobile station, user device, or User equipment (UE)) communicate in a cell.

A physical channel and/or a physical signal may be provided for NX (NGRAT) separately from LTE. Various access schemes and modulation and coding schemes (demodulation and decoding schemes) may be provided for NX separately from LTE. A physical channel and/or physical signal provided for LTE (EUTRA and A-EUTRA) may be used for NX. Various access schemes and modulation and coding schemes (demodulation and decoding schemes) provided for LTE may be used for NX.

NX may not have backward compatibility with LTE. In other words, an NX terminal may not be able to detect various pieces of control information from the physical channel or physical signal for LTE in an NX cell. However, the NX terminal may be able to detect various pieces of control information from the physical channel or physical signal for LTE in an LTE cell. Specifically, in a case that the NX terminal supports a function for LTE, the NX terminal can transmit and receive the physical channel or physical signal for LTE in the LTE cell. The NX terminal may detect control information for NX from the physical channel or physical signal for LTE. Specifically, configuration for the NX cell may be transmitted/received by use of the physical channel or physical signal for LTE.

In a case that there is no backward compatibility between NX and LTE, cross carrier scheduling may not be performed for the NX cell and the LTE cell. Specifically, downlink transmission and uplink transmission for the NX cell may not be indicated in the LTE cell. Moreover, it may be vice versa.

In the case that there is no backward compatibility between NX and LTE, a resource may not be allocated based on the same sequence generation or physical mapping, regarding the physical channel and physical signal which serve in the same way for NX and LTE.

Main physical channel and physical signal used in LTE will be described. The "channel" refers to a medium used to transmit a signal, and the "physical channel" refers to a physical medium used to transmit a signal. In the present embodiment, the physical channel may be used synonymously with the "physical signal". In the future LTE, another physical channel may be added, the constitution or format of the existing physical channel may be changed, or another constitution or format may be added; however, the description of each embodiment of the present invention will not be affected even in a case that such addition or change is performed. In a case that such addition or change is performed in LTE, such addition or change may also be reflected to NX. Moreover, NX and LTE may interact closely with each other. For example, the physical channel/physical signal/higher layer signalling/communication method/identifier/sequence generation method and the like the same as those for LTE may be applied to NX.

In LTE, scheduling of a physical channel or physical signal is managed by using a radio frame. A time length of one radio frame is 10 milliseconds (ms) in length, and one radio frame is constituted of 10 subframes. One subframe is constituted of two slots. To be more specific, a time length of one subframe is 1 ms, and a time length of one slot is 0.5 ms. Moreover, scheduling is managed by using a resource block as a minimum unit of scheduling for allocating a physical channel. The "resource block" is defined by a given frequency domain constituted of a set of multiple subcarriers (e.g., 12 subcarriers) on a frequency axis and a domain constituted of a specific transmission time interval (TTI, slot, symbol). One subframe may be referred to as one resource block pair. In LTE, one TTI may be basically provided as one subframe (1 ms). The TTI may be provided as a reception time interval on a reception side. The TTI may be defined as a unit of transmission or reception of a physical channel or physical signal. Specifically, a time length of a physical channel or physical signal may be provided based on a length of the TTI.

A time unit for LTE, $T_s$, is based on a subcarrier spacing (e.g., 15 kHz) and an FFT size (e.g., 2048). Specifically, $T_s$ is $1/(15000 \times 2048)$ seconds. The time length of one slot is $15360 \cdot T_s$ (i.e., 0.5 ms). The time length of one subframe is $30720 \cdot T_s$ (i.e., 1 ms). A time length of one radio frame is $307200 \cdot T_s$ (i.e., 10 ms).

In NX, one TTI may not necessarily be 1 ms. For example, one TTI may be 0.5 ms in NX. One TTI in NX may be 72 microseconds (us, corresponding to one OFDM symbol when using a Normal Cyclic Prefix (NCP) in LTE). The subcarrier spacing in NX may be wider or narrower than the subcarrier spacing in LTE. One OFDM symbol length in NX may be shorter or longer in accordance with the subcarrier spacing. To be more specific, the symbol length and the TTI length may be provided based on the subcarrier spacing. In NX, a radio frame, a subframe, or a slot may be defined in accordance with a TTI configuration. In NX, a subcarrier spacing may be also defined in accordance with a configuration of the TTI.

A time unit $T_s$ the same as for LTE may be used in NX. Definition of $T_s$ may be different from LTE. $T_s$ may be provided based on the subcarrier spacing and FFT size used for communication in NX. For example, in a case that the subcarrier spacing is 150 kHz and the FFT size is 205, $T_s$ may be $1/(150000 \times 205)$ sec. Specifically, the subcarrier spacing and FFT size used in the NX cell may be configured independent from LTE. However, the subcarrier spacing and the FFT size may be associated with each other. To be more specific, the subcarrier spacing and the FFT size may be provided as one piece of information.

A carrier frequency of an operating band used in NX may be a higher frequency with a wider band than a frequency and a band supported in LTE. The carrier frequency may be a lower frequency with a narrower band depending on a service or an intended use.

In LTE, Carrier Aggregation (CA) is provided in which multiple cells (component carriers corresponding to the cells) are used to perform communication. There are, in the CA, a primary cell (PCell) that is a cell for an initial access or for establishing an RRC connection, and a secondary cell(s) which is added/changed/deleted/activated•deactivated by use of the primary cell.

In LTE, Dual Connectivity (DC) is provided in which multiple cells (component carriers corresponding to the cells) are used to perform communication. In the DC, cells belonging to each of two base station apparatuses (Master eNB (MeNB) and Secondary eNB (SeNB)) are grouped. A cell group belonging to the MeNB and including the primary cell is defined as a Master Cell Group (MCG), and a cell group belonging to the SeNB and including a primary secondary cell (PSCell) is defined as a Secondary Cell Group (SCG). The primary secondary cell is a cell having the same function as the primary cell (a secondary cell, or a serving cell other than the primary cell) in a cell group which does not include the primary cell in a case that multiple cell groups are configured, in other words, the SCG.

The primary cell and the primary secondary cell have a role as the primary cell in each CG. Here, the primary cell may be a cell to which a PUCCH and/or a control channel corresponding to a PUCCH can be transmitted and/or allocated, a cell which is associated with an initial access procedure/RRC connection procedure/initial connection establishment procedure, a cell which can be triggered in association with a random access procedure in L1 signalling, a cell which monitors a radio link, a cell for which the semi-persistent scheduling is supported, a cell which detects/determines an RLF, or a cell which is always activated. In the present embodiment, the cell having the function of the primary cell and/or primary secondary cell may be referred to a special cell in some cases. The primary cell/primary secondary cell/secondary cell may be provided for the NX cell in the same way as in LTE.

In LTE, various Frame structure types are prepared. Next, a Frame structure type related to LTE will be described.

Frame structure type 1 (FS1) is applied to Frequency Division Duplex (FDD). Specifically, the FS1 is applied to a cell operation for which the FDD is supported. The FS1 is applicable to both Full Duplex-FDD (FD-FDD) and Half Duplex-FDD (HD-FDD). In the FDD, 10 subframes can be used for each of downlink transmission and uplink transmission. In the FDD, the downlink transmission and the uplink transmission are separated in the frequency domain. Specifically, the carrier frequencies applied to the downlink transmission and the uplink transmission are different from each other. In an HD-FDD operation, the terminal apparatus cannot perform transmission and reception at the same time, but in an FD-FDD operation, the terminal apparatus can perform transmission and reception at the same time.

Furthermore, the HD-FDD has two types: for a type A HD-FDD operation, a guard period is created by a terminal apparatus by not receiving the last part (last symbol) of a downlink subframe immediately before an uplink subframe from the same terminal device; and for a type B HD-FDD operation, a guard period referred to as an HD guard subframe is created by a terminal apparatus by not receiving a downlink subframe immediately before an uplink subframe from the same terminal apparatus, and by not receiving a downlink subframe immediately after an uplink subframe from the same terminal apparatus. That is, in the HD-FDD operation, a guard period is created by the terminal apparatus controlling a reception process of the downlink subframe. The symbol may include either an OFDM symbol or an SC-FDMA symbol.

Frame structure type 2 (FS2) is applied to Time Division Duplex (TDD). Specifically, the FS2 is applied to a cell operation for which the TDD is supported. Each radio frame is constituted of two half-frames. Each half-frame is constituted of five subframes. An UL-DL configuration in a certain cell may be changed between the radio frames. Subframe control in the uplink or downlink transmission may be made in the latest radio frame. The terminal apparatus can acquire the UL-DL configuration in the latest radio frame via a PDCCH or higher layer signalling. Note that the UL-DL configuration indicates a constitution of an uplink subframe, a downlink subframe, and a special subframe, in TDD. The special subframe includes a Downlink Pilot Time Slot (DwPTS) enabling downlink transmission, a Guard Period (GP), and an Uplink Pilot Time Slot (UpPTS) enabling uplink transmission. The configurations of a DwPTS and a UpPTS in a special subframe are managed in a table, so that the terminal apparatus can acquire the constitution via higher layer signalling. Note that the special subframe serves as a switching point from downlink to uplink. To be more specific, at the switching point as a boundary, the terminal apparatus transits its operation from reception to transmission, and the base station apparatus transits its operation from transmission to reception. The switching point includes a 5 ms cycle and a 10 ms cycle. In a case that the switching point is the 5 ms cycle, the special subframe exits in both half-frames. In a case that the switching point is the 10 ms cycle, the special subframe exits only in a first half-frame.

In the TDD, TDD enhanced Interference Management and Traffic Adaptation (eIMTA) technology is applicable in which a communication volume (traffic amount) or interference in each cell is taken into account. The eITMA is the technology in which in consideration of a downlink and/or uplink communication volume or interference amount, a ratio of the downlink subframe to the uplink subframe occupied within the radio frame (i.e., within 10 subframes) is changed by switching a TDD configuration dynamically (by using L1 level or L1 signalling) to perform the optimum communication.

The Normal Cyclic Prefix (NCP) and an Extended Cyclic Prefix (ECP) are applied to the FS1 and the FS2. The ECP is longer in a CP length than the NCP.

Frame structure type 3 (FS3) is applied to a Licensed Assisted Access (LAA) secondary cell operation. Only the NCP may be applied to the FS3. The 10 subframes included in the radio frame are available for the downlink transmissions. The terminal apparatus does not assume that any signal exists in a certain subframe, and processes the subframe as an empty subframe, unless otherwise specified, or so long as the downlink transmission is not detected in subframes thereof. The downlink transmissions occupy one or multiple consecutive subframes. The consecutive subframes includes the first subframe and the last subframe. The first subframe starts from any symbol or slot in the subframe itself (e.g., an OFDM symbol #0 or #7). In the last subframe, a full subframe (i.e., 14 OFDM symbols) or the OFDM symbols the number of which is indicated based on one of DwPTS durations are occupied. Whether a certain subframe in the consecutive subframes is the last subframe is indicated to the terminal apparatus by a certain field included in a DCI format. This field may indicate the number of OFDM symbols used in the subframe that the field is detected and in the next subframe. In the FS3, the base station apparatus performs a channel access procedure associated with LBT before the downlink transmission.

In the FS3, only the downlink transmission is supported currently, but the uplink transmission may be also supported in the future. At that occasion, the FS3 supporting only the downlink transmission may be provided as FS3-1 or FS3-A, and the FS3 supporting the downlink transmission and the uplink transmission may be provided as FS3-2 or FS3-B.

The terminal apparatus and base station apparatus supporting the FS3 may communicate in a license-free frequency band.

The operating band corresponding to the cell of the LAA or FS3 may be managed together with a table for an EUTRA operating band. For example, an index of the EUTRA operating band may be managed by 1-44, and an index of an operating band corresponding to the LAA (or LAA frequency) may be managed by 46. For example, only a downlink frequency band may be provided by the index 46. Some of the indices may be secured in advance assuming that an uplink frequency band will be reserved or provided in the future. A corresponding duplex mode may be a duplex mode different from the FDD or the TDD, or may be the FDD or the TDD. A frequency enabling an LAA operation is preferably 5 GHz or higher, but may be 5 GHz or lower. In other words, communication in the LAA operation may be performed at a frequency associated as an operating band corresponding to the LAA.

In a case that NX is one of communication means in LTE, a cell of LTE (LTE cell) is used to assist communication (access) of a cell of NX (NX cell), or NX is provided as one of the communication methods or radio access technology types (RAT types) for the secondary cell, NX may be provided as Frame structure type 4 (FS4). In the following description, the NX cell may be referred to as an FS4 cell in some cases.

For the FS4, configurations of the subcarrier spacing/ physical channel/physical signal/radio frame/subframe/slot/ symbol different from those for the FS1 to F3 may be supported. Specifically, a TTI having the same configuration as in the cells of the FS1 to the F3 may be applied to the cell of the FS4. Moreover, a TTI having a configuration different from that in the cells of the FS1 to the F3 may be applied to the cell of the FS4. To be more specific, a unit of transmission and/or reception may be the same or different in the cells of the FS4. A unit of transmission and/or reception in the cell of the FS4 may be configurable by the base station apparatus. A structure of a message of higher layer such as a Radio Resource Control (RRC) message to be applied may be the same as a structure in LTE or an extended or improved structure. A measurement method such as Radio Resource Management (RRM) to be applied may be the same as a method in LTE or an improved method. A part of the processing/procedure to be applied may be the same as processing/procedure in LTE or improved processing/procedure. Specifically, NX may be the same as LTE in a part of the constitution/processing/procedure, and different from LTE in a part of the constitution/processing/procedure.

The FS4 may be classified for each technology supported depending on an intended use or a service (capability information). The FS4 corresponding to enhanced Mobile BroadBand (eMBB) may be provided as FS4-1 or FS4-A. The FS4 corresponding to massive Machine Type Communications (mMTC) may be provided as FS4-2 or FS4-B. The FS4 corresponding to Ultra-Reliable and Low Latency Communications (URLLC) may be provided as FS4-3 or FS4-C.

A CP length corresponding to the subcarrier spacing may be provided in the cell of the FS4. The subcarrier spacing and the CP length may be individually configured in the cell of the FS4.

The LTE cell and the NX cell may be provided as the cells of the different RATs.

A terminal apparatus performing NX communication according to the present invention may be referred to as an NX terminal in order to be distinguished from a terminal apparatus performing only LTE communication. Note that, according to one aspect of the present invention, examples of the terminal apparatus include an NX terminal. The NX terminal may be an LTE terminal specialized/limited to a specific function. The NX terminal may be an LTE terminal having a special function. Here, the LTE terminal of the related art, i.e., an LTE terminal apparatus not supporting a function for NX, is merely referred to as an LTE terminal. Similarly, as for the base station apparatus also, a base station apparatus supporting a function for NX may be referred to as an NX base station, and an LTE base station apparatus not supporting the function for NX may be referred to as an LTE base station.

A frequency enabling the NX communication may be configured as the operating band. The operating band may be associated with a range of the frequency corresponding to the index (uplink frequency and/or downlink frequency) (i.e., frequency band) and the duplex mode. Specifically, these parameters may be managed using a table. The duplex mode may not be necessarily associated with the operation band. To be more specific, the duplex mode applied to the NX cell may be configured for the terminal apparatus by higher layer signalling (system information or RRC message). The operating band may be further associated with an offset value which determines a center frequency (carrier frequency). The terminal apparatus can determine, based on the offset value, which frequency belonging to an index of which band the center frequency is.

The operating band corresponding to the cell of NX or FS4 may be managed together with a table for a EUTRA operating band. For example, an index of the EUTRA operating band may be managed by 1-44, an index of the operating band corresponding to the LAA (or LAA frequency) may be managed by 46, and an index of the operating band corresponding to NX (or NX frequency) may be managed by 47. For example, a downlink frequency band and an uplink frequency band may be provided by the index 47, or the downlink and uplink frequency bands may be provided as the same frequency band. Some of the indices may be secured in advance assuming that the downlink and/or uplink frequency band will be reserved or provided in the future. The corresponding duplex mode may be a duplex mode different from the FDD or the TDD, or may be the FDD or the TDD. For example, the duplex mode for NX may be provided depending on whether the carrier frequency used for the uplink transmission and the downlink transmission is the same or different. A frequency enabling the NX communication may be preferably 5 GHz or higher, but may be 5 GHz or lower. In other words, the NX communication is performed at a frequency associated as the operating band corresponding to NX.

The operating band corresponding to NX may be managed using a table different from the table for the EUTRA operating band. The range of the corresponding frequency (uplink frequency and/or downlink frequency) (i.e., frequency band) and the duplex mode may be also associated, separately from the index of the EUTRA operating band. Furthermore, an offset value for determining a center frequency may be also configured separately from the offset value corresponding to the EUTRA operating band.

In order to achieve the NX communication, the number or functions of processing units (a transmission unit, a reception unit, a control unit, and the like) included in a communication apparatus (a terminal apparatus and/or a base station apparatus, a device, or a module) may be extended as compared with the LTE terminal of the related art. For example, a Radio Frequency (RF) unit, an Intermediate Frequency (IF) unit, and a baseband unit which are used for the transmission unit and the reception unit may be extended for simultaneous transmission and/or reception in multiple bands. A bandwidth (the number of resource blocks, the number of subcarriers (resource elements)) may be extended which is supported by a filter unit, a Single Carrier-Frequency Division Multiple Access (SC-FDMA) signal transmission unit/reception unit, an OFDM signal transmission unit/reception unit, an uplink subframe generation unit, a downlink subframe generation unit, and the like provided in the transmission unit and the reception unit.

In the LTE communication, a communication method (access scheme, modulation/demodulation scheme) is adopted the SC-FDMA for the uplink and for the downlink the OFDMA, and in the NX communication, the communication method may be adopted for each of the uplink and the downlink, a scheme the same as in LTE may be used, or a scheme extended from that in LTE may be used.

The NX terminal may have a more complex structure in the transmission unit (transmission circuit) and the reception unit (reception circuit) than the LTE terminal. For example, the number of RF units (RF circuits) and transmit antennas/receive antennas (antenna ports) may be more than the number in the LTE terminal. Moreover, the NX terminal may support extended functions in comparison with the LTE terminal. In addition, the NX terminal may support the wider bandwidth (transmission bandwidth, reception bandwidth, measurement bandwidth, and channel bandwidth) and/or the wider transmission/reception frequency (carrier frequency) as compared with the LTE terminal. For example, the NX terminal may have an extended function associated with filtering and/or measurement. The NX terminal may be improved in a processing capability as compared with the LTE terminal. Specifically, the NX terminal may be shorter in a processing delay or a processing time than the LTE terminal.

A dynamic TDD and/or FDD may be applied in the FS4. The dynamic TDD is TTD in which the TDD UL/DL configuration or the types of the subframes constituting the radio frame (downlink subframe, special subframe, uplink subframe) and the special subframe configuration (DwPTS length and UpPTS length) are changed in accordance with the L1 signalling level (based on the control information included in the L1 signalling), for example. The DwPTS length is a time domain occupied by the DwPTS (i.e., a time domain used for the downlink transmission) in one subframe (in 1 ms). The UpPTS length is a time domain occupied by the UpPTS (i.e., a time domain used for the uplink transmission) in one subframe.

In the present invention, the time domain may be expressed by the time length or the number of symbols. The frequency domain may be expressed by the bandwidth, the number of subcarriers, the number of resource elements or the number of resource blocks in a frequency direction, and the like.

In the FS4, a TTI size may be changeable based on the type of the subframe, configuration information of higher layer. or the control information included in the L1 signalling.

The FS4 may enable an access without requiring a grant. The access without requiring a grant is an access which does not use the control information (DCI format, downlink grant, uplink grant) indicating the schedule of the PDSCH or PUSCH (downlink or uplink shared channel/data channel). To be more specific, an access scheme not performing dynamic resource allocation or transmission indication by use of the PDCCH (downlink control channel) may be applied in the FS4.

In the FS4, the terminal apparatus may perform Hybrid Automatic Repeat request-Acknowledgement/Negative acknowledgement (HARQ-ACK) and/or Channel State Information (CSI) feedback corresponding to a downlink resource (signal, channel) by use of an uplink resource (signal, channel) mapped to the same subframe, based on the function (performance, capability) of the terminal apparatus and the configuration from the base station apparatus. In this subframe, a reference resource for the CSI with respect to a result of measuring the CSI in a certain subframe may be the CRS or CSI-RS in the same subframe. Such a subframe may be referred to as a self-contained subframe.

The self-contained subframe may be constituted of consecutive one or more subframes. To be more specific, the self-contained subframe may be constituted of multiple subframes, or may be one transmission burst constituted of multiple subframes. The last subframe constituting the self-contained subframe (a later subframe including the last part) is preferably an uplink subframe or a special subframe. Specifically, the uplink signal/channel is preferably transmitted on this last subframe.

In a case that the self-contained subframe is constituted by multiple downlink subframes and one uplink subframe or special subframe, a HARQ-ACK to each of those multiple downlink subframes may be transmitted on that one uplink subframe or an UpPTS in the special subframe.

In the present invention, the subframe represents a unit of transmission and/or unit of reception for the base station apparatus and/or terminal apparatus.

A cell to which the FS4 is applied may be used to provide a mission critical service (e.g., automatic drive control or machine automation and the like).

In the cell to which the FS4 is applied, Radio Resource Management (RRM) measurement and/or Channel State Information (CSI) measurement may be performed in one measurement or one subframe or one burst.

The base station apparatus may determine that the terminal apparatus is an NX device, based on a Logical Channel ID (LCID) for a Common Control Channel (CCCH) and capability information (performance information, functionality information) on the terminal apparatus.

S1 signalling has been extended including terminal radio capability information for paging. When such paging-specific capability information is provided by the base station apparatus to a Mobility Management Entity (MME), the MME may use this information to indicate to the base station apparatus that a paging request from the MME is related to the NX terminal. An identifier may be referred to as an ID (Identity, Identifier).

The capability information of the terminal apparatus (UE radio access capability, UE EUTRA capability) initiates a procedure for the terminal apparatus in a connected mode, when the base station apparatus (EUTRAN) needs the capability information on the terminal apparatus. The base station apparatus inquires for the capability information on the terminal apparatus. The terminal apparatus transmits, in response to the inquiry, the capability information on the terminal apparatus. The base station apparatus determines whether the capability information is supported. In a case that the capability information is supported, the base station apparatus transmits configuration information corresponding to the capability information via, for example, higher layer signalling, to the terminal apparatus. The configuration information corresponding to the capability information has been configured, and therefore, the terminal apparatus determines that transmission and/or reception based on the capability can be performed.

FIG. 1 is a diagram illustrating an example of a downlink radio frame configuration in LTE. In the downlink, an OFDM access scheme is used. To the downlink, a Physical Downlink Control Channel (PDCCH), an Enhanced PDCCH (EPDCCH), a Physical Downlink Shared Channel (PDSCH), and the like are allocated. A downlink radio frame includes downlink Resource Block (RB) pairs. The downlink RB pair is a unit for allocation of downlink radio resources and the like, and is constituted of predefined widths of a frequency band (RB bandwidth) and a time duration (two slots equal to one subframe). One downlink RB pair is constituted of two downlink RBs (RB bandwidth×slot) that are contiguous in the time domain. One downlink RB is constituted of 12 subcarriers in frequency domain. In the time domain, the downlink RB is constituted of seven OFDM symbols, in a case that a Normal Cyclic Prefix (Normal CP: NCP) is added, while the downlink RB is constituted of six OFDM symbols, in a case that an Extended Cyclic Prefix (Extended CP: ECP) having a CP length longer than the NCP is added. A region defined by a single subcarrier in the frequency domain and a single OFDM symbol in the time domain is referred to as a resource element (RE). The PDCCH/EPDCCH is a physical channel on which Downlink Control Information (DCI) such as a terminal apparatus identifier, PDSCH scheduling information, Physical Uplink Shared Channel (PUSCH) scheduling information, a modulation scheme, a coding rate, and a retransmission parameter is transmitted. Note that although a downlink subframe in a single Component Carrier (CC) is described here, a downlink subframe is provided for each CC and downlink subframes are substantially synchronized between the CCs. Here, "substantially synchronized between the CCs" means that an error of a transmission timing of each CC falls within a prescribed range in a case of transmission from the base station apparatus using multiple CCs.

Although not illustrated here, a Synchronization Signal (SS), a Physical Broadcast Channel (PBCH), and a Downlink Reference Signal (DLRS) may be allocated in a downlink subframe. Examples of the DLRS include a Cell-specific Reference Signal (CRS) which is transmitted through an antenna port (transmission port) the same as that for the PDCCH, a Channel State Information Reference Signal (CSI-RS) which is used to measure Channel State Information (CSI), a UE-specific Reference Signal (UERS) which is transmitted through an antenna port the same as that for one or some PDSCHs, and a Demodulation Reference Signal (DMRS) which is transmitted through a transmission port the same as that for the EPDCCH. Moreover, carriers on which no CRS is mapped may be used. In this case, a similar signal (referred to as an enhanced synchronization signal) to a signal corresponding to some antenna ports (e.g., only antenna port 0) or all the antenna ports for the CRS can be inserted into some subframes (e.g., the first and sixth subframes in the radio frame) as time and/or frequency tracking signals. Here, an antenna port may be referred to as a transmit port. Here, the term "physical channel/physical signal is transmitted through an antenna port" includes a meaning that a physical channel/physical signal is transmitted via a radio resource or layer corresponding to the antenna port. For example, the reception unit is intended to receive a physical channel or physical signal via a radio resource or layer corresponding to the antenna port.

Figure 2:
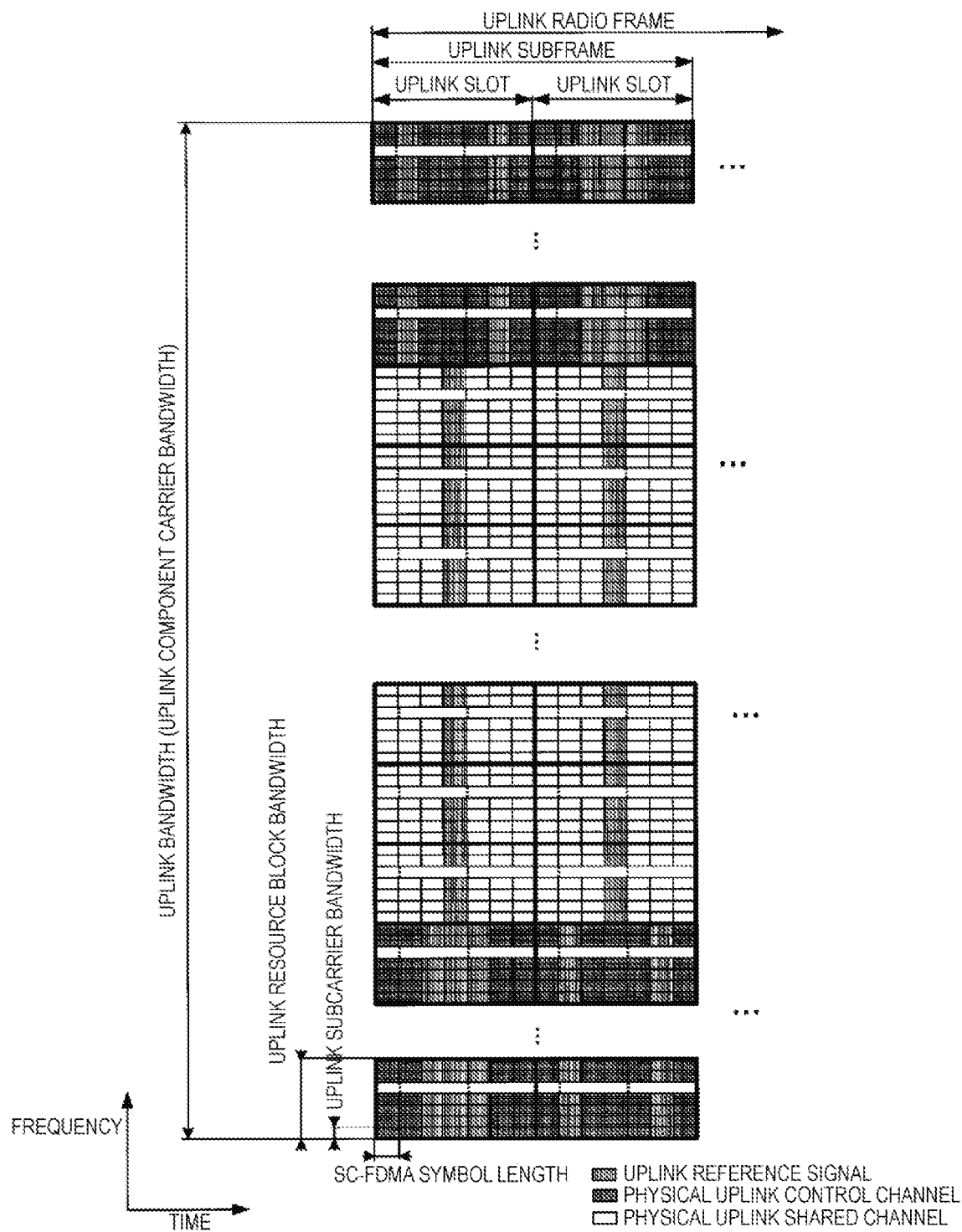
FIG. 2 is a diagram illustrating an example of an uplink radio frame configuration in LTE.

FIG. 2 is a diagram illustrating an example of an uplink radio frame configuration in LTE. An SC-FDMA scheme is used in the uplink. To the uplink, a Physical Uplink Shared Channel (PUSCH), a Physical Uplink Control Channel (PUCCH), and the like are allocated. An Uplink Reference Signal (ULRS) is also allocated together with the PUSCH and the PUCCH. An uplink radio frame is constituted of uplink RB pairs. The uplink RB pair is a unit for allocation of uplink radio resources and the like, and is constituted of predefined widths of a frequency domain (RB bandwidth) and a time domain (two slots equal to one subframe). One uplink RB pair is constituted of two uplink RBs (RB bandwidth×slot) that are contiguous in the time domain. One uplink RB is constituted of 12 subcarriers in the frequency domain. In the time domain, the uplink RB is constituted of seven SC-FDMA symbols, in a case that a Normal Cyclic Prefix (Normal CP: NCP) is added, while the uplink RB is constituted of six SC-FDMA symbols, in a case that a cyclic prefix that is longer than the normal cyclic prefix (Extended CP: ECP) is added. Note that although an uplink subframe in a single CC is described here, an uplink subframe may be provided for each CC.

FIG. 1 and FIG. 2 illustrate the example in which Frequency-Division Multiplexing (FDM) and/or Time Division Multiplexing (TDM) are applied to different physical channels/physical signals.

Figure 3:
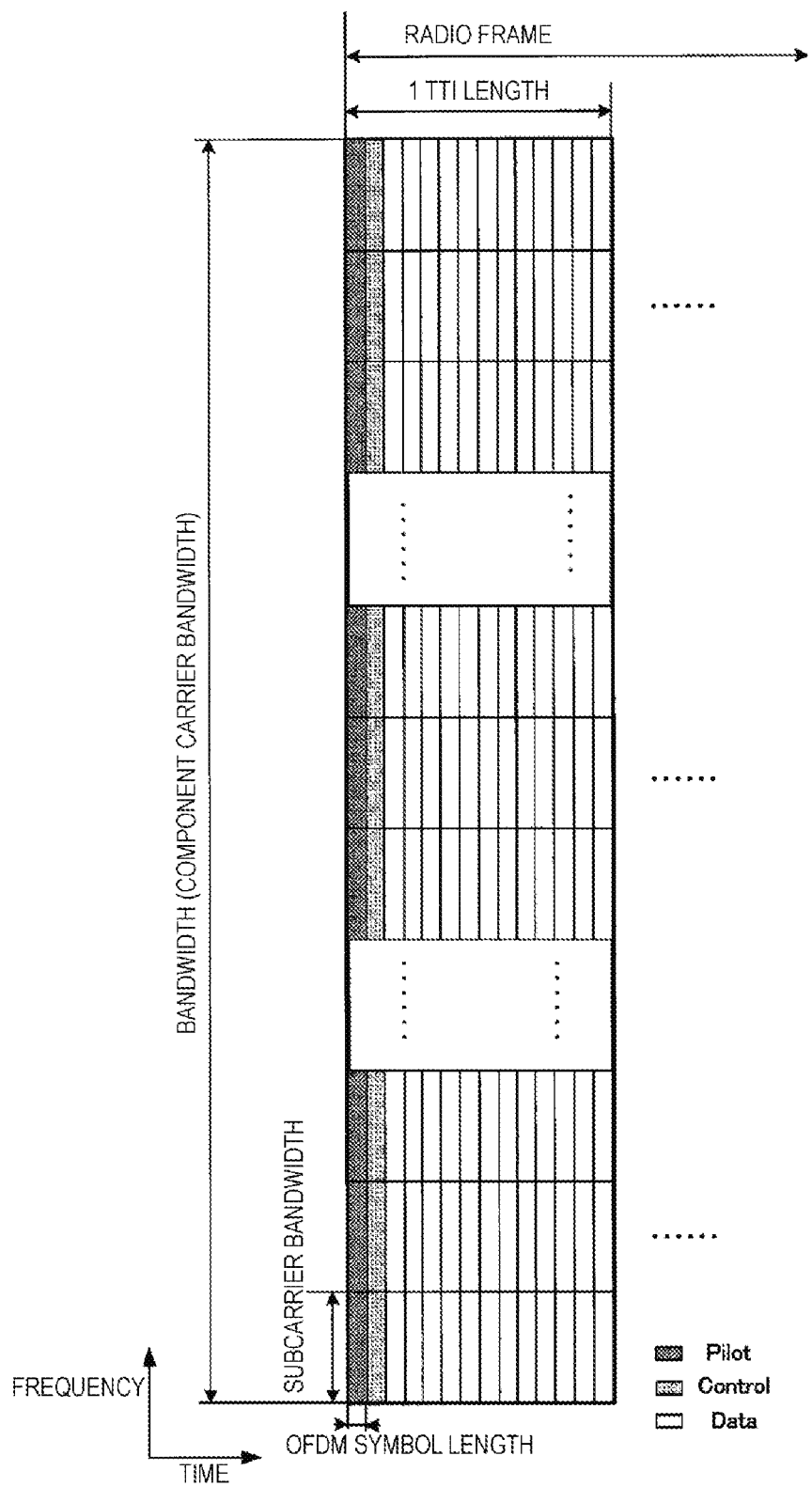
FIG. 3 is a diagram illustrating an example of a downlink and/or uplink radio frame configuration according to a first embodiment.

FIG. 3 is a diagram illustrating an example of a downlink and/or uplink radio frame configuration according to the present embodiment. This radio frame includes a pilot channel used for the time and/or frequency synchronization, modulation/demodulation of a control channel (control signal) and/or a data channel (data signal, shared channel), and channel measurement (RRM, CSI, channel sounding) ("Pilot" in FIG. 3), a control channel used to transmit the control information such as the HARQ-ACK or the CSI ("Control" in FIG. 3), and a data channel used to transmit user data such as an RRC message or unicast information ("Data" in FIG. 3). The pilot channel may correspond to a PSS/SSS, the DLRS, the ULRS, or the PRACH in LTE. The control channel may correspond to the PDCCH or the PUCCH in LTE. The data signal may correspond to the PDSCH or the PUSCH in LTE. The OFDM scheme may be used in the downlink, the SC-FDMA scheme may be used in the uplink, or the same scheme may be used in both the downlink and the uplink. Note that although one CC configuration is described here, a configuration may be provided for each CC. The subcarrier bandwidth (subcarrier spacing) may be provided in association with the operating band, may be configured through higher layer signalling from the base station apparatus, or may be provided based on the subcarrier spacing of the pilot channel which is blindly detected by the terminal apparatus. In a case that the subcarrier spacing is configured through higher layer signalling, the subcarrier spacing may be configured for each cell, or for each physical channel/physical signal. The symbol length may be uniquely provided based on the subcarrier spacing, or provided in association with the length of the added CP. FIG. 3 illustrates a case in which TDM is applied to the pilot channel, the control channel, and the data channel, but FDM and/or TDM may be applied to the different physical channels/physical signals as in FIG. 1 or FIG. 2.

In the present embodiment, higher layer signalling may be system information such as MIB or SIB, or signal/signalling of a layer higher than a physical layer such as RRC signalling.

FIG. 3 illustrates an example in which the pilot channel and the control channel are mapped to one symbol, but may be mapped to the symbols more than one. The control signal may be included in the data signal. In a case that the control channel and the data channel can be mapped to the shared region, the control channel and the data channel may be provided as a shared channel. A search space which is mapped with a control signal associated with the terminal apparatus may be included in the shared channel. Information indicating the search space may be included in the system information, may be included in the RRC message, may be indicated by the control channel transmitted at a prescribed frequency position (the carrier frequency, a prescribed frequency in the bandwidth), or may be indicated by an identifier provided by the pilot channel.

In FIG. 3, multiple kinds of signals/channels may be also individually configured for the pilot channel. There may be individually configured a channel/signal corresponding to a preamble, a synchronization channel/signal, a demodulation reference channel/signal, and a channel/signal for the channel measurement. In a case that the signals/channels are not individually configured, the pilot channel may be used as a shared channel/signal for various types of measurement, modulation/demodulation.

FIG. 3 illustrates the example in which the resources for the respective channels/signals are allocate over the bandwidth, but the resources may be mapped to some of the frequencies (frequency resource, bandwidth). To be more specific, a configuration in which multiple terminal apparatuses are multiplexed in an FDM manner on one component carrier may be used.

The pilot channel in FIG. 3 may be changed, depending on an intended use, in the subcarrier spacing, the allocatable frequency resource (frequency domain), or the number of allocatable symbols (time domain).

Positions of the pilot channel and the control channel in a time direction in FIG. 3 may be inverse. Transmission on the pilot channel used for the channel measurement or the synchronization may be controlled by information on a transmission request included in the control channel.

The pilot channel for modulation and/or demodulation in FIG. 3 may be also mapped to a region in the data channel.

The data channel in FIG. 3 may not be mapped to the entire TTIs other than the pilot channel and the control channel. To be more specific, the data channel mapping in the time direction may be provided based on the control information included in the control channel.

Next, the physical channels and the physical signals according to the present embodiment will be described.

Parameters for configuration of the physical channel and/or physical signal may be configured as higher layer parameters for the terminal apparatus through higher layer signalling. The parameters for configuration of some of the physical channels and/or physical signals may be configured for the terminal apparatus through L1 signalling (physical layer signalling, e.g., PDCCH/EPDCCH) such as the DCI format or the grant. The parameters for the configuration of the physical channel and/or physical signal may be configured in advance with a default configuration or default values for the terminal apparatus. Once the terminal apparatus is notified of the parameters for the configuration by use of higher layer signalling, the terminal apparatus may update the default values. The higher layer signalling/message may differ in types used to notify of the configuration depending on the corresponding configuration. For example, the higher layer signalling/message may include the RRC message, broadcast information, the system information, and the like.

The synchronization signal includes the Primary Synchronization Signal (PSS) and the Secondary Synchronization Signal (SSS). There are three types of PSSs, and the SSS is constituted of 31 types of codes interleaved in the frequency domain. 504 patterns of cell identities (physical cell IDs (PCIs)) for respectively identifying the base station apparatuses, and frame timings for radio synchronization are indicated by combinations of the PSS and the SSS detected in the terminal apparatus. The terminal apparatus identifies the physical cell ID in a synchronization signal received by cell search. The PSS/SSS are allocated by using six RBs (i.e., 72 REs, 72 subcarriers) at the center of the transmission bandwidth (or system bandwidth). However, the PSS/SSS may not be mapped to several subcarriers at both ends of six RBs where the PSS/SSS sequences are not allocated. To be more specific, the terminal apparatus considers a resource not allocated with the PSS/SSS sequence as a PSS/SSS resource to perform processing. In other words, there may be resources in six RBs at the center where the PSS/SSS is not transmitted.

In the NX cell, the physical channel/physical signal for frequency synchronization and time synchronization may be provided as individual physical channel/physical signal. To be more specific, the physical channel for the frequency synchronization and the physical channel for the time synchronization may be individually provided with a transmission timing (or a transmission timing offset) and/or a transmission period.

The Physical Broadcast Channel (PBCH) is used to notify (configure) a control parameter (broadcast information, system information (SI)) that are commonly used by terminal apparatuses in a cell. The terminal apparatuses in the cell are notified, on the PDCCH, of the radio resource in which broadcast information is transmitted. Broadcast information that is not notified on the PBCH is transmitted, as a layer-3 message (or system information) for making notification of the broadcast information on the PDSCH, in the radio resource that has been notified. The TTI (repetition rate) of the PBCH to which a Broadcast Channel (BCH) is mapped is 40 ms.

The PBCH is allocated by using six RBs (i.e., 72 REs, 72 subcarriers) at the center of the transmission bandwidth (or system bandwidth). Moreover, the PBCH is transmitted on 4 contiguous radio frames starting from a radio frame satisfying SFN (system frame number, radio frame number) mod 4=0. A scramble sequence of the PBCH is initialized with the PCI in each radio frame satisfying the radio frame number (SFN) mod 4=0. The number of antenna ports for the PBCH is the same as the number of antenna ports for the CRS. The PDSCH is not transmitted in resources to which the PBCH or CRS is allocated (mapped). That is, the terminal apparatus does not expect that the PDSCH is mapped to the same resource for the PBCH or CRS. In addition, the base station apparatus does not map, for the transmission, the PDSCH to the same resource for the PBCH or CRS.

The PBCH is used to broadcast system control information (Master Information Block (MIB)).

The MIB includes system information transmitted on a BCH. For example, the system information included in the MIB includes downlink transmission bandwidth, a PHICH configuration, and a system frame number. The MIB also includes spare bits (bit sequence) of 10 bits. Note that the downlink transmission bandwidth may be included in mobility control information. The mobility control information may be included in information on an RRC connection reconfiguration. That is, the downlink transmission bandwidth may be configured via an RRC message/higher layer signalling.

In the present invention, a bit sequence may be referred to as a bit map. The bit sequence may be constituted of one or more bits.

System information to be transmitted in another form than the MIB is transmitted in a System Information Block (SIB). A system information message (SI message) is used to transmit one or more SIBs. All the SIBs included in the SI message are transmitted at the same intervals. Furthermore, all the SIBs are transmitted on a Downlink Shared Channel (DL-SCH). Note that the DL-SCH may be referred to as DL-SCH data or a DL-SCH transport block. Note that the transport block is used synonymously with a transport channel according to one aspect of the present invention.

The resource allocation of the PDSCH, on which the DL-SCH having an SI message mapped is transmitted, is indicated by a PDCCH with a CRC scrambled with an SI-RNTI. The search space of the PDCCH with the CRC scrambled with the SI-RNTI is a CSS.

The resource allocation for a PDSCH, on which the DL-SCH having information on a random access response mapped is transmitted, is indicated by a PDCCH with a CRC scrambled with an RA-RNTI. The search space of the PDCCH with the CRC scrambled with the RA-RNTI is a CSS.

The resource allocation of the PDSCH, on which a PCH having a paging message mapped is transmitted, is indicated by a PDCCH with a CRC scrambled with a P-RNTI. The search space of the PDCCH with the CRC scrambled with the P-RNTI is a CSS. Note that the PCH may be referred to as PCH data or a PCH transport block. The paging message may be used synonymously with the PCH, according to one aspect of the present invention.

The SIBs respectively have different pieces of system information that are transmittable. That is, different information is indicated for each type.

For example, System Information Block type 1 (SIB 1) includes information related to estimation (evaluation, measurement), when the terminal apparatus makes access to a given cell, and defines scheduling of other system information. For example, the SIB 1 includes: information related to cell access such as a PLMN identifier list, a cell identity, and a CSG identity; cell selection information; a maximum power value (P-Max); a frequency band indicator; an SI-window length; transmission periodicity of an SI message; a TDD configuration, and the like.

Upon receiving the SIB 1 through broadcasting or dedicated signalling, in a case that the terminal apparatus is in an idle mode or in a connected mode while T311 is in operation, and the terminal apparatus is a category 0 terminal, and in a case that information indicating that the category 0 terminal is allowed to access a cell (category0Allowed) is not included in the SIB 1, the terminal apparatus determines that access to a cell is prohibited. That is, in the SIB 1, in a case where the category 0 terminal is not allowed to access a cell, the category 0 terminal cannot access the cell.

For example, System Information Block type 2 (SIB 2) includes radio resource configuration information that is common for all terminal apparatuses. For example, the SIB 2 includes frequency information such as an uplink carrier frequency and uplink bandwidth, and information on a time adjusting timer. The SIB 2 also includes information on a configuration for a physical channel/physical signal, such as a PDSCH, a PRACH, an SRS, and an uplink CP length. The SIB 2 further includes information on a configuration for signalling of higher layers such as a RACH and a BCCH.

For example, System Information Block type 3 (SIB 3) includes information (parameter, parameter value) common for intra-frequency cell re-selection, inter-frequency cell re-selection, and inter-Radio Access Technology (RAT) cell re-selection.

Although 20 types of SIBs are provided in LTE, a new one may be added/provided according to its use. An LTE terminal supporting the function for NX or a terminal apparatus supporting both the function for LTE and the function for NX may be configured with configurations for NX (resource allocation or various identifiers) using a SIB X (X is a prescribed value). Various configurations for NX (parameter, information element) may be included in a SIB of an existing type or a SIB added for NX.

An SI message may include an SIB different from the SIB 1.

On the PBCH, a coded BCH transport block is mapped to four subframes within a 40 ms interval. Such 40-ms timing for the PBCH is blindly detected. That is, there is no explicit signalling indicating the 40-ms timing. Each subframe is assumed to be self-decodable. That is, the BCH is assumed to be in a fairly good condition, and can be decoded from a single reception.

The MIB (or PBCH) uses a fixed schedule with a period of 40 ms and repetitions within 40 ms. The first transmission of the MIB is scheduled in a subframe #0 of radio frames for which SFN mod 4=0, in other words, a remainder when dividing a system frame number (SFN) by 4 is equal to 0, and the repetitions are scheduled in subframes #0 of all other radio frames. That is, information included in the MIB may be updated with the 40 ms period. Note that the SFN denotes a radio frame number.

The SIB 1 uses a fixed schedule with a periodic of 80 ms and repetitions within 80 ms. The first transmission of the SIB 1 is scheduled in a subframe #5 of radio frames for which SFN mod 8=0, in other words, a remainder when dividing an SFN by 8 is equal to 0, and the repetitions are scheduled in subframes #5 of all other radio frames for which SFN mod 2=0, in other words, a remainder when dividing an SFN by 2 is equal to 0.

The SI message is transmitted within periodically occurring time domain windows (SI-windows) by using dynamic scheduling (PDCCH scheduling, a PDCCH with the CRC scrambled with a System Information Radio Network Temporary Identifier (SI-RNTI)). Each SI message is associated with an SI-window, and the SI-windows of different SI messages do not overlap each other. Within a single SI-window, only the corresponding SI is transmitted. A length of the SI-window is common for all SI-messages and is configurable. Within the SI-window, the corresponding SI message can be transmitted any number of times in any subframe other than Multimedia Broadcast multicast service Single Frequency Network (MBSFN) subframes, uplink subframes in TDD, and a subframe #5 of radio frames for which SFN mod 2=0, in other words, a remainder when dividing an SFN by 2 is equal to 0. The terminal apparatus acquires the detailed time-domain scheduling (and other information, such as frequency-domain scheduling and used transport format), by decoding the SI-RNTI of the PDCCH. Note that the SI message includes an SIB different from the SIB 1.

The terminal apparatus applies a system information acquisition procedure to acquire the AS- and NAS-system information that is broadcasted by the EUTRAN. This procedure applies to a terminal apparatus in an idle mode (idle state, RRC_IDLE) and in a connected mode (connected state, RRC_CONNECTED).

The terminal apparatus needs to hold a valid version of demanded system information.

When in the idle mode, via System Information Block type 8 (SIB 8) relying on the support for an associated RAT or System Information Block type 17 relying on the support for a Wireless Local Area Network (WLAN) interworking assisted by a Radio Access Network (RAN), not only the SIB 2 but also the MIB and the SIB 1 are needed. That is, the needed SIB may differ depending on the function supported by the terminal apparatus.

The NX terminal in the idle mode may detect the SIB for the associated RAT before a transition to the connected mode.

In order to be in the connected mode, the terminal apparatus needs to receive the MIB, the SIB 1, the SIB 2, and the SIB 17.

The terminal apparatus deletes the system information three hours after the terminal apparatus confirms that the stored system information is valid. That is, the terminal apparatus does not permanently keep the system information that has been retained once. The terminal apparatus deletes the retained system information after a lapse of a prescribed period of time.

When a system information value tag included in the SIB 1 is different from the one of the retained system information, the terminal apparatus regards the retained system information as invalid, except for System Information Block type 10 (SIB 10), System Information Block type 11 (SIB 11), System Information Block type 12 (SIB 12), and System Information Block type 14 (SIB 14).

The PBCH is allocated to six RBs (i.e., 72 REs) at the center of a downlink bandwidth configuration in the frequency domain, and is allocated to indexes (OFDM symbol indexes) 0 to 3 in a slot 1 (the second slot in the subframe, a slot index 1) of a subframe 0 (the first subframe in the radio frames, a subframe index 0) in the time domain. Note that the downlink bandwidth configuration is represented by a multiple of the resource block size, in the frequency domain, expressed as the number of subcarriers. Furthermore, the downlink bandwidth configuration is a downlink transmission bandwidth configured in a given cell. That is, the PBCH is transmitted by using six RBs at the center of the downlink transmission bandwidth.

The PBCH is not transmitted using a resource reserved for a DLRS. That is, the PBCH is mapped with avoiding a DLRS resource. Regardless of the actual configuration, the PBCH is mapped by assuming CRSs for existing antenna ports 0 to 3. Furthermore, resource elements of the CRSs for the antenna ports 0 to 3 are not used for PDSCH transmission.

As broadcast information, a Cell Global Identifier (CGI) indicating a cell-specific identifier, a Tracking Area Identifier (TAI) for managing a standby area by paging, random access configuration information (such as a transmission timing timer), shared radio resource configuration information, neighboring cell information, and uplink access restriction information on the cell are notified.

In the case that an access of the NX cell is assisted by using the LTE cell, system control information/system information for NX may be transmitted by using the cell of LTE. To be more specific, the NX terminal, after entering the connected mode with respect to LTE cell, may acquire the system control information/system information for the NX cell by use of higher layer signalling (RRC message and/or system information). The NX terminal may detect, in the idle mode, the system information for the NX cell within the system information transmitted from the LTE cell.

In a case that an access of the NX cell is made in a standalone manner, the NX terminal detects, in the idle mode, the system control information/system information for NX from the NX cell.

In a case that a physical control channel (parameters for a physical control channel) corresponding to the PUCCH for LTE is configured in an uplink cell and uplink subframe of NX, downlink/uplink transmission (reception) processing in the NX cell may be performed independently from the LTE cell.

In the NX cell, a broadcast channel corresponding to the PBCH may not be transmitted in the case that an access is assisted by using the LTE cell. In a case that the NX cell is operable in a standalone manner, the broadcast channel corresponding to the PBCH may be transmitted. At that time, the resource allocation for the broadcast channel may be provided based on the configuration information included in the control channel and/or shared channel allocated to a prescribed frequency domain. That is, the broadcast channel in the NX cell may not be transmitted in a specific period.

The DLRS in LTE is classified into multiple types according its use. For example, a CRS is a pilot signal transmitted with prescribed power in each cell, and is a DLRS periodically repeated in the frequency domain and in the time domain, based on a prescribed rule. The terminal apparatus receives the CRS to measure a reception quality (Reference Signal Received Power (RSRP), Reference Signal Received Quality (RSRQ)) for each cell. The terminal apparatus may also use the CRS as a reference signal for demodulation of a PDCCH or PDSCH transmitted concurrently with the CRS. The sequence used for the CRS is distinguishable among the cells. To be more specific, the sequence used for the CRS may be configured based on the cell ID.

The DLRS is also used for estimation (channel estimation) of a downlink channel variation. The DLRS used for estimation of a channel variation (channel state) is referred to as a CSI-RS. Furthermore, a DLRS individually configured for each terminal apparatus is referred to as UERS, DMRS, or Dedicated RS, and is referenced for a channel compensation process on a channel, when an EPDCCH or a PDSCH is demodulated. The DMRS is provided to both the downlink and the uplink. For easy distinguishing in the present invention, the DMRS for the downlink is referred to as UERS or DL DMRS, and the DMRS for uplink is referred to as merely DMRS or UL DMRS.

The CSI includes a Channel Quality Indicator (CQI), a Precoding Matrix Indicator (PMI), a Precoding Type Indicator (PTI), and a Rank Indicator (RI), which can be used for respectively specifying (representing) a suitable modulation scheme and coding rate, a suitable precoding matrix, a suitable PMI type, and a suitable rank. Note that each of the Indicators may be denoted as an Indication. Moreover, the CQI and the PMI are classified into wideband CQI and PMI assuming transmission using all the resource blocks in a single cell, and subband CQI and PMI assuming transmission using some contiguous resource blocks (subbands) in a single cell. Moreover, the PMI include a normal type of PMI indicating a single suitable precoding matrix with a single PMI, and another type of PMI indicating a single suitable precoding matrix with two kinds of PMIs, which are a first PMI and a second PMI. Note that the CSI is reported on a PUCCH and a PUSCH. In a case that the terminal apparatus is not configured with a parameter for the CSI-RS, or does not have a function to receive/transmit the CSI-RS, the terminal apparatus may measure the CSI, based on the CRS.

Channel State Information-Interference Measurement (CSI-IM) is performed based on a zero power CSI-RS resource. The zero power CSI-RS used for the CSI-IM, differently from the case of measuring the CSI, is not transmitted from the connected base station apparatus (cell). To be more specific, the terminal apparatus uses the resource not mapped with the CSI-RS to measure an interference power or noise power of a neighbor cell (i.e., a noise power or power of signals transmitted from a base station apparatus and/or terminal apparatus belonging to the neighbor cell (non-serving cell)). In the case of measuring the CSI, the measurement is performed using the non-zero power CSI-RS resource. The zero power CSI-RS resource and the non-zero power CSI-RS resource are individually configured using the higher layer parameters. The resource is configured based on an index indicating which resource element in one resource block is used for configuration, and a transmission subframe and transmission period (a measurement subframe and measurement period) or a subframe pattern. In a case of the subframe pattern, a 16-bit sequence is used to indicate a subframe to which the zero power CSI-RS resource is allocated. The subframe to which the zero power CSI-RS resource is allocated is set to "1". The terminal apparatus does not expect that the zero power and non-zero power CSI-RS resources are configured for a subframe in a certain serving cell the same as for a Physical Multicast Channel (PMCH). The configuration for the zero power CSI-RS resource may be configured to be used for an intended use other than the CSI-IM.

In the case of the subframe pattern, the terminal apparatus does not expect that any one of lower 6 bits of 16 bits is set to "1" for the NCP and any one of lower 8 bits of 16 bits is set to "1" for the ECP, with respect to serving cell of the FS1. The terminal apparatus does not expect that any one of lower 6 bits of 16 bits is set to "1" for the NCP and any one of lower 8 bits of 16 bits is set to "1" for the ECP, with respect to four CRS ports in a serving cell of the FS2.

Discovery Signal(s) (DS(s)) is used, at a frequency configured with a parameter for the DS, for time frequency synchronization, cell identification, Radio Resource Management (RRM) measurement (intra- and/or inter-frequency measurement). The DS is constituted of multiple signals, and those signals are transmitted at the same period. The DS is constituted using PSS/SSS/CRS resources, and may be further constituted using a CSI-RS resource. In the DS, the resource to which the CRS or CSI-RS is mapped may be used to measure the RSRP or the RSRQ. A timing (measurement subframe and measurement period) to measure the DS is determined based on a parameter included in a DS Measurement Timing Configuration (DMTC). The DS measurement period is configured to be a multiple of 40 ms such as 40 ms, 80 ms, and 120 ms. The DS measurement subframe may be associated with the measurement period (transmission period) to be configured as a parameter separate from the period. The measurement subframe may be a subframe offset for a subframe 0 of a system frame number 0. The measurement subframe may be configured base on a subframe offset with respect to a subframe corresponding to the subframe 0 in the measurement period. The RRM measurement includes at least one of the RSRP, RSRQ, and RSSI measurements. The DS may also be referred to as Discovery Reference Signal(s) (DRS(s)). A parameter for the DMTC (subframe offset and period configuration) is included in a measurement DS configuration.

The terminal apparatus knows a start position of a DS occasion (a start position of the subframe) in which the DS is possibly transmitted, according to the configuration by the DMTC. A length of the DS occasion is fixed (e.g., six subframes). A duration, of the subframe within the DS occasion, while the DS is actually transmitted is configured as a DS duration (DS occasion duration) in the measurement DS configuration. The CRS included in the DS may be transmitted on all the subframes in the DS duration. Furthermore, in a case that the measurement DS configuration includes the parameter of the CSI-RS, the terminal apparatus can measure the CSI-RSRP. The measurement DS configuration may be included in a measurement object configuration. To be more specific, in a case that the measurement object configuration includes the measurement DS configuration, the terminal apparatus can measure the DS, based on the DMTC. The terminal apparatus performs DS monitoring from a head subframe in the DS occasion, based on the DS duration. The terminal apparatus monitors, from the subframe in which the PSS/SSS included in the DS is detected, the corresponding DS (CRS and CSI-RS), based on the duration.

The CRS included in the DS may be mapped to all the subframes in the duration.

The CSI-RS included in the DS may be configured with 0 or more resources. The CSI-RS included in the DS may be listed to be managed. The ID included in the list may be associated with the CSI-RS resource configuration. To be more specific, multiple CSI-RSs may be included in one DS (one duration).

The DS may be transmitted from the base station apparatus configuring a cell enabling activation/deactivation (on/off) (i.e., by using a frequency of a cell enabling activation/deactivation (on/off)).

In the present invention, the duration is used synonymously with one or more consecutive subframes or symbols. The duration may be referred to as a burst. To be more specific, the burst is also used synonymously with one or more consecutive subframes or symbols. A unit (dimension) used for the duration may be determined based on the configured parameter.

The measurement period and the measurement subframe are the parameters for the measurement in the terminal apparatus, but at the same time, are also the parameters for the transmission in the base station apparatus. Moreover, the parameter for the reception in the terminal apparatus may be, at the same time, the parameter for the transmission in the base station apparatus. To be more specific, the base station apparatus may transmit the corresponding downlink signal, based on the parameter configured for the terminal apparatus. The parameter for the transmission in the terminal apparatus may be the parameter for the reception or measurement in the base station apparatus. To be more specific, the base station apparatus may receive the corresponding uplink signal, based on the parameter configured for the terminal apparatus.

Examples of the CSI-RS configuration included in the measurement DS configuration include an ID associated with the measured CSI-RS (measured CSI-RS ID), a physical layer cell ID and scrambling ID used for sequence generation, a resource configuration for determining a time frequency resource of the CSI-RS (resource element pair), a subframe offset indicating a subframe offset with respect to the SSS, and a power offset individually configured for the CSI-RS.

The measurement DS configuration includes an addition/change list and deletion list of the ID corresponding to the CSI-RS configuration. The terminal apparatus measures the CSI-RS resource associated with the measured CSI-RS ID which is set in the addition/change list. The terminal apparatus does not measure the CSI-RS resource associated with the measured CSI-RS ID which is set in the deletion list.

A DS occasion for a certain cell (frequency) includes a period with a duration of 1 to 5 consecutive subframes for Frame structure type 1, and a period with a duration of 2 to 5 consecutive subframes for Frame structure type 2. The terminal apparatus assumes the DS existence in that period and duration to perform the measurement.

The CRS which constitutes the DS (or which is included in the subframes of the DS occasion) is mapped to a resource at an antenna port 0 in all the downlink subframes in its duration and the DwPTS of the special subframe. The phrase "constituting the DS" may be used synonymously with the phrase" included in the subframe of the DS occasion".

The PSS included in the DS is mapped to the first subframe in its duration for Frame structure type 1, and the second subframe in its duration for Frame structure type 2.

The SSS included in the DS is mapped to the first subframe in its duration.

In a case that the DS is included in a measurement object for the LAA frequency, the PSS/SSS resource for the corresponding DS may be shifted in the frequency direction and mapped. An amount of the shift may be determined based on a value which is configured by a prescribed ID such as the cell ID or higher layer. In the case that the DS is included in a measurement object for the LAA frequency, the PSS/SSS resource or sequence for the corresponding DS may be extended based on the measurement bandwidth.

As for the CSI-RS included in the DS, a non-zero power resource is mapped to 0 or more subframes in its duration.

The terminal apparatus may assume that one DS occasion exists per a period of the DMTC to perform the measurement.

At the LAA frequency, an initial signal and a reservation signal may be further transmitted from the base station apparatus and/or terminal apparatus.

The initial signal is a signal used to indicate a transmission start position of the data signal (PDSCH or PUSCH), the control signal (PDCCH or PUCCH), or the reference signal (DLRS or ULRS). The initial signal is also referred to as a preamble. To be more specific, the terminal apparatus or the base station apparatus, which receives the initial signal, can receive the subsequent data signal or control signal.

The reservation signal indicates that, in a case that LBT is performed and it is determined that a channel is clear, the channel is occupied such that another base station apparatus or terminal apparatus does not interrupt, and the reservation signal is transmitted with an energy more than a threshold. The reservation signal itself does not need to be mapped with the data.

The initial signal may serve as the reservation signal in some cases. The control information may be mapped to the initial signal. The initial signal may be used for the time frequency synchronization or the cell identification.

The initial signal and/or the reservation signal may be used to configure Auto Gain Control (AGC).

The terminal apparatus may determine whether the DS and the PSS/SSS/CRS/CSI-RS (the signals periodically transmitted other than the DS) are periodically transmitted, based on whether the base station apparatus performs the LBT. In a case that the base station apparatus performs the LBT, the terminal apparatus assumes that the DS is not periodically transmitted and measures the DS.

The base station apparatus, in a case of transmitting the DS at the LAA frequency, may map data information and/or control information within the DS occasion. The data information and/or control information may include information on an LAA cell. For example, the data information and/or control information may include a frequency to which the LAA cell belongs, a cell ID, a load or a congestion degree, an interference/transmit power, a channel occupation time, and a buffer state relating to the transmission data.

In a case that the DS is measured at the LAA frequency, the resource used for the signals included in the DS may be extended. For example, for the CRS, the resource corresponding to not only the antenna port 0 but also an antenna port 2 or 3 may be used. For the CSI-RS also, the resource corresponding to not only an antenna port 15 but also an antenna port 16 or 17 may be used.

In a case that the terminal apparatus is configured with the resource relating to the DS by using higher layer signalling (RRC signalling) or the system information in the NX cell, the L1 signalling (control information corresponding to a certain field of the PDCCH or DCI format) or L2 signalling (control information corresponding to the MAC CE), in other words, lower layer signalling (signalling of a layer lower than the RRC layer) may be used to dynamically indicate the terminal apparatus whether to receive the DS.

In the NX cell, the RS for demodulation/decoding and the RS for CSI measurement may be a common resource, or different resources in a case that those RS are separately provided.

The PDCCH is transmitted using several OFDM symbols (e.g., 1 to 4 OFDM symbols) from the head of each subframe. The EPDCCH is a PDCCH allocated in OFDM symbols, in which a PDSCH is allocated. A parameter for the EPDCCH may be configured as a higher layer parameter through an RRC message (higher layer signalling). The PDCCH or EPDCCH is used to notify the terminal apparatus of radio resource allocation information in accordance with scheduling determined by the base station apparatus, information indicating an adjustment quantity for an increase or decrease in the transmit power, and other control information. That is, the PDCCH/EPDCCH is used to transmit the DCI (or a DCI format including at least one piece of the DCI). In each embodiment of the present invention, in a case that the PDCCH is simply described, both physical channels that are the PDCCH and the EPDCCH are included, unless otherwise specified.

The PDCCH is used to notify a terminal apparatus (UE) and a relay station device (RN) of information on resource allocations of a Paging Channel (PCH) and DL-SCH, and HARQ information on the DL-SCH (DL HARQ). The PDCCH is also used to transmit an uplink scheduling grant and a sidelink scheduling grant. That is, the PDCCH is used for transmitting the DCI (resource allocation of the PDSCH) indicating resource allocations of the PCH and/or DL-SCH, and the DCI indicating a HARQ-ACK to the PCH and/or DL-SCH. The terminal apparatus detects the PDSCH, to which the PCH or the DL-SCH is mapped, based on these pieces of DCI.

The DCI indicating the resource allocations of the PCH and/or DL-SCH may include information on the resource allocation/information on a virtual resource allocation (information on the resource block allocation) of the PDSCH, and information on the number of the antenna ports or layers of a UERS or DMRS, which is used for demodulating the PDSCH.

The DCI indicating the HARQ-ACK to the PCH and/or DL-SCH may include: information on a modulation and coding scheme; information indicating either initial transmission or retransmission of the PCH or DL-SCH transport block; information indicating a start point (an initiating point for loading stored data (HARQ soft buffer)) in a circular buffer (Redundancy Version); and information on a Downlink Assignment Index (DAI) used for a HARQ-ACK procedure in TDD, in which a possibility of a HARQ protocol error such as an ACK transmission failure or a PDCCH detection failure (information on a HARQ-ACK subframe for the PUSCH (the UL-SCH); and information on a HARQ-ACK subframe for the PDSCH (the PCH or DL-SCH)) is considered.

The EPDCCH is used to notify the terminal apparatus (UE) of the DL-SCH resource allocation and the HARQ information on the DL-SCH. The EPDCCH is also used to transmit the uplink scheduling grant and the sidelink scheduling grant.

The PDCCH is transmitted with aggregation of one or some contiguous Control Channel Elements (CCEs). Note that a single CCE corresponds to nine Resource Element Groups (REGs). The number of CCEs available to the system is determined excluding a Physical Control Format Indicator Channel (PCFICH) or a Physical HARQ Indicator Channel (PHICH). The PDCCH supports multiple formats (PDCCH formats). For each PDCCH format, the number of CCEs, the number of REGs, and the number of PDCCH bits are defined. A single REG is constituted of four REs. That is, one PRB may include up to three REGs. The PDCCH format is determined depending on the size of the DCI format, and the like.

Since the multiple PDCCHs are mapped throughout downlink transmission bandwidth, after all the multiple PDCCHs are subject to the modulation and coding process, the terminal apparatus keeps on decoding until detecting the PDCCH addressed to the terminal apparatus itself. That is, the terminal apparatus cannot detect the PDCCH, even in a case of receiving only a part of the frequency domain and demodulating and decoding the received frequency domain. The terminal apparatus becomes capable of correctly detecting the PDCCH (a PDCCH candidate) addressed to the terminal apparatus itself, only after receiving the entire PDCCHs mapped to the whole downlink transmission bandwidth.

Multiple PDCCHs may be transmitted in a single subframe. Moreover, the PDCCH is transmitted through the same set of antenna ports as that for the PBCH. The EPDCCH is transmitted through an antenna port different from that for the PDCCH.

The terminal apparatus needs to monitor a PDCCH addressed to the terminal apparatus itself and receives the PDCCH addressed to the terminal apparatus itself, before transmitting and/or receiving the downlink data (DL-SCH) or a layer-2 message and a layer-3 message, which are higher-layer control information (such as a paging or a handover command), and thus acquire, from the PDCCH, radio resource allocation information that is named an uplink grant in a case of transmission and a downlink grant (downlink assignment) in a case of reception. Note that the PDCCH can be configured to be transmitted in a region of resource blocks to be allocated by the base station apparatus individually to the terminal apparatus, in addition to being transmitted in the OFDM symbols described above.

The DCI is transmitted in a specific format. The uplink grant and the downlink grant are transmitted in different formats. For example, the terminal apparatus can acquire the uplink grant from a DCI format 0, and can acquire the downlink grant from a DCI format 1A. In addition, other DCI formats include a DCI format containing only a DCI indicating a transmit power control command for the PUSCH or PUCCH (a DCI format 3/3A), a DCI format containing a DCI indicating a UL-DL configuration (a DCI format 1C), and the like. For example, the radio resource allocation information for the PUSCH or PDSCH is one type of DCIs.

The terminal apparatus can configure various parameters of corresponding uplink signals and downlink signals, based on the detected DCI (a value set in a field of the detected DCI), and can perform transmission and/or reception. For example, when the terminal apparatus detects the DCI on to the PUSCH resource allocation, the terminal apparatus can allocate the PUSCH resource based on the detected DCI, and can transmit the PUSCH. When the terminal apparatus detects a transmit power control command (TPC command) for the PUSCH, the terminal apparatus can adjust the transmit power of the PUSCH, based on the detected DCI. When the terminal apparatus detects the DCI on the PDSCH resource allocation, the terminal apparatus can receive the PDSCH from a resource indicated based on the detected DCI.

The terminal apparatus can acquire (determine) various pieces of DCI (DCI formats), by decoding the PDCCH with a Cyclic Redundancy Check (CRC) scrambled with a specific Radio Network Temporary Identifier (RNTI). A higher layer configures which PDCCH with the CRC scrambled with which RNTI is to be decoded.

The control information transmitted on the DL-SCH or PCH corresponding to the PDCCH differs depending on with which RNTI the PDCCH is scrambled. For example, in a case that the PDCCH is scrambled with a Paging RNTI (P-RNTI), information on the paging is transmitted on the PCH. In a case that the PDCCH is scrambled with a System Information RNTI (SI-RNTI), the system information may be transmitted on the DL-SCH thereof.

Moreover, the DCI format is mapped to a search space (Common Search Space (CSS), UE-specific Search Space (UESS)) given by a specific RNTI. Furthermore, the search space is defined as a set of PDCCH candidates to be monitored. That is, in each embodiment of the present invention, monitoring the search space is used synonymously with monitoring the PDCCH. Note that the CSS and UESS in the PCell sometimes overlap each other. In the EPDCCH, only the UESS may be defined.

Examples of the RNTI used to scramble the CRC include RA-RNTI, C-RNTI, SPS C-RNTI, temporary C-RNTI, eIMTA-RNTI, TPC-PUSCH-RNTI, TPC-PUSCH-RNTI, M-RNTI, P-RNTI, and SI-RNTI.

The RA-RNTI, C-RNTI, SPS C-RNTI, eIMTA-RNTI, TPC-PUCCH-RNTI, and TPC-PUSCH-RNTI are configured for the terminal apparatus from the base station apparatus via higher layer signalling.

The M-RNTI, P-RNTI, and SI-RNTI correspond to a single value. For example, the P-RNTI corresponds to the PCH and the PCCH, and is used to notify changes in paging and system information. The SI-RNTI corresponds to the DL-SCH and the BCCH, and is used to broadcast the system information. The RA-RNTI corresponds to the DL-SCH, and is used for a random access response.

The RA-RNTI, C-RNTI, SPS C-RNTI, temporary C-RNTI, eIMTA-RNTI, TPC-PUSCH-RNTI, and TPC-PUSCH-RNTI are configured by using higher layer signalling.

The M-RNTI, P-RNTI, and SI-RNTI are defined with prescribed values.

The PDCCH with a CRC scrambled with each RNTI may correspond to a different transport channel or logical channel depending on an RNTI value. That is, different information may be indicated depending on the RNTI value.

A single piece of SI-RNTI is used to be addressed in the SIB 1, as well as all the SI messages.

In NX, the RNTI corresponding to the FS4-1 to the FS4-3 may be provided. The DCI format corresponding to the FS4-1 to the FS4-3 may be provided. A size of a payload of the DCI format may be provided correspondingly to each FS.

In a case that the control channel and/or shared channel in the NX cell is used to transmit the control information indicating the resource allocation or the MCS, the associated RNTI, i.e., the identifier may be used to scramble the sequence associated with the control information.

The PHICH is used to transmit an HARQ-ACK/NACK (NAK) in response to the uplink transmission.

The PCFICH is used to notify the terminal apparatus and the relay station device of the number of OFDM symbols used for the PDCCH. Furthermore, the PCFICH is transmitted in each downlink subframe or in each special subframe.

The PDSCH is used to notify the terminal apparatus of not only the downlink data (DL-SCH data, DL-SCH transport block) but also the broadcast information (system information) that is not notified on the PCH or the PBCH, as a layer-3 message. The radio resource allocation information on the PDSCH is indicated with the PDCCH. The PDSCH is allocated in an OFDM symbol different from an OFDM symbol in which the PDCCH is transmitted. That is, the PDSCH and the PDCCH are subjected to Time Division Multiplexing (TDM) within one subframe. However, the PDSCH and the EPDCCH are subjected to Frequency Division Multiplexing (FDM) within one subframe.

The PDSCH may also be used to broadcast the system control information.

The PDSCH may also be used as paging, when the network does not know a cell in which the terminal apparatus is located. That is, the PDSCH may be used to transmit paging information and modification notification of system information.

Moreover, the PDSCH may be used for a terminal apparatus having no RRC connection with the network (terminal apparatus in the idle mode) to transmit control information between the terminal apparatus and the network.

The PDSCH may also be used for a terminal apparatus having an RRC connection (terminal apparatus in the connected mode) to transmit dedicated control information between the terminal apparatus and the network.

The PDSCH is used to transmit a transport block corresponding to the RNTI added to the PDCCH. For example, the DL-SCH associated with the random access response is mapped to the PDSCH, in which the resource allocation is indicated by the PDCCH with the CRC scrambled with the RA-RNTI. Further, the PCH associated with the paging information is mapped to the PDSCH, in which the resource allocation is indicated by the PDCCH with the CRC scrambled with the P-RNTI. Further, the DL-SCH associated with the SIB is mapped to the PDSCH, in which the resource allocation is indicated by the PDCCH with the CRC scrambled with the SI-RNTI. Further, the DL-SCH associated with the RRC message may be mapped to the PDSCH, in which the resource allocation is indicated by the PDCCH with the CRC scrambled with the temporary C-RNTI.

The PUCCH is used to make a reception confirmation acknowledgment (Hybrid Automatic Repeat reQuest-Acknowledgment (HARQ-ACK) or Acknowledgment/Negative Acknowledgment (ACK/NACK or ACK/NAK)) for downlink data transmitted on the PDSCH, a downlink CSI report, and an uplink radio resource allocation request (radio resource request, Scheduling Request (SR)). That is, the PUCCH is used to transmit the HARQ-ACK/NACK, SR, or CSI report in response to downlink transmission. For the PUCCH, multiple formats are supported according to the type of Uplink Control Information (UCI) such as the HARQ-ACK, CSI, and SR to be transmitted. For the PUCCH, a resource allocation method and a transmit power control method are defined for each format. The PUCCH uses one RB in each of two slots of one subframe. That is, the PUCCH includes one RB regardless of the format. Furthermore, the PUCCH may not be transmitted in an UpPTS of the special subframe.

In a case that the PUCCH is transmitted in an SRS subframe, in a PUCCH format to which a shortened format is applied (e.g., formats 1, 1a, 1b, and 3), the last one symbol or two symbols, to which an SRS may possibly be allocated (the last one symbol or two symbols of the second slot in the subframe), is or are to be made empty.

One RB in each slot may support a combination of PUSCH formats 1/1a/1b and PUSCH formats 2/2a/2b. That is, the terminal apparatus may transmit the PUCCH formats 1/1a/1b and the PUCCH formats 2/2a/2b in one RB.

The PUSCH mainly transmits the uplink data (UL-SCH data, UL-SCH transport block) and the control data, and may include Uplink Control Information (UCI), such as the CSI, the ACK/NACK (HARQ-ACK), and the SR. Moreover, the PUSCH is also used such that the terminal apparatus notifies the base station apparatus of the uplink data as well as a layer-2 message and a layer-3 message, which are higher-layer control information. In addition, in a similar manner to the downlink, the radio resource allocation information on the PUSCH is indicated with the PDCCH (PDCCH with a DCI format). In a case that the PUSCH is transmitted in the SRS subframe and the PUSCH resource overlaps an SRS bandwidth, the last one symbol or the last two symbols, to which the SRS may possibly be allocated (the last one symbol or two symbols of the second slot of the subframe), is or are to be made empty.

The Uplink Reference Signal (ULRS) includes the Demodulation Reference Signal (DMRS) to be used by the base station apparatus to demodulate the PUCCH and/or the PUSCH, and the Sounding Reference Signal or Sounding Reference Symbol (SRS) to be mainly used by the base station apparatus to estimate/measure an uplink channel state or a transmission timing. Moreover, the SRS include a Periodic SRS (P-SRS), which is transmitted periodically, or an Aperiodic SRS (A-SRS), which is transmitted when indicated by the base station apparatus. Note that the P-SRS is referred to as a trigger type 0 SRS, and the A-SRS is referred to as a trigger type 1 SRS.

The SRS is allocated to the last one symbol or the last two symbols in a subframe. The subframe in which the SRS is possibly transmitted may be referred to as an SRS subframe. The SRS subframe is determined based on a cell-specific subframe configuration and a terminal apparatus-specific subframe configuration. To transmit the PUSCH in a subframe in which the cell-specific subframe configuration is set, none of the terminal apparatuses in a cell allocates a PUSCH resource to the last symbol in the subframe. In a case of the PUCCH and a shortened format is applied, in an SRS subframe that is set based on the cell-specific subframe configuration, none of the terminal apparatuses allocates a PUCCH resource in the last symbol in the subframe. However, the shortened format may not be applied depending on the PUCCH format. In such a case, the PUCCH may be transmitted in a normal format (i.e., transmitted with a PUCCH resource being allocated to an SRS symbol). To transmit the PRACH, its transmission has a higher priority. When the SRS symbol is arranged in a guard time of the PRACH, the SRS may be transmitted. The ULRS may be referred to as an uplink pilot channel or pilot signal.

The P-SRS is transmitted in a case that a higher layer parameter for the P-SRS is configured, whereas A-SRS is determined whether to be transmitted, in a case that a higher layer parameter for the A-SRS is configured, and in an SRS subframe immediately after a prescribed subframes from a downlink subframe receiving an SRS request which requests for transmission of the SRS (A-SRS) included in the DCI format, based on a value set in the SRS request.

The Physical Random Access Channel (PRACH) is a channel used to report (configure) a preamble sequence, and includes a guard time. The preamble sequence is configured such that multiple sequences are used to report the information to the base station apparatus. For example, in a case that 64 sequences are available, 6-bit information can be provided to the base station apparatus. The PRACH is used by the terminal apparatus as an access means to access the base station apparatus (such as an initial access). The PRACH is used to transmit a random access preamble.

The terminal apparatus uses the PRACH to request an uplink radio resource when no PUCCH is configured for the SR or to request the base station apparatus for transmission timing adjustment information (also referred to as a Timing Advance (TA) command) demanded for matching the uplink transmission timing with a reception timing window of the base station apparatus, for example. Moreover, the base station apparatus can also request the terminal apparatus to initiate a random access procedure with the PDCCH (referred to as a PDCCH order). The TA command is used common to the cells belonging to the same TAG.

In the NX cell also, various physical channels/physical signals serving in the same way as described above may be provided. Some of the above physical channels and/or physical signals may be provided as the same channel. Various physical channels/physical signals serving in the same way as described above may be provided as one piece of information/data transmitted/mapped by using the channel.

Next, the cell search according to the present embodiment will be described.

In LTE, the cell search is a procedure for the terminal apparatus to perform the time frequency synchronization with a certain cell and detect a cell ID of the cell. EUTRA cell search supports the scalable entire transmission bandwidth corresponding to 72 subcarriers or more. The EUTRA cell search is performed in the downlink, based on the PSS and the SSS. The PSS and the SSS are transmitted by using 72 subcarriers at the center of a bandwidth of each of the first subframe and the sixth subframe in each radio frame. The neighboring cell search is performed as an initial cell search, based on the identical downlink signal.

In NX, in a case that the communication is performed in a standalone manner, the same cell search as above may be performed.

Next, physical layer measurements according to the present embodiment will be described.

In LTE, the physical layer measurements include an intra-frequency and inter-frequency measurement in EUTRAN (RSRP/RSRQ), a measurement for a time difference between reception and transmission by the terminal apparatus and a reference signal time difference (RSTD) used for terminal apparatus positioning, an inter-RAT (EUTRAN-GERAN/UTRAN) measurement, and an inter-system (EUTRAN-non 3GPP RAT) measurement. The physical layer measurements are performed to support the mobility. EUTRAN measurements include a measurement by the terminal apparatus in the idle mode and a measurement by the terminal apparatus in the connected mode. The terminal apparatus performs the EUTRAN measurements at a proper measurement gap and is in synchronization with the cell in which the EUTRAN measurements are performed. These measurements, which are performed by the terminal apparatus, may be referred to as terminal apparatus measurements.

For the terminal apparatus, a least two physical amounts (RSRP, RSRQ) for the measurement in EUTRAN may be supported. Furthermore, for the terminal apparatus, a physical amount for the RSSI may be supported. The terminal apparatus may perform a corresponding measurement, based on a parameter for a physical amount configured as the higher layer parameter.

The physical layer measurements are performed to support the mobility. For example, there are an intra-frequency and inter-frequency measurement in EUTRAN (RSRP/RSRQ), a measurement for a time difference between reception and transmission by the terminal apparatus and a reference signal time difference (RSTD) used for terminal apparatus positioning, an inter-RAT (EUTRAN-GERAN/UTRAN) measurement, an inter-system (EUTRAN-non 3GPP RAT) measurement, and the like. For example, the physical layer measurement includes intra- and inter-frequency handover related measurements, an inter-RAT handover related measurement, a timing measurement, a RRM related measurement, and a positioning measurement in a case that the positioning is supported. The inter-RAT handover related measurement is defined in the support of handover to GSM (trade name), UTRA FDD, UTRA TDD, CDMA2000, 1xRTT, CDMA2000 HRPD, IEEE 802.11. The EUTRAN measurements are used for supporting the mobility. Examples of the EUTRAN measurement include a measurement by the terminal apparatus in the idle mode and a measurement by the terminal apparatus in the connected mode. For example, the RSRP and the RSRQ may be measured for the intra-frequency and the inter-frequency by the terminal apparatus in either mode. The terminal apparatus performs the EUTRAN measurements at a proper measurement gap and is in synchronization with the cell in which the EUTRAN measurements are performed.

The physical layer measurements include that a radio performance is measured by the terminal apparatus and the base station apparatus, and reported to higher layer in the network.

The RSRP is provided as a linear average value of the power of the resource elements transmitting the CRS in the carrier frequency and measurement bandwidth (measurement frequency bandwidth) configured in the measurement object configuration. A resource $R_0$ to which the CRS is mapped is used to determine the RSRP. As long as the terminal apparatus can correctly detect that $R_1$ is available, $R_1$ may be used besides $R_0$ for determining the RSRP. Note that $R_0$ represents a CRS resource (resource element) at the antenna port 0, and $R_1$ represents a CRS resource (resource element) at the antenna port 1. The power per a resource element may be determined from an energy received by usable parts of the symbols excluding the CP.

Note that the resource and the radio resource may be used synonymously with the resource element, may be used synonymously with the resource block, or may be the resource element and/or resource block in the subframe/slot and in the bandwidth.

In a case that higher layer indicates the measurement of the RSRP, based on the DS, the terminal apparatus measures the RSRP in the subframes in the configured DS occasion (in the subframes constituting the DS occasion). In a case that the terminal apparatus can correctly detect that the CRS exists in other subframes (i.e., the subframes other than the DS occasion), the terminal apparatus may use the CRS resource elements in those subframes for determine the RSRP. To be more specific, in a case that the CRS in the DS is used to indicate the measurement of the RSRP, the terminal apparatus may measure the RSRP by use of the CRS resource mapped to the subframes in the DS (in the DS occasion) and out of the DS (out of the DS occasion).

A reference point for the RSRP is preferably an antenna connector of the terminal apparatus. In a case that a reception diversity is used by the terminal apparatus, the reported value does not fall below the RSRP corresponding to any of individual diversity branches. The number of resource elements in the measurement bandwidth and measurement period used to measure the RSRP may be determined by the terminal apparatus so long as required measurement accuracy is met. The power per a resource element is determined from an energy received by effective parts of the symbols excluding the CP. A unit of RSRP is dBm or W.

The RSRQ is a power ratio of the RSRP to the RSSI in the number of resource blocks corresponding to the RSSI measurement bandwidth. The RSRP and RSSI measurement bandwidths are constituted of the same set of resource blocks. The RSSI used to compute the RSRQ, and a histogram or the RSSI to be measured and reported may be individually measured.

The RSSI is obtained in a specific OFDM symbol in the measurement bandwidth and measurement subframe, and includes a total receive power linearly averaged. The measurement bandwidth is the number of resource blocks, N, by the terminal apparatus from all sources. All sources may include a serving and non-serving cells of a shared channel, adjacent channel interference, thermal noise, and the like. To be more specific, the RSSI may be measured including the interference power or the noise power.

The RSSI is measured from the OFDM symbol containing a reference symbol for the antenna port 0 in the measurement subframe unless higher layer indicates otherwise. In a case that higher layer indicates that the RSRQ measurement is performed using all the OFDM symbols, the RSSI is measured from all the OFDM symbols in a DL part of the measurement subframe (downlink subframe and DwPTS). In a case that higher layer indicates that the RSRQ measurement is performed using specific OFDM symbols, the RSSI is measured from all the OFDM symbols in the DL part of the indicated subframe (downlink subframe and DwPTS). To be more specific, the OFDM symbol used for the RSSI measurement is determined, based on the indication/configuration from higher layer.

In a case that higher layer indicates the measurement based on the DS, the RSRQ is measured from all the OFDM symbols in the DL part of the subframes in the configured DS occasion. A reference point for the RSRQ is the antenna connector of the terminal apparatus. In a case that the reception diversity is used by the terminal apparatus, the reported value does not fall below the RSRQ corresponding to any of individual diversity branches. A unit of RSRQ is dB.

The RSRP may be referred to as a CSI-RSRP in a case of being performed using the CSI-RS resource. The CSI-RSRP is defined as a linear average value of the power of the resource elements transmitting the CSI-RS in the measurement bandwidth of the subframes in the configured DS occasion. A resource $R_{15}$ (resource at the antenna port 15) to which the CSI-RS is mapped is used to determine the CSI-RSRP. To be more specific, the terminal apparatus, in a case of measuring the CSI-RSRP, measures and linearly averages the power of the resource to which $R_{15}$ is mapped. A reference point of the CSI-RSRP is the antenna connector of the terminal apparatus. In a case that the reception diversity is used by the terminal apparatus, the reported value does not fall below the CSI-RSRP corresponding to any of individual diversity branches. The number of resource elements in the measurement period and measurement bandwidth, the number being used to determine the CSI-RSRP, may be implemented by the terminal apparatus so long as the corresponding measurement accuracy is met. To be more specific, the terminal apparatus may select and measure the resource elements in the measurement period and measurement bandwidth such that the measurement accuracy is met.

In a case that a measurement result in the physical layer (first layer) is output to higher layer, filtering may be made in the physical layer, such as averaging in the frequency direction (of the frequency resource in the measurement bandwidth in one subframe/one slot (or per one resource block)) and/or time averaging in the subframe/slot (of the time resource in the measurement bandwidth in one subframe/one slot). The filtering in the physical layer (first layer) is referred to as a first layer filtering. For example, an average of multiple input values, a weighting average, and an average following the specifying the channel may be applied as the filtering in the physical layer. Furthermore, the measurement result filtered in the physical layer may be further filtered in higher layer (third layer, RRC layer). The filtering in higher layer (third layer) is referred to as a third layer filtering. In the third layer filtering, the measurement results input from the physical layer is computed based on a filter coefficient. The filter coefficient is configured as a higher layer parameter. The filter coefficient may be configured to correspond to each of the RSRP, the RSRQ, and the CSI-RSRP. The filter coefficient may be configured as one of parameters for physical amount configuration. In a case that the higher layer parameter for the RSSI measurement is configured in the terminal apparatus, a filter coefficient for the RSSI may be configured. The filter coefficient for the RSSI may be configured as one of the parameters for the physical amount configuration. The filter coefficient may be referred to as a filtering coefficient.

In the LAA cell, the Listen Before Talk (LBT) may be performed before starting the communication. The LBT is that the base station apparatus and/or the terminal apparatus, before performing the transmission (communication) at a frequency corresponding to the LAA cell, detect the energy (or signal) of the interference power (interference signal, signal from another terminal apparatus/base station apparatus, receive power, received signal, noise power, noise signal) or the like, and determine (identify, detect), based on whether a value of the energy (a power value of the signal) exceeds a prescribed threshold, whether the frequency is in an idle state (empty state (clear state), a non-congested state, a state not occupied by another signal, or a state without another signal existing) or in a busy state (a non-empty state, a congested state, a state occupied by another signal, or a state with another signal existing). In a case that the frequency is determined to be in the idle state, based on the LBT, the base station apparatus or the terminal apparatus belonging to the LAA cell can transmit a signal at a prescribed timing. In a case that the frequency is determined to be in the busy state, based on the LBT, the base station apparatus or the terminal apparatus belonging to the LAA cell does not transmit a signal at a prescribed timing. The measurement relating to the LBT may be referred to as Clear Channel Assessment (CCA). The LBT may be used synonymously with the CCA according to one aspect of the present invention.

Next, an example of the CCA is described.

A first CCA compares the value of the energy detected in a certain measurement duration (duration for performing the LBT and/or CCA) with a prescribed threshold to determine whether the channel (frequency or cell) is clear. The first CCA may be referred to as an Energy Detection (ED) type CCA.

A second CCA determines whether the channel is clear, based on whether the signal to which a prescribed modulation scheme or sequence generation method is applied is detected in a certain measurement duration. The second CCA may be referred to as a Carrier Sense (CS) type CCA.

A third CCA determines whether the channel is clear, based on whether a signal to which a prescribed modulation scheme or sequence generation method (a prescribed decoding and modulation scheme) is applied is detected in a certain measurement duration and whether a value of an energy of the detected signal exceeds a prescribed threshold. The third CCA may be referred to as a hybrid type CCA.

The terminal apparatus and/or base station apparatus belonging to LAA cell, in a case of detecting a signal for the LAA in a certain measurement duration, may determine that the channel is clear to perform the transmission of the signal.

Besides the first CCA to the third CCA described above, provided are Initial CCA (ICCA, LBT category 2, single sensing, Frame-based equipment (FBE)) performing CCA check only the first one time, and Extended CCA (ECCA, LBT category 3 or 4, multiple sensing, Load based equipment (LBE)) performing the CCA check a prescribed times. The ICCA and the ECCA may be used in combination with any of the first CCA to the third CCA. The ICCA and the ECCA indicate a duration for performing the CCA check (i.e., measurement duration), and the first CCA to the third CCA indicate a criterion for determining whether the channel is clear (i.e., threshold, receive power (energy) value). Each of the ICCA and the ECCA may be individually configured/provided with the measurement duration. The ICCA is configured to include one measurement duration, and the ECCA is configured to include multiple measurement durations. One measurement duration may be referred to as one measurement slot. For example, a length (size) of the measurement slot for the ICCA may be 34 microseconds. A length of the measurement slot for the ECCA may be 9 microseconds. In the channel (frequency, cell), a duration for performing the CCA check after a transition from the busy state to the idle state may be referred to as a defer duration. A length of the defer duration may be 34 microseconds. In a case that the terminal apparatus performs the CCA (LBT), which CCA is to be used may be configured from the base station apparatus through higher layer signalling. A duration for performing the CCA check (CCA check duration) may be referred to as an LAA contention window. A size of the contention window may be defined using an ECCA slot. The size of the contention window may be changed via backoff between X and Y ECCA slots. A backoff value may be dynamically or semi-statically changed. To be more specific, the backoff value may be configured as one of the fields in the DCI format, or as a higher layer parameter.

The duration for performing the CCA check may be referred to as a LAA contention window. A size of the contention window may be defined using an ECCA slot. The size of the contention window may be changed via backoff between X and Y ECCA slots. The backoff value may be dynamically or semi-statically changed. To be more specific, the backoff value may be configured as one of the fields in the DCI format, or as a higher layer parameter.

In a case that a certain cell of NX is configured with a parameter for the LBT, the terminal apparatus and/or the base station apparatus perform the channel access procedure based on the LBT before performing the transmission.

Next, an uplink transmit power control method according to the present embodiment will be described.

First, a description is given of Maximum Power Reduction (MPR) and Additional MPR (A-MPR).

The MPR is an adjustment value based on various conditions for maximum transmit power/maximum output power of the terminal apparatus. The MPR may be determined based on the channel bandwidth and/or transmission bandwidth and the modulation scheme (such as QPSK, 16QAM) which are configured for the terminal apparatus. The MPR of the PUSCH for the QPSK is applied to for the PRACH, PUCCH, and SRS transmissions. For each subframe, the MPR is estimated per a slot and given by a maximum value inherited through the transmission of the slot. The maximum value is larger one of estimate values for two slots in the identical subframe. To be more specific, the larger one of the values for two slots is applied to the subframe. In other words, the MPR is estimated per a slot, but larger one of the values for the slots included in the subframe is applied to the subframe. For the inconsecutive resource allocation transmissions in one component carrier, the MPR for the maximum transmit power/maximum output power may be provided in association with the total number of resource blocks simultaneously transmitted in the transmission bandwidth configuration and the channel bandwidth or aggregated bandwidth.

The A-MPR is MPR corresponding to added requirements (Carrier Aggregation (CA), Multiple Input Multiple Output (MIMO), or Dual Connectivity (DC)). For example, the A-MPR corresponds to the added requirements of an Adjacent Channel Leakage Ratio (ACLR) or spectrum emission. Those requirements may be signaled by the network. To be more specific, the A-MPR may be provided based on a network signalling value.

The A-MPR may be determined based on of the component carrier bandwidth and an allocation position of the resource block (frequency position, frequency domain), and the modulation scheme. To be more specific, an A-MPR value may be independently provided depending on the frequency domain even for the same component carrier. For example, the A-MPR value may differ between at the center and end of the bandwidth.

The CA is a scheme that multiple component carriers (serving cells) are aggregated to perform the communication. The CA aggregating the component carriers of different frequencies belonging to the same operating band is referred to as intra-band CA. The CA aggregating the component carriers of different operating bands is referred to as inter-band CA.

The MIMO is a scheme for performing the communication by use of multiple antennas (antenna ports).

For example, the A-MPR corresponding to the network signalling value and the A-MPR corresponding to the subcarrier spacing may be configured independently from each other.

The MPR and the A-MPR may be provided for the serving cell. To be more specific, the MPR and the A-MPR may be configured for each serving cell.

In a case of performing the inter-band CA, a tolerance $\Delta_{IB,c}$ may be provided for each component carrier performing the CA (serving cell).

Power Management MPR (P-MPR) is MPR used to assure a compliance, and applied for each serving cell. For example, the P-MPR is applied in consideration of absorption of electromagnetic energy or unnecessary emission, a dense zone (dense scenario) where transmissions simultaneously occur with multiple RATs, and the like.

The MPR, the A-MPR, and the P-MPR may be provided per a serving cell. The MPR, the A-MPR, and the P-MPR may be provided per an operating band.

Each of the MPR, the A-MPR, and the P-MPR is estimated per a slot, but the largest value in the subframe (i.e., in the slots constituting the subframe) is applied. To be more specific, a value may be applied such that the maximum output power configurable for the terminal apparatus (a total transmit power configurable for the terminal apparatus) becomes smaller.

A maximum output power value may be determined at least based on some or all of information received from the base station apparatus (e.g., system information or RRC message), the MPR, the A-MPR, the P-MPR, and $\Delta_{IB,c}$. The maximum output power value is a value between a lower limit of the maximum output power value and an upper limit of the maximum output power. The lower limit of the maximum output power value may be determined at least based on some or all of information received from the base station apparatus (e.g., system information or RRC message), the MPR, the A-MPR, the P-MPR, and $\Delta_{IB,c}$. The upper limit of the maximum output power value may be determined at least based on some or all of information received from the base station apparatus (e.g., system information or RRC message), the MPR, the A-MPR, the P-MPR, and $\Delta_{IB,c}$.

In the present embodiment, in a case that the terminal apparatus supports multiple types of subcarrier spacings, a subcarrier spacing narrower than 15 kHz (i.e., reduced subcarrier spacing), or a subcarrier spacing wider than 15 kHz (i.e., extended subcarrier spacing), the terminal apparatus transmits capability information indicating the supported subcarrier spacings to the base station apparatus. The base station apparatus configures the frequency and subcarrier spacing corresponding to the operating band used by the terminal apparatus, based on the received capability information and the operating band supported by the terminal apparatus. The terminal apparatus determines the MPR and A-MPR used to configure the uplink transmit power, based on the configured information. At that time, both the A-MPR for the operating band and the A-MPR corresponding to the subcarrier spacing may be determined, or the A-MPR for the subcarrier spacing corresponding to the operating band or configurable in the operating band may be determined. To be more specific, the A-MPR may be determined based on the operating band and/or the subcarrier spacing. The A-MPR may be determined based on at least the network signalling value corresponding to the operating band and/or subcarrier spacing. To be more specific, the maximum output power value of each uplink signal/uplink physical channel may be determined based on at least the operating band, the subcarrier spacing, and/or the network signalling value corresponding to the subcarrier spacing.

To be more specific, in the present embodiment, in a case that the terminal apparatus supports the communication using the physical channel based on a first subcarrier spacing and a second subcarrier spacing, the terminal apparatus transmits the capability information indicating the supported operating band and the supported subcarrier spacing to the base station apparatus. The base station apparatus configures the frequency (carrier frequency) and subcarrier spacing for the operating band which is used by the terminal apparatus, based on the received capability information and the operating band supported by the terminal apparatus. Here, in a case that the operating band is associated with the subcarrier spacing, only the carrier frequency may be configured. The terminal apparatus corrects the maximum output power value for each uplink signal/uplink physical channel, based on the configured information and/or parameter.

For example, in a case that the first subcarrier spacing is 15 kHz that is the same as the subcarrier spacing in LTE, the A-MPR corresponding to the first subcarrier spacing may be provided as 0. In a case that the second subcarrier spacing is a subcarrier spacing different from 15 kHz, the A-MPR corresponding to that subcarrier spacing may be used to set the lower limit of the maximum output power.

Note that the present embodiment describes the case that three subcarrier spacings are supported, but the present embodiment is applicable to a case that more than three subcarrier spacings are supported and also applicable to a case that only one subcarrier spacing is supported.

In a case that in the CA or the Dual Connectivity (DC), the different subcarrier spacings are applied to the different serving cells (component carriers), the A-MPR for the frequency domain in which the resource blocks used for the corresponding component carriers are allocated may be provided based on the network signalling value.

To be more specific, the A-MPR corresponding to the subcarrier spacings may be applied only in a case that multiple serving cells are used for the communication.

The A-MPR corresponding to the subcarrier spacing may be the A-MPR corresponding to the symbol length. To be more specific, the A-MPR corresponding to the symbol length may be determined based on at least the symbol length and/or the network signalling value corresponding to the symbol length. To be more specific, the maximum output power value of each uplink signal/uplink physical channel may be determined based on at least the symbol length and/or the network signalling value corresponding to the symbol length.

The base station apparatus may broadcast information indicating multiple values (e.g., system information or RRC message). The terminal apparatus may select one of multiple values, based on at least the operating band, the symbol length, the network signalling value corresponding to the symbol length, the subcarrier spacing, and/or the network signalling value corresponding to the subcarrier spacing. The terminal apparatus may compute the maximum output power, the lower limit of the maximum output power, and/or the upper limit of the maximum output power, based on at least the selected one value.

The subcarrier spacing providing the resource element corresponds to the symbol length. In a case that the subcarrier spacing is widened, the corresponding symbol length is shortened accordingly. Similarly, in a case that the subcarrier spacing is narrowed, the corresponding symbol length is lengthened. To be more specific, in a case that the number of symbols constituting one subframe and/or one slot is fixed, a subframe length may be varied based on the subcarrier spacing. Furthermore, the length of the added CP may be selectable depending on the symbol length, and the CP length may be selectable depending on a communication environment. In a case that the time length of one subframe and/or one slot is fixed (e.g., 1 ms or 0.5 ms), the number of symbols constituting one subframe and/or one slot may be varied. To be more specific, the subcarrier spacing being widened may shorten any of the slot length/subframe length/radio frame length/TTI length depending on the symbol length corresponding to the subcarrier spacing in some cases. These lengths are related to the time.

In a case that the subframe length or a subframe boundary is fixed to 1 ms, and that the subcarrier spacing or the slot length based on the CP length corresponding to the subcarrier spacing is shortened (i.e., a case that the subcarrier spacing is widened), the number of slots constituting the subframe is varied. For example, in a case that the slot length is 0.25 ms (e.g., the subcarrier spacing is 60 kHz), one subframe includes four slots. In such a case, the A-MPR value applied to the maximum output power of one subframe may be estimated for each slot and the largest value thereof may be adopted. Moreover, in such a case, the terminal apparatus may estimate the A-MPR value which is applied to the maximum output power of one subframe for only a prescribed slot in the subframe, and adopt the largest value in a case of multiple prescribed slots.

In a case that the subframe length or the subframe boundary is configurable (or changeable) based on the subcarrier spacing or the CP length corresponding to the subcarrier spacing, since the configuration of the slots included in the subframe does not change, the terminal apparatus may estimate the A-MPR value which is applied to the maximum output power of a certain subframe for each slot included in the subframe, and adopt the largest value.

The terminal apparatus transmits capability information on the supported subcarrier spacing, and/or capability information on the supported CP length, and/or capability information indicating that an NX operation is supported to the base station apparatus. These pieces of capability information may be associated with each other. For example, the capability information indicating that the NX operation is supported may concurrently indicate the capability information on the subcarrier spacing and the capability information on the CP length. The terminal apparatus may be configured by the base station apparatus with the subcarrier spacing and/or the CP length. These configurations may be made through higher layer signalling. When the subcarrier spacing or the CP length are configured to prescribed values, the terminal apparatus computes the maximum output power which is configurable by the terminal apparatus, based on the A-MPR corresponding to the subcarrier spacing. The A-MPR value applied to the maximum output power may be estimated for all slots included in a certain subframe to adopt the largest value, or the A-MPR value estimated for a prescribed slot may be adopted.

The capability information on the CP length may indicate that the communication can be performed without the CP being added.

The terminal apparatus may limit the number of slots for which the A-MPR value applied to the maximum output power is estimated, based on the number of slots included in the subframe.

Next, a description is given of a case that the terminal apparatus and the base station apparatus (LTE base station apparatus, NX base station apparatus) perform transmission and/or reception by use of the LTE cell and the NX cell (i.e., the cells of different RATs). The LTE cell may be referred to as a cell supporting communication technology/function of LTE or a cell supporting a first RAT, and the NX cell may be referred to as a cell supporting communication technology/function of NX or a cell supporting a second RAT.

In a case that the subcarrier spacing and/or CP length are different between the LTE cell and the NX cell, the subframe boundary or the subframe length may be the same or different. In a case that in the subframe boundary is the same (e.g., 1 ms) between the LTE cell and the NX cell, the number of slots included inside the boundary may be different between the LTE cell and the NX cell.

As an example, a description is given of a case that the subframe length is the same between the LTE cell and the NX cell, and that the number of slots (or symbols) included in the subframe of the NX cell is larger than the number of slots included in the subframe of the LTE cell.

In the above case, in a case that transmission on the PUSCH occurs in the LTE cell at a certain timing (or a certain subframe) and transmission on a channel (shared channel) corresponding to the PUSCH occurs in the NX cell, the terminal apparatus considers the maximum output power configurable for each cell and the maximum output power configurable by the terminal apparatus to set the transmit powers for the respective cells. In a case that a total transmit power in the terminal apparatus (a total of the transmit powers in the LTE cell and NX cell) exceeds the maximum output power configurable by the terminal apparatus, the transmit power of each cell is adjusted/controlled such that the maximum output power configurable by the terminal apparatus is not exceeded.

In the above case also, in a case that transmission on the PUCCH occurs in the LTE cell at a certain timing (or a certain subframe) and transmission on a channel (shared channel) corresponding to the PUSCH occurs in the NX cell, the terminal apparatus considers the control information included in the PUCCH (Uplink Control Information: UCI), the maximum output power configurable for each cell, and the maximum output power configurable by the terminal apparatus to set the transmit powers for the respective cells. In a case that a total of the transmit powers in the respective cells exceeds the maximum output power configurable by the terminal apparatus, it may be determined whether to drop the PUCCH or whether to adjust the transmit power, based on the types of the UCI. For example, in a case that the UCI includes only the Channel State Information (CSI), the terminal apparatus may drop the PUCCH or adjust a transmit power for the PUCCH such that the maximum output power is not exceeded. In a case that the UCI includes the HARQ-ACK (ACK/NACK to the PDSCH or the PDCCH/EPDCCH) and/or the Scheduling Request (SR), the terminal apparatus adjusts a transmit power for the shared channel in the NX cell such that the maximum output power is not exceeded. The HARQ-ACK and the SR may be multiplexed to be transmitted. The HARQ-ACK and the SR may be separately transmitted.

In the above case also, in a case where transmission of the SRS (A-SRS or P-SRS) occurs in the LTE cell at a certain timing (or a certain subframe) and transmission on a channel (shared channel and/or control channel) corresponding to the PUSCH and/or the PUCCH occurs in the NX cell, the terminal apparatus considers the maximum output power configurable for each cell and the maximum output power configurable by the terminal apparatus to set the transmit powers for the respective cells. Whether the maximum output power configurable by the terminal apparatus is exceeded may be determined from only the slot overlapping the SRS symbol. In a case that the total of the transmit powers in the respective cells exceeds the maximum output power configurable by the terminal apparatus, the terminal apparatus may drop the transmission of the SRS.

In the above case also, in a case that the transmission on the PUSCH occurs in the LTE cell on a certain subframe and transmission on at least one channel (control channel) corresponding to the PUCCH occurs in the NX cell, the terminal apparatus considers the maximum output power configurable for each cell and the maximum output power configurable by the terminal apparatus to set the transmit powers for the respective cells. In a case that the total of the transmit powers in the respective cells exceeds the maximum output power configurable by the terminal apparatus, the terminal apparatus may adjust a transmit power for the PUSCH such that the maximum output power is not exceeded, regardless of the control information included in the control channel in the NX cell.

In the above case also, in a case that the transmission on the PUCCH occurs in the LTE cell at a certain timing (or a certain subframe) and transmission on at least one channel (control channel) corresponding to the PUCCH occurs in the NX cell, the terminal apparatus considers the maximum output power configurable for each cell, the maximum output power configurable by the terminal apparatus, and the type of the control information transmitted in each cell to set the transmit powers for the respective cells. In a case that the total of the transmit powers in the respective cells exceeds the maximum output power configurable by the terminal apparatus, the terminal apparatus may drop the control information transmission in the cell with a lower priority level or adjust the transmit power of the cell with a lower priority level such that the maximum output power is not exceeded, based on the type of the control information.

In the above case also, in a case that transmission of the PRACH occurs in the LTE cell at a certain timing (or a certain subframe) and transmission on a channel (shared channel and/or control channel and/or reference signal) corresponding to the PUSCH and/or the PUCCH and/or the SRS occurs in the NX cell, the terminal apparatus allocates a transmit power for the PRACH at the highest priority, and thereafter, sets the transmit powers for the respective cells. In a case that the total transmit power in the respective cells exceeds the maximum output power configurable by the terminal apparatus, the terminal apparatus adjusts the transmit power of the NX cell such that the maximum output power is not exceeded.

In the above case also, in a case that transmission on the PUSCH and/or the PUCCH and/or the SRS occurs in the LTE cell at a certain timing (or a certain subframe) and at least one transmission on a channel (random access channel) corresponding to the PRACH is included in the NX cell, the terminal apparatus allocates a transmit power for the random access channel at the highest priority allocate, and thereafter, sets the transmit powers for the respective cells. In a case that the total transmit power in the respective cells exceeds the maximum output power configurable by the terminal apparatus, the terminal apparatus adjusts the transmit power of the LTE cell such that the maximum output power is not exceeded.

In the above case also, in a case that the transmission on the PUSCH and/or the PUCCH and/or the SRS occurs in the LTE cell at a certain timing (or a certain subframe) and transmission of the reference signal corresponding to the SRS occurs in the NX cell being included in at least one slot, the terminal apparatus allocates the transmit power for other than the reference signal on a priority basis. However, in a case that the reference signal is also used to demodulate the shared channel or control channel in the NX cell, and transmitted together with the shared channel or the control channel, the transmit power the same as for the shared channel or control channel in the NX cell may be set.

In the above case also, in a case that the transmission on the PRACH occurs in the LTE cell at a certain timing (or a certain subframe) and transmission on a channel (random access channel) corresponding to the PRACH is included in at least one slot or subframe in the NX cell, the terminal apparatus may determine, based on that which of the LTE cell and the NX cell is a primary cell, for which cell the transmit power is allocated on a priority basis. To be more specific, in a case that the LTE cell is a primary cell, the transmit power for the LTE cell may be allocated on a priority basis to adjust the transmit power of the NX cell such that the total of the transmit powers in the respective cells does not exceed the maximum output power configurable by the terminal apparatus. In a case that the NX cell is a primary cell, the transmit power for the NX cell may be allocated on a priority basis to adjust the transmit power of the LTE cell such that the total of the transmit powers in the respective cells does not exceed the maximum output power configurable by the terminal apparatus.

To be more specific, in the above case, based on the type of the channel/signal transmitted in the LTE cell and NX cell and the information included in the channel/signal, the terminal apparatus may set the transmit powers for the respective cells such that the maximum output power configurable by the terminal apparatus is not exceeded.

In a case that the terminal apparatus and the base station apparatus communicate using the LTE cell and the NX cell, each of the LTE cell and the NX cell may be configured with a Cell Group (CG). To be more specific, the LTE cell and the NX cell may be operated as the DC. To be more specific, a cell corresponding to a primary cell may be configured for each of the CG of the LTE cell and the CG of the NX cell.

In a case that a subframe length of a cell included in a CG 1 is different from a subframe length of a cell included in a CG 2, and transmission in a subframe $i_1$ of the CG 1 overlaps transmission in a subframe $i_2$-4 to a subframe $i_2$ of the CG 2, in other words, in a case that one subframe of the CG 1 overlaps multiple subframes (here, five subframes) of the CG 2, the terminal apparatus determines a maximum transmit power for the subframe $i_1$, based on the transmit power for the PUCCH/PUSCH/SRS in the subframe the maximum transmit power configurable by the terminal apparatus and the transmit power for the PRACH in the CG 1, and a guaranteed power for the CG 2, or a total power of the transmit power for the PUCCH/PUSCH/SRS in the subframe $i_2$-4 (the physical channel/physical signal corresponding to the PUCCH/PUSCH/SRS) and for the PRACH, or the transmit power for the PRACH in at least one subframe of a subframe $i_2$-3 to the subframe $i_2$ (the physical channel/physical signal corresponding to the PRACH). The CG 1 may include the LTE cell, and the CG 2 may include the NX cell. At this time, a subframe pair for the maximum transmit power (maximum output power) configurable by the terminal apparatus may be any of $(i_1, i_2-4)$, $(i_1, i_2-3)$, $(i_1, i_2-2)$, $(i_1, i_2-1)$, and $(i_1, i_2)$. A lower limit value of the maximum transmit power configurable by the terminal apparatus may be a minimum value of any of the pairs. An upper limit value of the maximum transmit power configurable by the terminal apparatus may be a maximum value of any of the pairs. The subframe pair for the lower limit value and upper limit value of the maximum transmit power configurable by the terminal apparatus may be the subframe pair $(i_1, i_2-4)$ which is firstly overlapped.

The terminal apparatus configures the transmit power for the PUCCH in the subframe $i_1$ of the CG 1 so as not to exceed the maximum transmit power in the CG 1.

In a case that the NX cell performs communicates with assistance from the LTE cell, the LTE cell is the primary cell, and the NX cell is the secondary cell. In this case, a cell (pathlossReferenceCell, pathlossReferenceLinking) referring to a path loss which is used for uplink power control in the uplink for the NX cell may not be configured for the primary cell (i.e., LTE cell). Specifically, the path loss reference cell for the NX cell may be always configured for the secondary cell. However, in a case of the communication in the LTE cell and the NX cell at the same carrier frequency or close carrier frequencies, the path loss reference cell for the NX cell may be configured for the primary cell. Here, the phrase "with assistance from the LTE cell" may mean that the terminal apparatus in the idle mode performs an initial connection establishment procedure/initial access procedure in the LTE cell to establish a connection with the LTE cell, and then, receives the system information or RRC message for the NX cell and the configuration information from the LTE cell, such that the communication can be performed in the NX cell. The phrase "with assistance from the LTE cell" may mean that the terminal apparatus receives the system information for the NX cell in the LTE cell, and performs the initial connection establishment procedure/initial access procedure in the NX cell. The phrase "with assistance from the LTE cell" may mean that the terminal apparatus reports, in the LTE cell, a Radio Link Failure (RLF) for the NX cell. The phrase "with assistance from the LTE cell" may mean that the terminal apparatus reports, in the LTE cell, the measurement result for the NX cell.

In a case that the terminal apparatus can shorten a processing time and/or latency in the NX cell as compared with that in the LTE cell, or can shorten a duration/value set in a HARQ Round Trip Time (RTT) timer in the NX cell as compared with that in the LTE cell, and that transmission occurs at the same timing in the LTE cell and the NX cell, the terminal apparatus may allocate the power on a priority basis to the transmission in the NX cell, and allocate the rest of the power to the LTE cell. In this case, in a case that the transmission in the LTE cell includes the UCI including the HARQ-ACK and/or SR, the terminal apparatus may allocate the power on a priority basis to the LTE cell, and allocate the rest of the power to the NX cell. In this case also, in a case that the transmission in the LTE cell includes the UCI not including the HARQ-ACK and/or SR, in other words, in a case that the HARQ-ACK and/or SR are not included in the LTE cell, the terminal apparatus may allocate the power on a priority basis to the NX cell, and allocate the rest of the power to the LTE cell. Note that in a case that the maximum output power configurable by the terminal apparatus is reached by allocating the power on a priority basis, the terminal apparatus may drop transmission in a cell to which the power is not allocated.

In a case that uplink transmissions simultaneously occur in the LTE cell and the NX cell, the power for the respective cells may be adjusted such that a total of the transmit powers for the LTE cell and NX cell does not exceed the maximum output power configurable by the terminal apparatus.

The HARQ RTT timer is set to provide a duration between a downlink transmission and a transmission of a HARQ feedback associated with the downlink transmission (HARQ-ACK transmission), and a duration between the feedback transmission and a retransmission of the downlink transmission. To be more specific, the HARQ RTT timer is set to provide a duration between the first transmission of the downlink transmission (transmission on the identical transport block for the X-th time) and the retransmission (transmission on the identical transport block for the X+1-th time). For each serving cell, the HARQ RTT timer is set to 8 subframes in a case of a FDD special cell. For each serving cell, the HARQ RTT timer is set to k+4 subframes in a case of a TDD special cell. The parameter k represents an interval between the downlink transmission and the transmission of the HARQ feedback associated with the downlink transmission.

In a case that communications are simultaneously performed by use of the LTE cell and the NX cell, in other words, the cells of different RATs are used to simultaneously perform communications, the terminal apparatus may implicitly adjust the transmit power for the uplink transmission in the LTE cell and the transmit power for the uplink transmission in the NX cell regardless of the type of the physical channel/physical signal on the overlapped portion such that the maximum transmit power/maximum output power configurable by the terminal apparatus is not exceeded. To be more specific, the terminal apparatus may implicitly adjust the power between the different RATs.

The terminal apparatus may configure the guaranteed power for the respective cells of the different RATs such that the maximum output power configurable by the terminal apparatus is not exceeded. The guaranteed power may be configured from the base station apparatus through higher layer signalling or the L1 signalling (control channel).

In this way, the terminal apparatus and the base station apparatus can suitably perform the transmit power control even in a case that the NX cell provided or configured with the subcarrier spacing separately from the LTE cell is introduced.

Next, the uplink power control between multiple NX cells will be described.

A description is given of an uplink power control procedure in the terminal apparatus, in a case that the uplink transmissions (uplink signal (physical channel/physical signal) transmissions) occur at the same timing in a cell 1 (serving cell 1) and a cell 2 (serving cell 2) among multiple NX cells.

First, a description is given of a case that the subcarrier spacings applied to the cell 1 and the cell 2 are the same. A case that the symbol length, the CP length, the TTI length, or the subframe length corresponding to the subcarrier spacing is provided includes a case that these lengths are the same between the cell 1 and the cell 2.

In a case that various physical channels/physical signals allocated to the cell 1 and the cell 2 are multiplexed at least in Frequency Division Multiplex (FDM), the cell 1 and the cell 2 may belong to the same Timing Advance Group (TAG) (i.e., the cell 1 and the cell 2 are synchronized at the transmission timing) or the different TAGs. In a case that various physical channels/physical signals allocated to the cell 1 and the cell 2 are multiplexed in TDM, the cells are preferably synchronized. In a case that the transmissions are synchronized between the cells, in other words, the cells belong to the same TAG, the power control is easy to perform because it is not necessary to consider the same priority level between the cells or a priority level in a case that the same type of physical channels/physical signals overlap. The terminal apparatus recognizes the synchronization within the cells belonging to the same group (same TAG) in accordance with the TAG being configured. In a case that timing adjustment is performed for a certain TAG through a TA command, the terminal apparatus may perform the same timing adjustment for all the cells belonging to the TAG.

In a case that the transmissions of the same type of physical channel/physical signal occur in the cell 1 and the cell 2 at the same timing, in other words, a portion where the transmission in the cell 1 overlaps the transmission in the cell 2 has the same type of physical channel/physical signal, the terminal apparatus determines the uplink transmit powers for the respective cells, based on the parameters for determining the power such as the number of resources (e.g., bandwidths) allocated to the respective cells, the modulation scheme, a correction value for adjusting the power by L1 signalling, a downlink path loss value, and the presence or absence and type of the control information included in the uplink transmission. At this time, in a case that a total of the transmit powers for the portion where the cell 1 overlaps the cell 2 exceeds the maximum transmit power (maximum output power) configurable by the terminal apparatus, the terminal apparatus may adjust (scale) the transmit powers for the respective cells at the same ratio such that the maximum transmit power is not exceeded. In this case also, the transmit powers for the respective cells may be adjusted based on the priority level between the cells. In this case, in a case that there is the physical channel/physical signal multiplexed in at least FDM among various physical channels/physical signals transmitted in the cell 1 and the cell 2, the cell 1 and the cell 2 may belong to the same TAG or the different TAGs. In this case also, in a case that various physical channels/physical signals transmitted in the cell 1 and the cell 2 are multiplexed in TDM, the control is easier in the case that the cell 1 and the cell 2 belong to the same TAG.

In a case that the transmissions of the different types of physical channel/physical signal occur in the cell 1 and the cell 2 at the same timing, in other words, a portion where the transmission in the cell 1 overlaps the transmission in the cell 2 has the different types of physical channel/physical signal, the terminal apparatus determines the uplink transmit powers for the respective cells, based on the parameters for determining the power such as the number of resources (e.g., bandwidths) allocated to the respective cells, the modulation scheme, a correction value for adjusting the power by L1 signalling, a downlink path loss value, and the presence or absence and type of the control information included in the transmission. At this time, in a case that a total of the transmit powers for the overlapped portion of the cell 1 and the cell 2 exceeds the maximum transmit power (maximum output power) configurable by the terminal apparatus, the terminal apparatus adjusts (scales) the transmit powers for the respective cells, based on the priority level between the physical channels/physical signals such that the maximum transmit power is not exceeded. Particularly, in a case that a random access preamble is transmitted in the primary cell, the power may be allocated on a priority basis. Next, in a case the HARQ-ACK to the downlink control channel/data channel (shared channel) is transmitted in the primary cell, the power may be allocated on a priority basis. In this case, in a case that there is the physical channel/physical signal multiplexed in at least FDM among various physical channels/physical signals transmitted in the cell 1 and the cell 2, the cell 1 and the cell 2 may belong to the same TAG or the different TAGs. In this case also, in a case that various physical channels/physical signals transmitted in the cell 1 and the cell 2 are allocated with applying TDM, the cell 1 and the cell 2 may belong to the different TAG.

Next, a description is given of a case that the subcarrier spacings applied to the cell 1 and the cell 2 are different from each other, and the symbol length and/or the TTI length (subframe length) are provided depending on the subcarrier spacing. In this case, the cell 1 and the cell 2 may belong to the same TAG or the different TAGs. Here, the same TAG means that the head symbols in subframes corresponding to the subframe 0 in the cell 1 and the cell 2 are synchronized with each other. The same TAG may indicate that head (forward) boundaries of one TTI in the cell 1 and the cell 2 coincide with each other. Even a slight time difference may be considered as synchronization if a definition is provided.

In a case that transmissions of the same or different types of physical channel/physical signal occur in the cell 1 and the cell 2 at the same timing, in other words, a portion where the transmission in the cell 1 overlaps the transmission in the cell 2 has the same or different types of physical channel/physical signal, the terminal apparatus determines the uplink transmit powers for the respective cells, based on the parameters for determining the power such as the number of frequency resources (e.g., bandwidths, the number of resource blocks, the number of subcarriers) allocated to the respective cells, the modulation scheme, whether multiple antenna ports are used for the transmission, a correction value for adjusting the power by L1 signalling (the control information included in the physical layer signalling and/or the control channel/shared channel), and a downlink path loss value. At this time, in a case that a total of the transmit powers for the overlapped portion of the cell 1 and the cell 2 exceeds the maximum transmit power (maximum output power) configurable by the terminal apparatus, the terminal apparatus may adjust (scale) the transmit powers for the respective cells at the same ratio such that the maximum transmit power is not exceeded. The terminal apparatus may determine the cell to which the power is allocated on a priority basis, based on the number of overlapping random access preambles or the number of control information pieces such as the HARQ-ACK, or based on the type of the cell.

In a case that the subcarrier spacing is different between the cell 1 and the cell 2, and the symbol length or the TTI length (subframe length) are provided depending on the subcarrier spacing, a guaranteed power may be configured for each of the cell 1 and the cell 2. In a case that the guaranteed power is configured, the terminal apparatus may determine the transmit power for the physical channel/physical signal in each cell, based on the maximum transmit power of the cell regardless of the type of the physical channel/physical signal on the overlapped portion. The guaranteed power may indicate a power ratio which can be occupied for a certain cell to the maximum transmit power/maximum output power/total transmit power configurable by the terminal apparatus (i.e., a ratio/proportion occupied by a certain cell to the maximum transmit power of the terminal apparatus), or a maximum value of the power configurable for the cell. In a case that the guaranteed power is configured for one cell, the rest of the power may be allocated to a cell for which the guaranteed power is configured. In a case that the guaranteed power for the cell is not configured, the maximum values of the powers allocatable to the respective cells may be controlled to be equalized depending on the number of cells.

In a case that the subcarrier spacings configured for the cell 1 and the cell 2 are the same, and the TTI lengths (subframe lengths) are the same, and that the uplink transmission in the cell 1 overlaps the uplink transmission in the cell 2, the terminal apparatus may prioritize the uplink transmission in either of the cells, or adjust the transmit powers for the cell 1 and the cell 2 such that the maximum output power is not exceeded, based on the types of the physical channels/physical signals on the overlapped portion and/or the type of the control information included in the uplink transmission.

In the above description, the processing time and/or latency of the terminal apparatus in each of the cell 1 and the cell 2 is identical. To be more specific, a time from when the downlink signal is received until the corresponding uplink signal is transmitted/generated is identical between the cells. The processing time and/or latency in the base station apparatus may be identical between the cell 1 and the cell 2, or may be the same as the processing time and/or latency provided in the terminal apparatus.

Next, a description is given of the uplink power control in a case that the processing time and/or latency in the terminal apparatus (and/or base station apparatus) is different between the cell 1 and the cell 2.

Figure 4A:
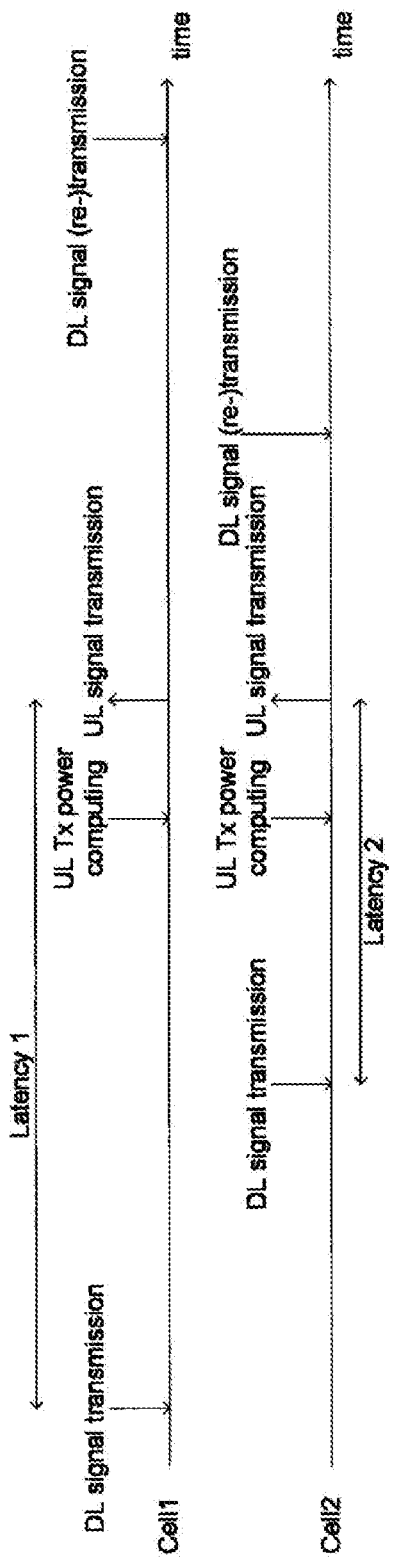
FIGS. 4A and 4B are diagrams illustrating examples of a timing for setting uplink transmit power according to the first embodiment.
Figure 4B:
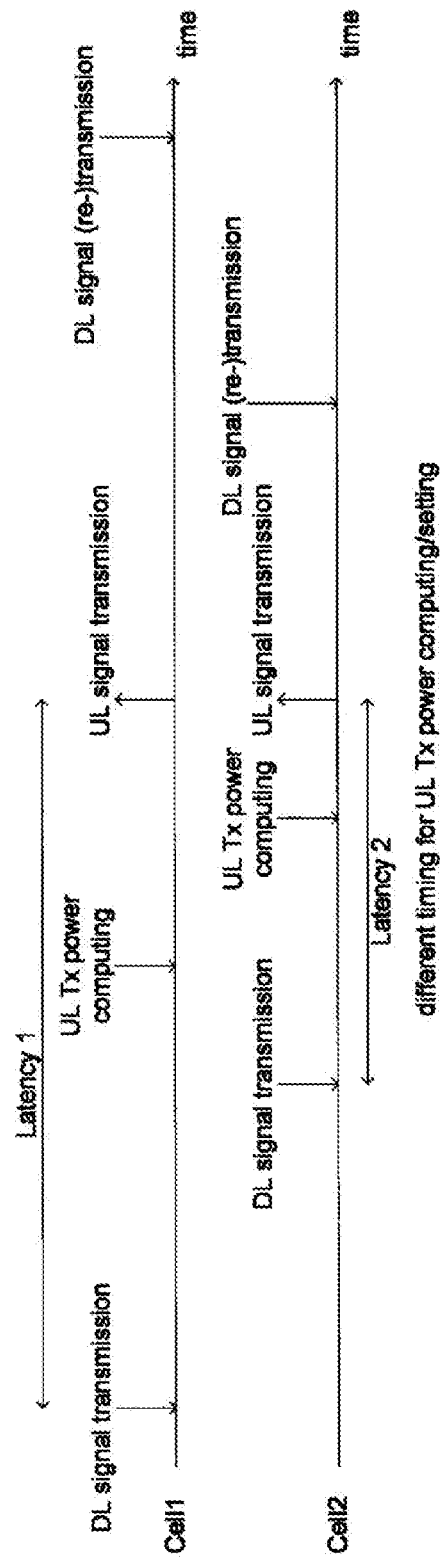

FIGS. 4A and 4B are diagrams illustrating timings for setting the uplink transmit power according to the present embodiment. FIG. 4A illustrates a case that a timing for detecting the downlink signal is different, but a timing for computing and/or setting the uplink transmit power is the same. FIG. 4B illustrates a case that a timing for detecting the downlink signal is different, and a timing for computing and/or setting the uplink transmit power is also different. The downlink signal may include information on the uplink shared channel and/or transmission scheduling (e.g., uplink grant), include information on the downlink shared channel and/or transmission scheduling (e.g., downlink grant), or include information for adjusting the uplink transmit power (e.g., transmit power control command).

In FIGS. 4A and 4B, the uplink transmit power computed by the terminal apparatus may be applied at the time or prior to when the uplink signal is transmitted. The uplink signal may include the HARQ-ACK and/or CSI associated with the downlink signal detected by the terminal apparatus, the SR, or the uplink shared channel and/or control channel. The base station apparatus may retransmit the same transport block (the control channel/shared channel/downlink signal having the same content), based on the detected uplink signal, or transmit a new transport block (the control channel/shared channel/downlink signal having new content). In FIGS. 4A and 4B, a duration from the transmission of the downlink signal until the retransmission of the downlink signal may be provided as a HARQ RTT timer.

In FIGS. 4A and 4B, the processing time and/or latency in each of the cell 1 and the cell 2 may be different from each other. The processing time and/or latency in each cell may be configured from the base station apparatus through the system information, higher layer signalling, or the physical layer signalling (any of L1 signalling to L3 signalling), or provided based on the subcarrier spacing or TTI length provided/configured for cell. Furthermore, the processing time and/or latency in each of the cell 1 and the cell 2 may be provided based on the supported operating band and/or the carrier frequency, provided based on a type of an identifier used for sequence generation of the downlink signal, or provided based on a frequency position to which the downlink signal is allocated.

First, a description is given of a case that the subcarrier spacings applied to the cell 1 and the cell 2 are the same (and the TTI lengths/symbol lengths/subframe lengths are the same).

In a case that the subcarrier spacings applied to the cell 1 and the cell 2 are the same, and the corresponding TTI lengths are also the same, a time required in the terminal apparatus for detecting the downlink signal transmitted from each of the cell 1 and the cell 2 is identical. However, in a case that a time (processing time, latency) from when the downlink signal is detected until the uplink signal is generated/transmitted is different between the cell 1 and the cell 2, and the transmission timings for the uplink transmissions in the cell 1 and the cell 2 overlap, the downlink signals indicating the transmissions are detected at different timings. In the terminal apparatus, in a case that timings for computing and/or setting the transmit powers for the cell 1 and the cell 2 are the same, the transmit power allocated to each of the cell 1 and the cell 2 may be controlled/adjusted, regardless of the timing for detecting the downlink signal, such that the maximum transmit power configurable by the terminal apparatus is not exceeded, based on at least the priority level between the cells, the priority level of the physical channel/physical signal on the overlapped portion, and the priority level associated with the processing time and/or latency in the cell 1 and the cell 2. In a case that the processing time and/or latency is different between the cell 1 and the cell 2, and the uplink transmissions in the respective cells overlap at the same timing, the uplink transmission in the cell which is longer in the processing time/latency may be shifted, or dropped.

In the terminal apparatus, in a case that timings for computing and/or setting the transmit powers for the cell 1 and the cell 2 are different, the terminal apparatus may allocate the power on a priority basis to the cell for which the transmit power is set earlier (the cell 1 in FIG. 4B). However, in a case that a specific signal or control information to transmit with a higher priority level is involved in the cell for which the transmit power is set later (the cell 2 in FIG. 4B), the power allocated to the cell 1 and the cell 2 may be readjusted before the uplink signal for the cell set earlier is transmitted.

Next, a description is given of a case that the subcarrier spacings are different (and the TTI lengths are different) between the cell 1 and the cell 2.

In the terminal apparatus, in a case that the uplink transmissions in the cell 1 and the cell 2 overlap at the same timing, the downlink signals associated with the indication of the transmissions are detected at different timings. However, in the terminal apparatus, in a case that timings for computing and/or setting the transmit powers for the cell 1 and the cell 2 are the same, the transmit powers between the cells can be determined/adjusted/controlled, regardless of the timing for detecting the downlink signal, such that the maximum transmit power configurable by the terminal apparatus is not exceeded, based on the priority level between the cells and the priority level of the physical channel/physical signal on the overlapped portion, or the priority level associated with the processing time and/or latency in the cell 1 and the cell 2. In the terminal apparatus, in a case that timings for setting or computing the transmit powers for the cell 1 and the cell 2 are different, the terminal apparatus may allocate the power on a priority basis to the cell for which the transmit power is set earlier. However, in a case that a specific signal/channel or control information with a higher priority level is involved in the cell for which the transmit power is set later, the power allocated to the specific signal/channel or control information with a higher priority level may be increased when it is before the uplink signal for the cell set earlier is transmitted.

Note that in the case that the subcarrier spacings are different (and the TTI lengths are different) between the cell 1 and the cell 2, the guaranteed power may be configured for at least one cell. In a case that the guaranteed power is not configured, the maximum values of the powers allocatable to the respective cells may be controlled to be equalized depending on the number of cells.

The processing time in the terminal apparatus may be associated with a duration provided by the HARQ RTT (a duration/value set in the HARQ RTT timer). To be more specific, the phrase "the processing time/latency is different in the terminal apparatus" may contain a meaning that the durations provided by the HARQ RTT are different.

Figure 7:
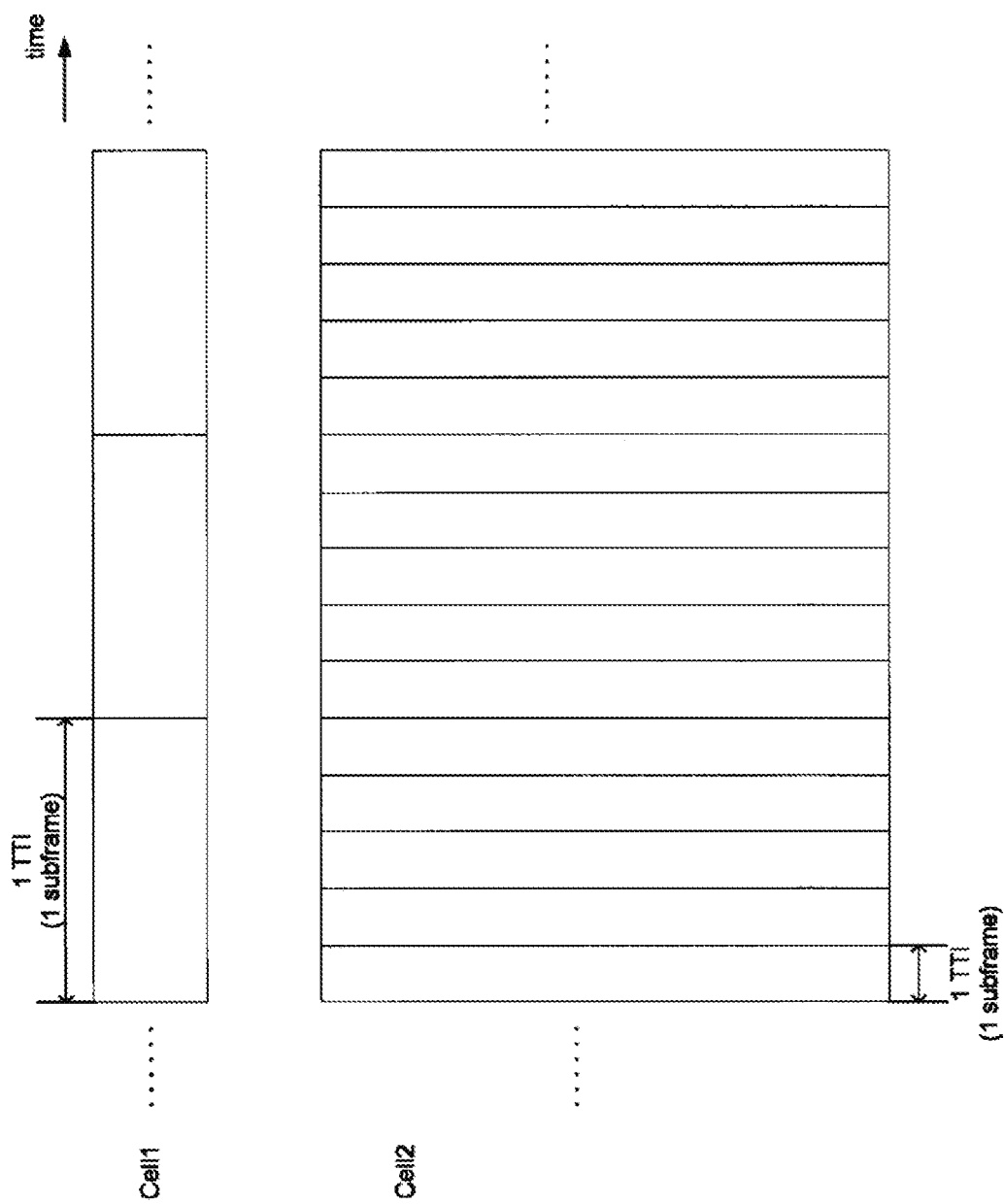
FIG. 7 is a diagram illustrating an example of a case that a TTI length is different between a cell 1 and a cell 2 according to the first embodiment.

FIG. 7 is a diagram illustrating an example of a case that the TTI length (or subframe length) is different between the cell 1 and the cell 2 according to the present embodiment. In a case that the OFDM symbol length is different between the cell 1 and the cell 2, based on the subcarrier spacing, the TTI length may be different accordingly. The number of OFDM symbols included in one TTI may be different between the cell 1 and the cell 2. In each TTI, the control information such as the HARQ-ACK, the SR, and the CSI or the data information (unicast data, user data) may be transmitted. FIG. 7 illustrates a TTI configuration in a case that the subcarrier spacing configured for the cell 2 is made five times the subcarrier spacing configured for the cell 1. In a case that the number of HARQ-ACKs transmitted in one TTI for the cell 1 is the same as the number of HARQ-ACKs transmitted in one TTI for the cell 2, the number of HARQ-ACKs transmitted for a certain duration may be different between the cells in some cases. To be more specific, in the case that the TTI length (or the subframe length) is different between the cell 1 and the cell 2, and transmissions occur in the same duration (for example, one TTI (or subframe) for the cell 1 collides with multiple TTIs (subframes) in the cell 2), the number of HARQ-ACKs transmitted for the duration may be also different for each cell in some cases. In this case, the terminal apparatus may allocate the power on a priority basis to the cell in which a larger number of HARQ-ACKs are transmitted. In this case also, the terminal apparatus may drop or postpone the transmission or shift the transmission timing for the cell in which a smaller number of HARQ-ACKs are transmitted. In a case that the transmission timing is shifted, the terminal apparatus may transmit at a timing later than a timing that the transmissions overlap, or at a timing earlier than the timing that the transmissions overlap when the processing time supported by the terminal apparatus can be shortened. A configuration of the resource for the physical channels/physical signals included in one TTI may be the same as any of those in FIG. 1 to FIG. 3.

As in FIG. 7, in the case that the TTI length is different between the cells, and the transmission in the cell 1 overlaps the transmission in the cell 2 at the same timing, and the L1 signalling is used to adjust the uplink transmit power as in the case of a TPC command in LTE, a power correction value obtained by the TPC command may be based on a power correction value which is applied to a part of the TTI in the cell 2. For example, a power correction value to be applied to the cell 2 may be only a power correction value applied to the head TTI for the cell 2 which overlaps the TTI for the cell 1, or in a case that a total of the transmit powers for the overlapped portion of the cell 1 and the cell 2 exceeds the maximum output power configurable by the terminal apparatus by using the power correction value for the overlapped TTI, the transmit power may be controlled/adjusted such that the maximum output power is not exceeded.

In the case that the processing time and/or latency is different between the cell 1 and the cell 2, and the transmissions overlap at the same timing, the transmission of the cell which is shorter in the processing time and/or latency may be prioritized regardless of the subcarrier spacings corresponding to the respective cells. To be more specific, the terminal apparatus may allocate the power on a priority basis to the transmission of the cell which is shorter in the processing time and/or latency. In this case, the terminal apparatus may drop the transmission or shift the transmission timing in the cell which is longer in the processing time and/or latency.

Next, a description is given of a case that the duration/value set to the HARQ RTT timer is different between the cell 1 and the cell 2.

In the case that, in the cell 1 and the cell 2, the uplink transmissions including the HARQ-ACKs to the downlink transmissions overlap at the same timing, the terminal apparatus may allocate the power on a priority basis to the uplink transmission which is shorter in the duration set to the HARQ RTT timer. To be more specific, the terminal apparatus may allocate the power on a priority basis to the uplink transmission to the cell which is earlier in retransmission of the downlink transmission including the same transport block. At this time, in a case that the transmit power for the cell not prioritized is lower than a prescribed power, the uplink transmission to the cell not prioritized may be dropped, or the transmission timing may be shifted such that a suitable transmit power is allocated.

Even in the case that the subcarrier spacing and/or processing time and/or HARQ RTT timer value which are different between the cell 1 and the cell 2 are configured, the terminal apparatus may determine the transmit powers for the cell 1 and/or cell 2, based on the guaranteed powers in the case that the guaranteed powers for the cell 1 and/or cell 2 are configured through higher layer signalling. Alternatively, the guaranteed power may be configured for each cell group.

In the case that the subcarrier spacing and/or processing time which are different between the cell 1 and the cell 2 are configured, the terminal apparatus may set the HARQ RTT timer value corresponding to each cell. The HARQ RTT timer value may be determined based on the subcarrier spacing and/or the processing time of the terminal apparatus.

In the case of configuring the subcarrier spacing and/or processing time which are different between the cell 1 and the cell 2, the base station apparatus may configure the guaranteed power for at least one cell through higher layer signalling regardless of whether multiple TAGs are configured.

The base station apparatus and/or the terminal apparatus may configure the same cell group (one cell group) of one or more cells in which the same subcarrier spacing and/or TTI length are set.

The base station apparatus and/or the terminal apparatus may configure the same cell group (one cell group) of one or more cells to which the same processing time is applied.

The base station apparatus may configure the guaranteed power for at least one cell through higher layer signalling in the case that the HARQ RTT timers different between the cell 1 and the cell 2 are set in the terminal apparatus.

The base station apparatus and/or the terminal apparatus may configure the same cell group (one cell group) of one or more cells in which the same HARQ RTT timer is set.

To be more specific, in the present embodiment, the cells in which the same subcarrier spacing/processing time/HARQ RTT timer are set may be included in the same cell group.

The present embodiment is described using two cells, the cell 1 and the cell 2, but the transmit power control/transmit power adjustment/transmission control according to the present embodiment may be applied also to a case that more than two cells are configured.

The present embodiment is described using two cells, the cell 1 and the cell 2, but may be similarly applied to a case that, in one cell, any of communication using a different RAT/communication to which a different subcarrier spacing is applied/communication to which a different processing time and/or latency is applied/communication for which a different HARQ RTT timer value is configured is performed. To be more specific, the transmit power control/transmit power adjustment/transmission control according to the present embodiment may be applied also in one terminal apparatus to, in one cell, or a case that the transmissions of the physical channel/physical signal corresponding to each of the different RATs collide/overlap, or a case that the transmissions of the physical channel/physical signal to which a different subcarrier spacing is applied collide/overlap, or a case that the transmissions of the physical channel/physical signal to which a different processing time and/or latency is applied collide/overlap, or a case that the transmissions of the physical channel/physical signal for which a different HARQ RTT timer value is configured collide/overlap.

In the case that the RAT is different between the cell 1 and the cell 2, the transmit powers for the respective cells may be adjusted/controlled such that the maximum output power configurable by the terminal apparatus is not exceeded, and in the case that the uplink transmissions occur at the same timing between the cells within the same RAT, the transmit powers for the respective transmissions may be adjusted/controlled based on the priority level.

In this way, changing the transmit power control, based on any of the subcarrier spacing, the processing time/latency, the duration (value) set in the HARQ RTT timer which are configured/provided for the cell 1 and the cell 2, allows the communication suitable for the corresponding service.

A communicable range (communication area) at each frequency controlled by the base station apparatus is regarded as a cell. Here, the communication area covered by the base station apparatus may be different in size and shape for each frequency. Moreover, the covered area may be different for each frequency. A radio network, in which cells having different types of base station apparatuses or different cell radii are located in a mixed manner in the area with the same frequency and/or different frequencies to form a single communication system, is referred to as a heterogeneous network.

The terminal apparatus has no connection with any network, for example, immediately after being powered on (e.g., upon activation). Such a state with no connection is referred to as an idle mode (RRC_IDLE). To perform communication, the terminal apparatus in the idle mode needs to establish a connection with any network. That is, the terminal apparatus needs to be in the connected mode (RRC_CONNECTED). Here, a network may include a base station apparatus, an access point, a network server, a modem, and the like that belong to the network.

Then, to perform communication, the terminal apparatus in the idle mode needs to perform a Public Land Mobile Network (PLMN) selection, a cell selection/re-selection, a location registration, and a manual selection of a Closed Subscriber Group (CSG) cell, for example.

When the terminal apparatus is powered on, a PLMN is selected by a Non-Access Stratum (NAS). For the selected PLMN, an associated Radio Access Technology (RAT) is set. The NAS provides a list of corresponding PLMNs, if available, so that an access stratum (AS) uses the list for a cell selection/re-selection.

In the cell selection, the terminal apparatus searches for a suitable cell in the selected PLMN, and selects a cell (a serving cell) that provides available services. Furthermore, the terminal apparatus tunes to its control channel. Such a selection is referred to as camp on a cell.

The terminal apparatus, when necessary, registers its presence (information on a selected cell or information on a tracking area) in the tracking area of the selected cell, as an outcome of a successful location registration by which the selected PLMN becomes a registered PLMN, by using a NAS registration procedure.

When finding a more suitable cell, the terminal apparatus re-selects the cell according to cell re-selection criteria, and camps on the cell. Unless a new cell is included in the tracking area in which the terminal apparatus is registered, a location registration for the new cell is performed.

When necessary, the terminal apparatus searches for a PLMN with a higher priority at regular time intervals, and searches for a suitable cell when another PLMN is selected by the NAS.

Searching for available CSGs may be triggered by the NAS to support a manual CSG selection.

When being out of a coverage area of the registered PLMN, the terminal apparatus may allow a user to configure either automatic selection (automatic mode) of a new PLMN or manual selection (manual mode) of manually selecting which PLMNs are available. However, for receiving a service that does not need a registration, the terminal apparatus may not necessarily perform such a registration.

The following (A1) to (A5) can be mentioned as purposes of a terminal apparatus in an idle mode to camp on a cell.

(A1) The terminal apparatus is enabled to receive system information from a PLMN (or EUTRAN).

(A2) When the terminal apparatus is registered and attempts to establish an RRC connection, the terminal apparatus performs an initial access to the network using the control channel of the cell on which the terminal apparatus camps.

(A3) When the PLMN receives a call for the registered terminal apparatus, the PLMN learns a set of tracking areas on which the terminal apparatus camps (i.e., camped cells). The PLMN then can transmit a paging message to the terminal apparatus on control channels of all the cells in such a set of tracking areas. Then, since the terminal apparatus then tunes to the control channel of one of the cells in the registered tracking areas, the terminal apparatus is capable of receiving the paging message and responding to the control channel.

(A4) The terminal apparatus is enabled to receive notifications of Earthquake and Tsunami Warning System (ETWS) and Commercial Mobile Alter System (CMAS).

(A5) The terminal apparatus is enabled to receive Multimedia Broadcast-Multicast Services (MBMSs).

When the terminal apparatus is unable to find a suitable cell to camp on or the location registration fails, the terminal apparatus attempts to camp on a cell, regardless of the PLMN identifier, and becomes a "limited service" state. Here, a limited service includes an emergency call, the ETWS, and the CMAS, in a cell satisfying a certain condition. On the other hand, a normal service is provided for public use in a suitable cell. An operator-specific service and the like are also provided.

When the NAS indicates the start of a Power Saving Mode (PSM), an Access Stratum (AS) configuration is maintained and all the timers in operation continue to operate, but the terminal apparatus may not perform an idle mode task (e.g., a PLMN selection, a cell selection/re-selection, and the like). When a certain timer expires with the terminal apparatus being in the PSM, whether the last process at the end of the PSM is to be performed or a corresponding process is to be immediately performed depends on an implementation of the terminal apparatus. When the NAS indicates the end of the PSM, the terminal apparatus performs all the idle mode tasks.

The terminal apparatus operates by regarding the inside of a cell as a communication area. When the terminal apparatus moves from a cell to another cell, the terminal apparatus moves to another suitable cell through a cell selection/re-selection procedure at the time of having no connection (in RRC_IDLE, in an idle mode, in no communication) or through a handover procedure at the time of having a connection (in RRC_CONNECTED, in a connected mode, in communication). A suitable cell in general indicates a cell that is determined that access from the terminal apparatus is not prohibited based on information specified by the base station apparatus, and that has a downlink reception quality satisfying a predefined condition.

In a PLMN selection, the terminal apparatus reports available PLMNs to the NAS, in accordance with a request from the NAS or autonomously. During the PLMN selection, a specific PLMN can be selected either automatically or manually, based on a list of PLMN identifiers in priority. Each PLMN in the list of PLMN identifiers is identified by a PLMN identifier. In system information on a broadcast channel, the terminal apparatus can receive one or more PLMN identifiers in a given cell. The result of PLMN selection performed by the NAS may be indicated by an identifier of the selected PLMN.

In response to the request from the NAS, the AS searches for available PLMNs and reports the available PLMNs to the NAS.

For the EUTRA, to find available PLMNs, the terminal apparatus scans all RF channels in a EUTRA operating band corresponding to the capability information on the terminal apparatus. In each carrier (component carrier), the terminal apparatus searches for the strongest cell and reads the system information to find a PLMN, to which the cell belongs. The terminal apparatus can read one or some PLMN identifiers in the strongest cell, and each PLMN that has been found is reported to the NAS, as a PLMN having a higher quality. Note that a criterion for the PLMN having a higher quality includes a case where an RSRP value measured of an EUTRA cell is equal to or higher than a predefined value (e.g., −110 dBm). Here, the strongest cell means, a cell indicating the best (highest) value in the measurement value of RSRP or RSRQ, for example. That is, the strongest cell can be a most suitable cell in the communication of the terminal apparatus.

Although the PLMN that has been found does not satisfy the criterion, when readable, a PLMN identifier is reported together with an RSRP value to the NAS. The measurement values reported to the NAS are the same as each PLMN found in a single cell.

Search for PLMNs can be stopped by a request from the NAS. The terminal apparatus may optimize the PLMN search by using the stored information (e.g., information on a carrier frequency and cell parameter from reception measurement control information elements, and the like).

Once the terminal apparatus selects a PLMN, the cell selection procedure is performed to select a suitable cell, of the PLMN, on which the terminal apparatus camps.

In a case where a CSG-ID is provided by the NAS, as a part of the PLMN selection, the terminal apparatus searches for an acceptable or suitable cell belonging to the provided CSG-ID to camp on the cell. When the terminal apparatus no longer camps on a cell of the provided CSG-ID, the AS informs the NAS of such information.

In the cell selection/re-selection, the terminal apparatus performs measurements for the cell selection/re-selection.

The NAS can control the RAT in which the cell selection is performed, by indicating the RAT associated with the selected PLMN or by maintaining a list of prohibited registration areas and a list of equivalent PLMNs, for example. The terminal apparatus selects a suitable cell, based on idle mode measurements and the cell selection criterion.

To accelerate the cell selection process, the information stored for some RATs may be utilized in the terminal apparatus.

When a terminal apparatus camps on a cell, the terminal apparatus searches for a better cell according to the cell re-selection criterion. When a better cell is found, such a cell is selected. A cell change may imply a change of a RAT. Here, a better cell denotes a cell more suitable for communication. For example, the better cell means a cell having a higher communication quality (e.g., good results in measurement values of RSRP and RSRQ compared between the cells).

When the cell selection/re-selection is changed in the received system information on the NAS, information is supplied to the NAS.

In a normal service, the terminal apparatus camps on a suitable cell and tunes to the control channel of the cell. This allows the terminal apparatus to receive the system information from the PLMN. Furthermore, the terminal apparatus can receive, from the PLMN, registration area information such as tracking area information. Furthermore, the terminal apparatus can receive NAS information from another AS. After the registration, the terminal apparatus can receive the paging and notification messages from the PLMN. Moreover, the terminal apparatus can initiate a transition to the connected mode.

The terminal apparatus uses one of the two cell selection procedures. Initial cell selection demands no preliminary knowledge (stored information) that an RF channel serves as an EUTRA carrier. To find a suitable cell, the terminal apparatus scans all RF channels in the EUTRA operating bands in accordance with the capability information on the terminal apparatus. On each carrier frequency, the terminal apparatus demands only searching for the strongest cell. As soon as a suitable cell is found, such a cell is selected.

Stored information cell selection needs stored information on a carrier frequency from previously received measurement control information elements or from previously detected cells, and optionally further needs information on a cell parameter. As soon as the terminal apparatus finds a suitable cell, the terminal apparatus selects such a cell. When no suitable cell is found, the initial cell selection procedure is started.

In addition to the normal cell selection, a manual selection of CSGs is supported by the terminal apparatus, in accordance with a request from a higher layer.

Clear priorities of different EUTRAN frequencies or inter-RAT frequencies may be provided to the terminal apparatus in the system information (e.g., an RRC connection release message), or by inheriting from another RAT at inter-RAT cell (re)selection. In the case of system information, a EUTRAN frequency or an inter-RAT frequency is listed without the provision of a priority.

When the priorities are provided in dedicated signalling, the terminal apparatus ignores all the priorities provided in the system information. When the terminal apparatus is in a state of camping on any cell, the terminal apparatus only applies the priorities provided in the system information from a current cell (currently connected cell). The terminal apparatus holds the priorities provided by the dedicated signalling or by the RRC connection release message, unless otherwise specified.

The terminal apparatus in the idle mode can synchronize time and frequency of a cell with the PSS/SSS, and can decode the PSS/SSS to acquire a cell ID of the cell. The terminal apparatus can estimate a frequency position of the CRS by using the cell ID, and can perform an RSRP/RSRQ measurement.

Note that EUTRAN measurements include a measurement by the terminal apparatus in the connected mode. The terminal apparatus performs the EUTRAN measurements at a proper measurement gap and is in synchronization with the cell in which the EUTRAN measurements are performed. The EUTRAN measurements include an intra-frequency RSRP/RSRQ, an inter-frequency RSRP/RSRQ, a time difference between reception and transmission by the terminal apparatus, a time difference between reference signals (RSTD), signals used for positioning of the terminal apparatus, an inter-RAT (EUTRAN-GERAN/UTRAN) measurement, and an inter-system (EUTRAN-non 3GPP RAT) measurement. The EUTRAN measurements are defined as a physical layer measurement. The EUTRAN measurements are used for supporting the mobility.

The terminal apparatus in the idle mode and the terminal apparatus in the connected mode performs a cell search and captures time and frequency synchronization with a cell to detect a PCI of the cell. The EUTRA cell search supports transmission bandwidth capable of enhancing to correspond to 6 resource blocks or more.

The PSS/SSS and/or the synchronization signal corresponding to the PSS/SSS are transmitted in the downlink for the cell search. That is, the terminal apparatus performs the cell search by using the PSS/SSS and/or the synchronization signal corresponding to the PSS/SSS. The terminal apparatus assumes that antenna ports 0 to 3 and the PSS/SSS and/or the synchronization signal corresponding to the PSS/SSS in the serving cell are Quasi Co-Located (Quasi Co-Location: QCL) to a Doppler shift and average delay.

The neighboring cell search is performed based on the downlink signal identical to the signal in the initial cell search.

The RSRP measurement is performed based on a reference signal/pilot signal corresponding to a CRS or a CSI-RS of the configured Discovery Signal (DS).

In a case where the terminal apparatus in a normal camping state has an individual priority other than the priority for the current frequency, the terminal apparatus regards the current frequency as a lower priority frequency (i.e., lower than any of the configured values of 8 networks).

While the terminal apparatus is camping on a suitable CSG cell, the terminal apparatus always regards the current frequency as a higher priority frequency (i.e., higher than any of the configured values of 8 networks) regardless of any other priority values allocated to the current frequency.

When the terminal apparatus becomes the RRC_CONNECTED state, when a timer (T320) for an optional validity time of a dedicated priority expires, or when a PLMN selection is performed by request from the NAS, the terminal apparatus deletes the priority provided by the dedicated signalling.

The terminal apparatus simply performs a cell re-selection estimation on EUTRAN frequencies or inter-RAT frequencies that are given in the system information and for which the terminal apparatus has a provided priority.

The terminal apparatus does not consider any blacklisted cell as a candidate for a cell re-selection.

The terminal apparatus succeeds the priorities provided by the dedicated signalling and the continuing validity time.

In a case that the terminal apparatus supports a manual CSG selection, the AS scans all RF channels in the EUTRA operating bands corresponding to the capability information to search for available CSGs in response to a request from the NAS. On each carrier, the terminal apparatus searches for the strongest cell at least, reads the system information of the cell, and reports, to the NAS, an available CSG-ID together with the PLMN and a "Home Node B (HNB) name" (if broadcast).

In a case that the NAS selects a CSG and provides such a selection to the AS, the terminal apparatus searches for an acceptable or suitable cell satisfying a condition for belonging to the selected CSG to camp on.

In addition to the normal cell re-selection, in a case that at least one CSG-ID associated with a PLMN identifier is included in a CSG whitelist of the terminal apparatus, the terminal apparatus may use an autonomous search function in accordance with performance requirements to detect at least previously visited (accessed) CSG member cells on non-serving frequencies and inter-RAT frequencies. To search for cells, the terminal apparatus may further use an autonomous search function on the serving frequency. When the CSG whitelist of the terminal apparatus is empty, the terminal apparatus disables the autonomous search function for CSG cells. Here, the autonomous search function on each terminal apparatus implementation determines when and where to search for CSG member cells.

When the terminal apparatus detects one or more suitable CSG cells on different frequencies and the related CSG cell is the highest ranked cell on that frequency, the terminal apparatus re-selects one of the detected cells irrespective of the frequency priority of the cell on which the terminal apparatus is currently camping.

When the terminal apparatus detects a suitable CSG cell on the same frequency, the terminal apparatus re-selects such a cell in accordance with the normal cell re-selection rule.

When the terminal apparatus detects one or more CSG cells on another RAT, the terminal apparatus re-selects one of those cells in accordance with a specific rule.

While camping on a suitable CSG cell, the terminal apparatus applies the normal cell re-selection.

To search for suitable CSG cells on non-serving frequencies, the terminal apparatus may use the autonomous search function. When the terminal apparatus detects a CSG cell on a non-serving frequency and the detected CSG cell is the highest ranked cell on the frequency, the terminal apparatus may re-select the detected CSG cell.

When the terminal apparatus detects one or more CSG cells on another RAT and such one or more CSG cells are allowed in accordance with a specific rule, the terminal apparatus may re-select one of those CSG cells.

In addition to normal cell re-selection rules, the terminal apparatus uses the autonomous search function for detecting at least a previously visited hybrid cell included in the CSG whitelist, in which a CSG ID and an associated PLMN identifier meet performance requirements. The terminal apparatus treats the detected hybrid cell as a CSG cell, in a case where the CSG ID and the associated PLMN identifier of the hybrid cell are included in the CSG whitelist, and also treats other cells as normal cells.

In the normally camping state, the terminal apparatus performs the following tasks (B1) to (B4).

(B1) The terminal apparatus selects and monitors an indicated paging channel of the cell in accordance with the information transmitted in the system information.

(B2) The terminal apparatus monitors relevant system information.

(B3) The terminal apparatus performs necessary measurements for a cell re-selection estimation procedure.

(B4) The terminal apparatus performs the cell re-selection estimation procedure, in accordance with an internal trigger of the terminal apparatus and/or when information on the Broadcast Control Channel (BCCH) used for the cell re-selection estimation procedure is modified.

After a transition from the connected mode to the idle mode, in a case where information on a redirected carrier (redirectedCarrierinfo) is included in an RRC connection release message, the terminal apparatus attempts to camp on a suitable cell in accordance with the information. When the terminal apparatus fails to find a suitable cell, the terminal apparatus is allowed to camp on any suitable cell of the indicated RAT. Unless the RRC connection release message includes the information on the redirected carrier, the terminal apparatus attempts to select a suitable cell on a EUTRA carrier. When no suitable cell is found, the terminal apparatus starts a cell selection by using the stored information cell selection procedure to search for a suitable cell to camp on.

After the terminal apparatus transitions to a connected mode from a state of camping on any cell and the terminal apparatus is re-adjusted to an idle mode, when the information relating to a redirected carrier is included in the RRC connection release message, the terminal apparatus attempts to camp on an acceptable cell in accordance with the information on such a redirected carrier. Unless the RRC connection release message includes the information on the redirected carrier, the terminal apparatus attempts to select an acceptable cell on the EUTRA carrier. When the terminal apparatus fails to find an acceptable cell, the terminal apparatus is continuously searching for an acceptable cell of any PLMN, in any one of cell selection states. In any one of the cell selection states, the terminal apparatus that is not camping on any cell stay in this state until the terminal apparatus finds an acceptable cell.

In a state of camping on any cell, the terminal apparatus performs the following tasks (C1) to (C6).

(C1) In accordance with the information transmitted in the system information, the terminal apparatus selects and monitors an indicated paging channel of the cell.

(C2) The terminal apparatus monitors relevant system information.

(C3) The terminal apparatus performs necessary measurements for the cell re-selection estimation procedure.

(C4) The terminal apparatus performs the cell re-selection estimation procedure when an internal trigger of the terminal apparatus occurs and/or when information on the Broadcast Control Channel (BCCH) used for the cell re-selection estimation procedure is modified.

(C5) The terminal apparatus regularly tries all the frequencies of all RATs supported by the terminal apparatus to find a suitable cell. When a suitable cell is found, the terminal apparatus transitions to the normally camping state.

(C6) In a case that the terminal apparatus supports a voice service, but the current cell does not support an emergency call as indicated by the system information, and no suitable cell is found, the terminal apparatus performs a cell selection/re-selection to an acceptable cell of any supported RAT, regardless of the priorities provided in the system information from the current cell.

To prevent camping on a cell in which the terminal apparatus is not capable of starting an IP Multimedia Subsystem (IMS) emergency call, the terminal apparatus allows not to perform a re-selection of an EUTRAN cell within the frequency.

After the terminal apparatus performs a PLMN selection and a cell selection, the terminal apparatus camps on the cell. Accordingly, the terminal apparatus becomes capable of receiving paging information and system information such as an MIB and an SIB 1, regardless of the state of the terminal apparatus (RRC_IDLE (idle mode), RRC_CONNECTED (connected mode)). By performing random access, the terminal apparatus can transmit an RRC connection request.

In the random access procedure in the terminal apparatus in the idle mode, a higher layer (L2/L3) instructs random access preamble transmission. A physical layer (L1) transmits the random access preamble in accordance with the instruction. In the L1, ACK, which is a random access response, is received from a base station apparatus. L2/L3 receives the instruction from the L1, and then the L2/L3 instructs the L1 to transmit an RRC connection request. The terminal apparatus transmits, to the base station apparatus (a cell on which the terminal apparatus camps, EUTRAN, PLMN), an RRC connection request (PUSCH corresponding to a UL-SCH to which an RRC message associated with the RRC connection request is mapped). Upon receiving the RRC connection request, the base station apparatus transmits, to the terminal apparatus, an RRC connection setup (a control signal corresponding to PDCCH associated with a DL-SCH to which an RRC message associated with the RRC connection setup is mapped, and a data signal corresponding to PDSCH). Upon receiving the RRC connection setup on the L2/L3, the terminal apparatus enters the connected mode. The L2/L3 of the terminal apparatus instructs the L1 to transmit an RRC connection setup complete, and the procedure ends. The L1 transmits, to the base station apparatus, the RRC connection setup complete (PUSCH corresponding to a UL-SCH to which an RRC message associated with the RRC connection set-up completion is mapped).

In the case that the communication can be performed in a standalone manner in the NX cell, the terminal apparatus in the idle mode may perform the random access procedure equivalent to the above description before a transition to the connected mode.

To reduce the power consumption, the terminal apparatus in the idle mode may receive a paging message by utilizing Discontinuous Reception (DRX). Here, a Paging Occasion (PO) serves as a subframe including a P-RNTI, in which a control signal corresponding to a PDCCH to address to a paging message is transmitted. A Paging Frame (PF) is a radio frame including one or multiple POs. While the DRX is being utilized, the terminal apparatus needs to monitor one PO at every DRX cycle. The PO and PF are determined by using a DRX parameter provided in the system information. When a value of the DRX parameter is changed in the system information, a DRX parameter stored in the terminal apparatus is updated locally. Unless the terminal apparatus has an International Mobile Subscriber Identity (IMSI), for performing an emergency call without a Universal Subscriber Identity Module (USIM), the terminal apparatus uses a default identifier (UE_ID=0) and i_s in the PF. That is, the paging information (PCH) is notified by using a PDCCH in a prescribed subframe of a prescribed radio frame.

The terminal apparatus camping on a cell captures time frequency synchronization from the synchronization signal corresponding to the PSS/SSS, and acquires the PCI. Subsequently, the terminal apparatus detects broadcast information corresponding to a MIB from broadcast information corresponding to the PBCH and acquires the carrier frequency, the downlink transmission bandwidth, the SFN, the PHICH configuration, and the like. By acquiring the MIB, the terminal apparatus is enabled to monitor a control signal corresponding to the PDCCH mapped to the whole downlink transmission bandwidth. In a case that the received PDCCH involves the CRC scrambled with the SI-RNTI, the terminal apparatus acquires an SI message such as the SIB 1 from the PDSCH corresponding to the received PDCCH. By acquiring these SI messages, the terminal apparatus is enabled to acquire information related to configurations for the physical channel/physical signal and information related to a cell selection and the like. Further, in a case that the PDCCH involves the CRC scrambled with the P-RNTI, the terminal apparatus can detect the PCH in the PDSCH corresponding to the received PDCCH to acquire the paging information. The terminal apparatus performs an initial access in the random access procedure, in a case of a transition from the idle mode to the connected mode. By performing the initial access, the base station apparatus is enabled to acquire information of the terminal apparatus. After completion of the initial access, the terminal apparatus and the base station apparatus can establish the RRC connection. Upon establishing the RRC connection, the terminal apparatus transitions to the connected mode. Further, once the terminal apparatus becomes capable of monitoring the PDCCH, the terminal apparatus periodically checks whether the terminal apparatus is in or out of synchronization by using the PDCCH. In a case that out of synchronization is determined, the terminal apparatus notifies the determination to a higher layer. Upon receiving the notification, the higher layer determines the occurrence of Radio Link Failure (RLF) in the cell.

The terminal apparatus may determine whether the synchronization is established by using the control channel also in the NX cell as described above.

The terminal apparatus and the base station apparatus may employ a technique for aggregating the frequencies (component carriers or frequency bands) of multiple different frequency bands through CA and treating the aggregated frequencies as a single frequency (frequency band). A component carrier includes an uplink component carrier corresponding to the uplink (uplink cell) and a downlink component carrier corresponding to the downlink (downlink cell). In each embodiment of the present invention, "frequency" and "frequency band" may be used synonymously.

For example, in a case that each of five component carriers having frequency bandwidths of 20 MHz are aggregated through CA, a terminal apparatus capable of performing CA may perform transmission and/or reception by assuming that the aggregated carriers have a frequency bandwidth of 100 MHz. Note that component carriers to be aggregated may have contiguous frequencies or partially discontiguous frequencies. For example, assuming that available frequency bands include an 800 MHz band, a 2 GHz band, and a 3.5 GHz band, a component carrier may be transmitted in the 800 MHz band, another component carrier may be transmitted in the 2 GHz band, and yet another component carrier may be transmitted in the 3.5 GHz band. The terminal apparatus and/or the base station apparatus may use the component carriers belonging to the operating bands thereof (component carriers corresponding to the cells) to perform simultaneously transmission and/or reception.

It is also possible to aggregate multiple contiguous or discontiguous component carriers of the same frequency bands. The frequency bandwidth of each component carrier may be narrower (e.g., 5 MHz or 10 MHz) than the receivable frequency bandwidth (e.g., 20 MHz) of the terminal apparatus, and the frequency bandwidth of component carriers to be aggregated may be different from each other. The terminal apparatus and/or base station apparatus having the function for NX may support both a cell having backward compatibility with the LTE cell and a cell not having backward compatibility with the LTE cell.

Moreover, the terminal apparatus and/or base station apparatus having the function for NX may aggregate multiple component carriers (carrier types, cells) not having the backward compatibility with LTE. Note that the number of uplink component carriers to be allocated to (configured for or added to) the terminal apparatus by the base station apparatus may be the same as or fewer than the number of downlink component carriers.

A cell constituted by an uplink component carrier in which an uplink control channel is configured for a radio resource request and a downlink component carrier having a cell-specific connection with the uplink component carrier is referred to as a PCell. A cell constituted by component carriers other than the component carriers of the PCell is referred to as an SCell. The terminal apparatus receives a paging message, detects update of broadcast information, carries out an initial access procedure, configures security information, and the like in a PCell, and may not necessarily perform these operations in the SCell.

The PCell is not a target of Activation and Deactivation control (in other words, regarded as being always activated), whereas the SCell has activated and deactivated states, the change of which is explicitly specified by the base station apparatus or is made based on a timer configured for the terminal apparatus for each component carrier. A PCell and an SCell are collectively referred to as a serving cell.

The terminal apparatus and/or base station apparatus supporting both the LTE cell and the NX cell may constitute a cell group of the LTE cell and a cell group for the NX cell, in a case of communication using the LTE cell and the NX cell. To be more specific, each of the cell group of the LTE cell and the cell group for the NX cell may include a cell corresponding to the PCell.

The CA achieves communication using multiple component carriers (frequency bands) using multiple cells, and is also referred to as cell aggregation. The terminal apparatus may have a radio connection (RRC connection) with the base station apparatus via a relay station device (or a repeater) for each frequency. In other words, the base station apparatus in the present embodiment may be replaced with a relay station device.

The base station apparatus manages a cell, which corresponds to an area where terminal apparatuses can communicate with the base station apparatus, for each frequency. A single base station apparatus may manage multiple cells. The cells are classified into multiple types of cells depending on the size of the area (cell size) that allows for communication with the terminal apparatuses. For example, the cells are classified into macro cells and small cells. Moreover, the small cells are classified into femto cells, pico cells, and nano cells depending on the size of the area. When the terminal apparatus is capable of communicating with a certain base station apparatus, a cell configured to be used for the communication with the terminal apparatus is referred to as a serving cell, while the other cells that are not used for the communication are referred to as neighboring cells, among the cells of the base station apparatus.

In other words, in CA, multiple serving cells thus configured include one PCell and one or multiple SCells.

The PCell is a serving cell, in which an initial connection establishment procedure (RRC Connection establishment procedure) has been performed, in which a connection re-establishment procedure (RRC Connection reestablishment procedure) has been started, or in which a cell has been indicated as a PCell in a handover procedure. The PCell operates at a primary frequency. At a time point when a connection is (re)established, or after such a time point, an SCell may be configured. Each SCell operates at a secondary frequency. The connection may be referred to as an RRC connection. For the terminal apparatus supporting CA, a single PCell and one or more SCells may be aggregated.

In a case that the terminal apparatus is configured with more than one serving cell or is configured with a secondary cell group, the terminal apparatus holds, for each serving cell, a received soft channel bit corresponding to at least a predefined range in response to a decoding failure in code blocks of a transport block for at least a predefined number of transport blocks.

The LAA terminal may support a function corresponding to two or more Radio Access Technologies (RATs).

The LAA terminal supports two or more operating bands. To be more specific, the LAA terminal supports a function for CA.

Furthermore, the LAA terminal may support Time Division Duplex (TDD) and Half Duplex Frequency Division Duplex (HD-FDD). The LAA terminal may support Full Duplex FDD (FD-FDD). The LAA terminal may indicate which duplex mode/Frame structure type is supported, via higher layer signalling such as capability information.

Moreover, the LAA terminal may serve as an LTE terminal of category X (X is a prescribed value). That is, in the LAA terminal, the maximum bit number of transport blocks transmittable/receivable in one TTI may be extended. In LTE, one TTI corresponds to one subframe.

The NX terminal may serve as an LTE terminal of category Y (Y is a prescribed value).

The NX terminal transmits capability information supporting the function for LTE and capability information supporting the function for NX to the base station apparatus, in a case that an access to the NX cell is made using the LTE cell. To be more specific, the NX terminal may support two or more RATs.

Note that in each embodiment of the present invention, the TTI and the subframe may be synonymously used.

Furthermore, the LAA terminal and the NX terminal may support multiple duplex modes/Frame structure types.

Frame structure type 1 is applicable to both FD-FDD and HD-FDD. In the FDD, 10 subframes can be used for each of downlink transmission and uplink transmission at every 10-ms intervals. Moreover, the uplink transmission and the downlink transmission are separated in the frequency domain. In an HD-FDD operation, the terminal apparatus cannot perform transmission and reception at the same time, but in an FD-FDD operation, there is no such a limitation.

The higher layer signalling may configure a retuning time (the time necessary for the tuning (the number of subframes or symbols)), when the frequency hopping changes and the used frequency changes.

For example, in the LAA terminal, the number of downlink transmission modes (PDSCH transmission modes) to be supported may be reduced. That is, when the number of downlink transmission modes or a downlink transmission mode supported by the LAA terminal is indicated as the capability information from the LAA terminal, the base station apparatus configures the downlink transmission mode, based on the capability information. Note that when a parameter for a downlink transmission mode that is not supported by the LAA terminal is configured, the LAA terminal may ignore the configuration. That is, the LAA terminal may not necessarily perform processing for the downlink transmission mode that is not supported. Here, the downlink transmission mode is used to indicate a transmission scheme of the PDSCH corresponding to the PDCCH/EPDCCH, based on a configured downlink transmission mode, the type of RNTI, a DCI format, or a search space. The terminal apparatus learns, for example, whether the PDSCH is transmitted through an antenna port 0, transmitted through the transmit diversity scheme, or transmitted through multiple antenna ports, based on such pieces of information. The terminal apparatus can properly perform a reception process, based on the pieces of information. Even when the DCI related to the PDSCH resource allocation is detected from the same type of DCI format, in a case that the downlink transmission mode or the type of RNTI is different, the PDSCH is not always transmitted through the same transmission scheme.

In a case that the terminal apparatus supports a function relating to simultaneous transmission of a PUCCH and a PUSCH, and the terminal apparatus supports a function relating to repeated transmission of a PUSCH and/or repeated transmission of a PUCCH, the PUSCH and the PUCCH may be transmitted repeatedly a predefined number of times, at a timing when the PUSCH transmission is performed or at a timing when the PUCCH transmission is performed. That is, the PUCCH and the PUSCH may be transmitted at the same time (i.e., in the same subframe).

In such a case, the PUCCH may include a CSI report, an HARQ-ACK, and an SR.

All signals are transmittable and/or receivable in the PCell, but some signals may not be transmittable and/or receivable in the SCell. For example, a PUCCH is transmitted only in the PCell. Additionally, unless multiple Timing Advance Groups (TAGs) are configured for the cells, a PRACH is transmitted only in the PCell. Additionally, a PBCH is transmitted only in the PCell. Additionally, a MIB is transmitted only in the PCell. However, in a case that the terminal apparatus supports a function of transmitting a PUCCH and an MIB in the SCell, the base station apparatus may indicate the terminal apparatus to transmit a PUCCH and an MIB in the SCell (frequency corresponding to the SCell). That is, in the case that the terminal apparatus supports the function, the base station apparatus may configure, for the terminal apparatus, a parameter for transmitting a PUCCH and an MIB in the SCell.

In the PCell, a Radio Link Failure (RLF) is detected. In the SCell, even with conditions for detection of an RLF are met, the detection of the RLF is not recognized. In a lower layer of the PCell, when conditions for an RLF are met, the lower layer of the PCell notifies a higher layer of the PCell of the fact that the conditions for an RLF are met. Semi-Persistent Scheduling (SPS) or Discontinuous Transmission (DRX) may be performed in the PCell. In the SCell, the same DRX as the DRX in the PCell may be performed. In the SCell, MAC configuration information/parameters are basically shared with the PCell of the same cell group. Some of the parameters (e.g., sTAG-Id) may be configured for each SCell. Some of timers or counters may be applied to the PCell only. A timer or a counter applied to the SCell only may be configured.

Figure 5:
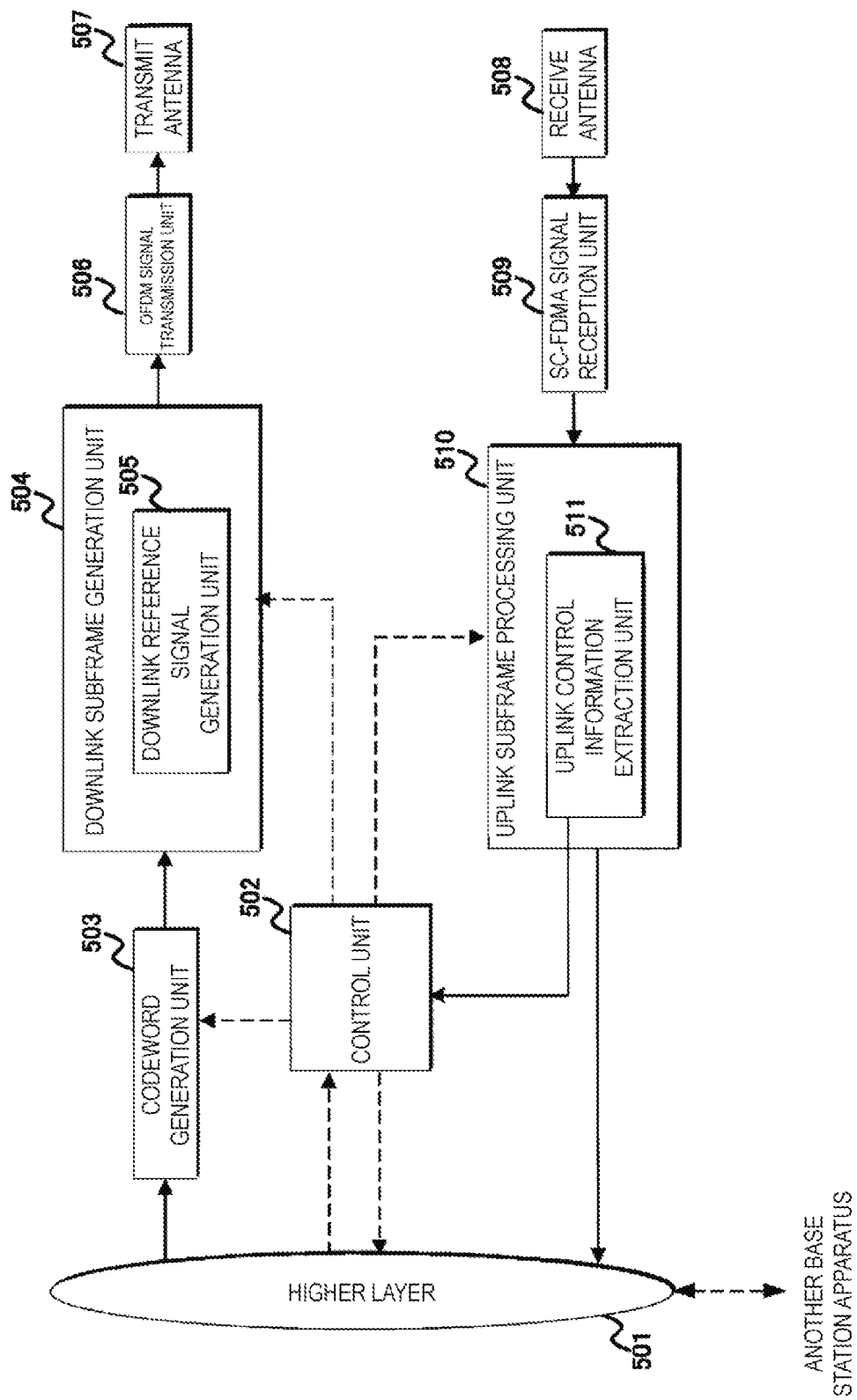
FIG. 5 is a diagram illustrating an example of a block configuration of a base station apparatus according to the first embodiment.

FIG. 5 is a schematic diagram illustrating an example of a block configuration of a base station device 2 according to the present embodiment. The base station apparatus 2 includes a higher layer (higher-layer control information notification unit) 501, a control unit (base station control unit) 502, a codeword generation unit 503, a downlink subframe generation unit 504, an OFDM signal transmission unit (downlink transmission unit) 506, a transmit antenna (base station transmit antenna) 507, a receive antenna (base station receive antenna) 508, an SC-FDMA signal reception unit (channel state measurement unit and/or CSI reception unit) 509, and an uplink subframe processing unit 510. The downlink subframe generation unit 504 includes a downlink reference signal generation unit 505. Moreover, the uplink subframe processing unit 510 includes an uplink control information extraction unit (CSI acquisition unit/HARQ-ACK acquisition unit/SR acquisition unit) 511. The SC-FDMA signal reception unit 509 also serves as a measurement unit measuring a received signal, CCA, and an interference noise power. The SC-FDMA signal reception unit may serve as the OFDM signal reception unit or include the OFDM signal reception unit in a case that the terminal apparatus supports the transmission of the OFDM signal. The downlink subframe generation unit may serve as a downlink TTI generation unit or include a downlink TTI generation unit. The downlink TTI generation unit may serve as a generation unit for generating the physical channel and/or physical signal constituting the downlink TTI. The same configuration may be applied to the uplink.

Figure 6:
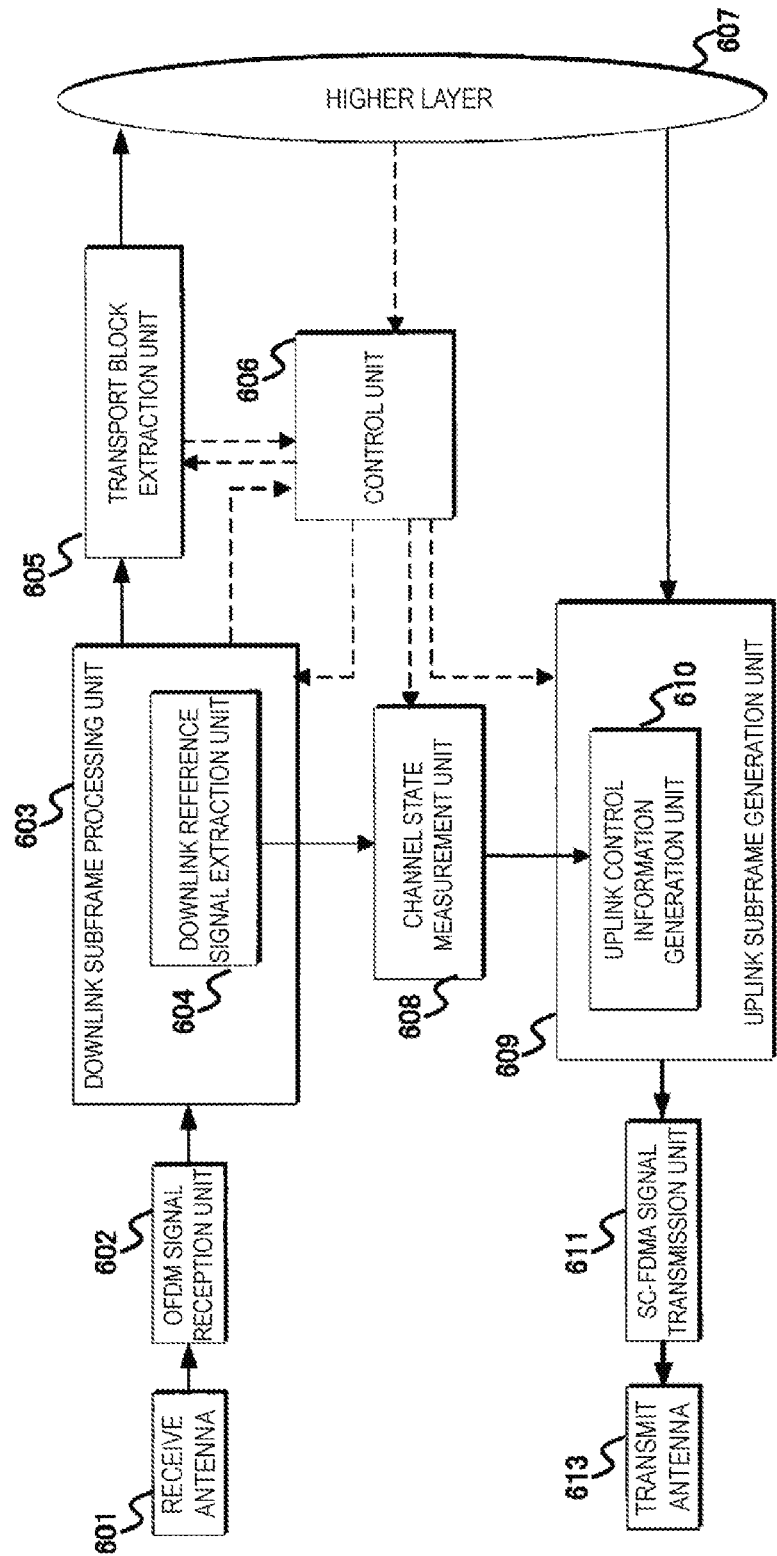
FIG. 6 is a diagram illustrating an example of a block configuration of a terminal apparatus according to the first embodiment.

FIG. 6 is a schematic diagram illustrating an example of a block constitution of a terminal device 1 according to the present embodiment. The terminal apparatus 1 includes a receive antenna (terminal receive antenna) 601, an OFDM signal reception unit (downlink reception unit) 602, a downlink subframe processing unit 603, a transport block extraction unit (data extraction unit) 605, a control unit (terminal control unit) 606, a higher layer (higher-layer control information acquisition unit) 607, a channel state measurement unit (CSI generation unit) 608, an uplink subframe generation unit 609, SC-FDMA signal transmission units (UCI transmission units) 611 and 612, and transmit antennas (terminal transmit antennas) 613 and 614. The downlink subframe processing unit 603 includes a downlink reference signal extraction unit 604. Moreover, the uplink subframe generation unit 609 includes an uplink control information generation unit (UCI generation unit) 610. The OFDM signal reception unit 602 also serves as a measurement unit measuring a received signal, CCA, and an interference noise power. To be more specific, the OFDM signal reception unit 602 may perform the RRM measurement. The SC-FDMA signal transmission unit may serve as the OFDM signal transmission unit or include the OFDM signal transmission unit in a case that the terminal apparatus supports the transmission of the OFDM signal. The uplink subframe generation unit may serve as an uplink TTI generation unit or include a downlink TTI generation unit. The terminal apparatus may include a power control unit for controlling/setting the transmit power for the uplink signal.

In each of FIG. 5 and FIG. 6, higher layers may include a Medium Access Control (MAC) layer, a Radio Link Control (RLC) layer, a Packet Data Convergence Protocol (PDCP) layer, and a Radio Resource Control (RRC) layer.

The RLC layer transmits to the higher layers: Transparent Mode (TM) data, Unacknowledged Mode (UM) data, and Acknowledged Mode (AM) data including an indication indicates that Packet Data Unit (PDU) transmission by the higher layer has succeeded. Further, the RLC layer transmits data, and notifies a transmission opportunity with a whole size of the RLC PDU transmitted in a transmission opportunity to the lower layers.

The RLC layer supports: a function associated with transmission of the higher layer PDU, a function associated with an error correction with the Automatic Repeat reQuest (ARQ) (only for the AM data transmission), a function associated with combination/division/reconstruction of a RLC Service Data Unit (SDU) (only for the UM and AM data transmission), a function associated with redivision of the RLC data PDU (for the AM data transmission), a function associated with sorting of the RLC data PDU (only for the AM data transmission), a function associated with overlap detection (only for the UM and AM data transmission), a function associated with abandonment of the RLC SDU (only for the UM and AM data transmission), a function associated with RLC re-establishment, and a function associated with protocol error detection (only for the AM data transmission).

First, a flow of downlink data transmission and/or reception will be described by using FIG. 5 and FIG. 6. In the base station apparatus 2, the control unit 502 holds a Modulation and Coding Scheme (MCS) indicating a modulation scheme, a coding rate, and the like in the downlink, downlink resource allocation indicating RBs to be used for data transmission, and information to be used for HARQ control (a Redundancy Version, an HARQ process number, and a New Data Indicator (NDI)) and controls the codeword generation unit 503 and downlink subframe generation unit 504 based on these elements. Downlink data (also referred to as a downlink transport block, DL-SCH data, or DL-SCH transport block) transmitted from the higher layer 501 is processed through error correction coding, rate matching, and the like in the codeword generation unit 503, under the control of the control unit 502, and a codeword is then generated. Two codewords at maximum are transmitted at the same time in a single subframe of a single cell. In the downlink subframe generation unit 504, a downlink subframe is generated in accordance with an instruction from the control unit 502. First, a codeword generated in the codeword generation unit 503 is converted into a modulation symbol sequence through a modulation process, such as Phase Shift Keying (PSK) modulation or Quadrature Amplitude Modulation (QAM). Moreover, a modulation symbol sequence is mapped onto REs of some RBs, and a downlink subframe for each antenna port is generated through a precoding process. In this operation, a transmission data sequence transmitted from the higher layer 501 includes higher-layer control information, which is control information on the higher layer (e.g., dedicated (individual) Radio Resource Control (RRC) signalling). Moreover, in the downlink reference signal generation unit 505, a downlink Reference Signal is generated. The downlink subframe generation unit 504 maps the downlink Reference Signal to the REs in the downlink subframes in accordance with an instruction from the control unit 502. The downlink subframe generated in the downlink subframe generation unit 504 is modulated to an OFDM signal in the OFDM signal transmission unit 506 and then transmitted via the transmit antenna 507. Although a configuration of including one OFDM signal transmission unit 506 and one transmit antenna 507 is provided as an example here, a configuration of including multiple OFDM signal transmission units 506 and transmit antennas 507 may be employed in a case that downlink subframes are transmitted on multiple antenna ports. Moreover, the downlink subframe generation unit 504 may also have the capability of generating physical-layer downlink control channels, such as a PDCCH and an EPDCCH, or a control channel/shared channel corresponding to the PDCCH and the EPDCCH, to map the channels to the REs in downlink subframes. Multiple base station apparatuses respectively transmit separate downlink subframes.

In the terminal apparatus 1, an OFDM signal is received by the OFDM signal reception unit 602 via the receive antenna 601, and an OFDM demodulation process is performed on the signal.

The downlink subframe processing unit 603 first detects physical-layer downlink control channels, such as PDCCH and an EPDCCH, or a control channel corresponding to the PDCCH and the EPDCCH. More specifically, the downlink subframe processing unit 603 decodes signals by assuming that a PDCCH and an EPDCCH, or a control channel corresponding to the PDCCH and the EPDCCH have been transmitted in the regions to which the PDCCH and the EPDCCH, or the control channel/shared channel corresponding to the PDCCH and the EPDCCH are to be allocated, and checks Cyclic Redundancy Check (CRC) bits added beforehand (blind decoding). In other words, the downlink subframe processing unit 603 monitors a PDCCH and an EPDCCH, or a control channel/shared channel corresponding to the PDCCH and the EPDCCH. In a case that the CRC bits match an ID (a single terminal-specific identifier (UEID) assigned to a single terminal, such as a Cell-Radio Network Temporary Identifier (C-RNTI) or a Semi Persistent Scheduling-C-RNTI (SPS-C-RNTI), or a Temporary C-RNTI assigned by the base station apparatus beforehand, the downlink subframe processing unit 603 recognizes that a PDCCH and an EPDCCH, or a control channel/shared channel corresponding to the PDCCH and the EPDCCH has been detected and extracts a PDSCH or a data channel/shared channel corresponding to the PDSCH by using control information included in the detected PDCCH and EPDCCH, or control channel corresponding to the PDCCH and EPDCCH.

The control unit 606 holds an MCS indicating a modulation scheme, a coding rate, and the like in the downlink based on the control information, downlink resource allocation indicating RBs to be used for downlink data transmission, and information to be used for HARQ control, and controls the downlink subframe processing unit 603, the transport block extraction unit 605, and the like based on these elements. More specifically, the control unit 606 controls the downlink subframe generation unit 504 to carry out an RE demapping process, a demodulation process, and the like, corresponding to an RE mapping process and a modulation process. The PDSCH extracted from the received downlink subframe is transmitted to the transport block extraction unit 605. The downlink reference signal extraction unit 604 in the downlink subframe processing unit 603 extracts the DLRS from the downlink subframe.

In the transport block extraction unit 605, a rate matching process, a rate matching process corresponding to error correction coding, error correction decoding, and the like in the codeword generation unit 503 are carried out, and a transport block is extracted and transmitted to the higher layer 607. The transport block includes the higher-layer control information, and the higher layer 607 notifies the control unit 606 of a necessary physical-layer parameter based on the higher-layer control information. The multiple base station apparatuses 2 respectively transmit separate downlink subframes, and the terminal apparatus 1 receives the downlink subframes. Hence, the above-described processes may be carried out for the downlink subframe of each of the multiple base station apparatuses 2. In this situation, the terminal apparatus 1 may recognize or may not necessarily recognize that multiple downlink subframes have been transmitted from the multiple base station apparatuses 2. In a case that the terminal apparatus 1 does not recognize the subframes, the terminal apparatus 1 may simply recognize that multiple downlinks subframes have been transmitted in multiple cells. Moreover, the transport block extraction unit 605 determines whether the transport block has been detected correctly and transmits the determination result to the control unit 606.

Here, the transport block extraction unit 605 may include a buffer portion (soft buffer portion). In the buffer portion, information on the extracted transport block can be stored temporarily. For example, when the same transport block (retransmitted transport block) is received, and decoding of data for this transport block is not successful, the transport block extraction unit 605 combines (composes) newly received data with the data for this transport block temporarily stored in the buffer portion, and attempts to decode the combined data. When the temporarily-stored data becomes unnecessary or when a predefined condition is satisfied, the buffer portion flushes the data. A condition for data to be flushed differs depending on the type of transport block corresponding to the data. The buffer portion may be prepared for each data type. For example, as the buffer portion, a message-3 buffer or an HARQ buffer may be prepared, or a buffer portion may be prepared for each layer, L1/L2/L3. Note that flushing information/data includes flushing a buffer in which information and data are stored.

Next, a flow of uplink signal transmission and/or reception will be described. In the terminal apparatus 1, a downlink Reference Signal extracted by the downlink reference signal extraction unit 604 is transmitted to the channel state measurement unit 608 under the instruction from the control unit 606, the channel state and/or interference is measured in the channel state measurement unit 608, and further CSI is calculated based on the measured channel state and/or interference. The control unit 606 instructs the uplink control information generation unit 610 to generate an HARQ-ACK (DTX (not transmitted yet), ACK (detection succeeded), or NACK (detection failed)) and map the resultant to a downlink subframe based on the determination result of whether the transport block is correctly detected. The terminal apparatus 1 performs these processes on the downlink subframe of each of multiple cells. In the uplink control information generation unit 610, a PUCCH including the calculated CSI and/or HARQ-ACK, or a control channel/shared channel corresponding to the PUCCH is generated.

In the uplink subframe generation unit 609, the PUSCH including the uplink data transmitted from the higher layer 607 or a data channel/shared channel corresponding to the PUSCH, and the PUCCH or control channel generated by the uplink control information generation unit 610 are mapped to the RBs in an uplink subframe to generate an uplink subframe.

The SC-FDMA signal reception unit 509 receives an SC-FDMA signal through the receive antenna 508, and performs an SC-FDMA demodulation process on the signal. In the uplink subframe processing unit 510, the control unit 502 instructs extraction of RBs, to which the PUCCH is mapped, and instructs the uplink control information extraction unit 511 to extract the CSI included in the PUCCH. The extracted CSI is transmitted to the control unit 502. The CSI is used for controlling downlink transmission parameters (MCS, downlink resource allocation, HARQ, and the like) by the control unit 502. The SC-FDMA signal reception unit may serve as the OFDM signal reception unit. The SC-FDMA signal reception unit may include the OFDM signal reception unit.

The base station apparatus assumes a maximum output power $P_{CMAX}$ configured by the terminal apparatus from a power headroom report, and assumes an upper limit value of the power for each physical uplink channel, based on the physical uplink channel received from the terminal apparatus. The base station apparatus determines a transmit power control command value for a physical uplink channel, based on the above assumptions, and transmits the value to the terminal apparatus on a PDCCH along with a downlink control information format. The above operations achieve a power adjustment for the transmit power of the physical uplink channel/signal (or uplink physical channel/physical signal) transmitted from the terminal apparatus.

The base station apparatus allocates resources to the PDCCH/PDSCH to prevent an allocation of the resource to a PBCH (or broadcast channel corresponding to the PBCH), in a case of transmitting the PDCCH (EPDCCH)/PDSCH (or shared channel/control channel in the NX cell corresponding thereto) to the terminal apparatus.

The PDSCH may be used for transmitting the respective messages/information related to SIB/RAR/paging/unicast for the terminal apparatus.

The frequency hopping for the PUSCH may be separately configured according to a grant type. For example, parameter values used for the frequency hopping in the PUSCH corresponding to each of a dynamic schedule grant, a semi-persistent grant, and an RAR grant may be separately configured. These parameters may not be indicated in the uplink grant. Further, these parameters may be configured through higher layer signalling including the system information.

The above-described various parameters may be configured for each physical channel. Further, the above-described various parameters may be configured for each terminal apparatus. Further, the above-described parameters may be configured commonly for the terminal apparatuses. Here, the above-described various parameters may be configured by using the system information. Further, the above-described various parameters may be configured by using higher layer signalling (RRC signalling, MAC CE). Further, the above-described various parameters may be configured by using the PDCCH/EPDCCH. The above-described various parameters may be configured as broadcast information. Further, the above-described various parameters may be configured as unicast information.

Note that, in the above-described embodiments, the power value demanded in each PUSCH transmission has been described that they are calculated based on: parameters configured by higher layers; an adjustment value determined by the number of PRBs allocated to the PUSCH transmission by a resource assignment; a downlink path loss and a coefficient by which the path loss is multiplied; an adjustment value determined by a parameter indicating an offset of the MCS applied to UCI; a correction value obtained by a TPC command, and the like. Moreover, descriptions have been given that the power value demanded by each PUCCH transmission is calculated based on: a parameter configured by a higher layer; a downlink path loss; an adjustment value determined by the UCI transmitted by the PUCCH; an adjustment value determined by the PUCCH format; an adjustment value determined by the antenna port number used for the PUCCH transmission; the value based on the TPC command, and the like. However, the calculation of the power value is not limited to the above descriptions. An upper limit value may be set for the demanded power value, and the smallest value of the value based on the above-described parameters and the upper limit value (e.g., $P_{CMAX, c}$, which is the maximum output power value of a serving cell c) may be used as the demanded power value.

A program running on each of the base station apparatus and the terminal apparatus according to one aspect of the present invention may be a program for controlling a Central Processing Unit (CPU) and the like (a program for causing a computer to operate) to enable the functions in the above-described embodiments of the present invention. The information exchanged between these devices is temporarily stored in a Random Access Memory (RAM) while being processed. Subsequently, the information is stored in various types of Read Only Memory (ROM) such as a Flash ROM and a Hard Disk Drive (HDD), and is read by the CPU to be modified or rewritten, as occupy.

Moreover, the terminal apparatus and/or the base station apparatus in the above-described embodiments may be partially achieved by a computer. In such a case, a program for enabling such control functions may be recorded on a computer-readable recording medium to cause a computer system to read the program recorded on the recording medium for execution.

Note that "computer system" serves as a computer system built into a terminal apparatus or a base station apparatus, and such a computer system may include an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, "computer-readable recording medium" may include a medium that dynamically retains a program for a short period of time, such as a communication line that is used to transmit the program over a network such as the Internet or over a communication line such as a telephone line, and may include a medium that retains a program for a given period of time, such as a volatile memory within the computer system that functions as a server or a client in such a case. Furthermore, the above-described program may be configured to enable some of the functions described above, and additionally may be configured to enable the functions described above, in combination with a program already recorded in the computer system.

Furthermore, the base station apparatus in the above-described embodiments can be achieved as an aggregation (a device group) including multiple devices. Devices constituting such a device group may be each equipped with some or all portions of each function or each functional block of the base station apparatus in the above-described embodiments. As the device group, at least general functions or general functional blocks of the base station apparatus may be provided. Furthermore, the terminal apparatus in the above-described embodiments can also communicate with the base station apparatus as an aggregate.

Furthermore, the base station apparatus in the above-described embodiments may be an Evolved Universal Terrestrial Radio Access Network (EUTRAN). Furthermore, the base station apparatus 2 in the above-described embodiments may have some or all portions of the function of a higher node than an eNodeB.

Furthermore, some or all portions of each of the terminal apparatus and the base station apparatus in the above-described embodiments may be achieved as an LSI, which is a typical integrated circuit, or may be achieved as a chip set. The functional blocks of the terminal apparatus and the base station apparatus may be individually achieved as a chip, or some or all of the functional blocks may be integrated into a chip. The circuit integration technique is not limited to LSI, and may be achieved as a special circuit or a multi-purpose processor. Furthermore, in a case where with advances in semiconductor technology, a circuit integration technology with which an LSI is replaced appears, it is also possible to use an integrated circuit based on the technology.

Furthermore, in the above-described embodiments, a cellular mobile station device (cellular phone, portable terminal) has been described as one example of a terminal apparatus or a communication apparatus. However, the present invention is not limited to this, and is applicable to a fixed-type electronic apparatus installed indoors or outdoors, or a stationary-type electronic apparatus, for example, a terminal apparatus or a communication apparatus, such as an Audio-Video (AV) apparatus, a kitchen appliance (e.g., refrigerator, microwave oven), a cleaning or washing machine, an air-conditioning apparatus, office equipment, a vending machine, vehicle loading machine for car navigation or the like, and other household apparatuses.

From the foregoing, the present invention provides the following characteristics.

(1) A terminal apparatus according to an aspect of the present invention includes a higher layer processing unit configured to configure any of a first subcarrier spacing and a second subcarrier spacing, based on a first parameter, and a power control unit configured to compute a lower limit value of a maximum output power configured by the terminal apparatus for an uplink transmission to which the first subcarrier spacing or the second subcarrier spacing is applied, wherein the power control unit computes the lower limit value, based on which of the first subcarrier spacing and the second subcarrier spacing is configured.

(2) The terminal apparatus according to an aspect of the present invention is in the above aspect of the terminal apparatus, wherein the first parameter is configurable in a case of indicating that the terminal apparatus supports at least the second subcarrier spacing, the lower limit value is configured based on a second parameter, and the second parameter indicates a maximum power reduction value corresponding to the subcarrier spacing.

(3) The terminal apparatus according to an aspect of the present invention is in any of the above aspects of the terminal apparatus, wherein the second parameter corresponds to an operating band.

(4) The terminal apparatus according to an aspect of the present invention is in any of the above aspects of the terminal apparatus, wherein the second parameter is 0 in a case that the first parameter indicates the first subcarrier spacing.

(5) A method according to an aspect of the present invention includes the steps of configuring any of a first subcarrier spacing and a second subcarrier spacing, based on a first parameter, computing a lower limit value of a maximum output power configured by a terminal apparatus for an uplink transmission to which the first subcarrier spacing or the second subcarrier spacing is applied, and computing the lower limit value, based on which of the first subcarrier spacing and the second subcarrier spacing is configured.

(6) A terminal apparatus according to an aspect of the present invention includes a reception unit configured to receive an uplink grant for a certain cell, and a transmission unit configured to perform an uplink transmission, based on the reception of the uplink grant, wherein in a first case that (a) a duration from when receiving the uplink grant until when performing the uplink transmission is different between a first cell and a second cell, (b) the duration corresponding to the first cell is a first duration and the duration corresponding to the second cell is a second duration, and (c) an uplink transmission in the first duration collides with an uplink transmission in the second duration, the transmission unit sets a transmit power for the first cell and a transmit power for the second cell, based on values of the first duration and/or the second duration.

(7) The terminal apparatus according to an aspect of the present invention is in the above aspect of the terminal apparatus, wherein in a case that the second duration is shorter as compared with the first duration, the transmission unit allocates the transmit power for the second cell on a priority basis.

(8) A terminal apparatus according to an aspect of the present invention includes a reception unit configured to receive an uplink grant for a certain cell, and a transmission unit configured to perform an uplink transmission, based on the reception of the uplink grant, wherein in a first case that (a) a duration from when receiving the uplink grant until when performing the uplink transmission is different between a first cell and a second cell, (b) the duration corresponding to the first cell is a first duration and the duration corresponding to the second cell is a second duration, (c) an uplink transmission in the first duration collides with an uplink transmission in the second duration, and (d) the second duration is shorter as compared with the first duration, the transmission unit shifts a timing of the uplink transmission in the first cell.

(9) The terminal apparatus according to an aspect of the present invention is in the above aspect of the terminal apparatus, wherein the first duration is based on a first parameter for the first cell and the second duration is based a second parameter on for the second cell, and in the first case, a transmit power for the first cell and a transmit power for the second cell are set based on the first parameter and/or the second parameter.

(10) A method according to an aspect of the present invention includes the steps of receiving an uplink grant for a certain cell, performing an uplink transmission, based on the reception of the uplink grant, and in a first case that (a) a duration from when receiving the uplink grant until when performing the uplink transmission is different between a first cell and a second cell, (b) the duration corresponding to the first cell is a first duration and the duration corresponding to the second cell is a second duration, and (c) an uplink transmission in the first duration collides with an uplink transmission in the second duration, setting a transmit power for the first cell and a transmit power for the second cell, based on values of the first duration and/or the second duration.

(11) A method according to an aspect of the present invention includes the steps of receiving an uplink grant for a certain cell, performing an uplink transmission, based on the reception of the uplink grant, and in a first case that (a) a duration from when receiving the uplink grant until when performing the uplink transmission is different between a first cell and a second cell, (b) the duration corresponding to the first cell is a first duration and the duration corresponding to the second cell is a second duration, (c) an uplink transmission in the first duration collides with an uplink transmission in the second duration, and (d) the second duration is shorter as compared with the first duration, shifting a timing of the uplink transmission in the first cell.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

REFERENCE SIGNS LIST

501 Higher layer
502 Control unit
503 Codeword generation unit
504 Downlink subframe generation unit
505 Downlink reference signal generation unit
506 OFDM signal transmission unit
507 Transmit antenna
508 Receive antenna
509 SC-FDMA signal reception unit
510 Uplink subframe processing unit
511 Uplink control information extraction unit
601 Receive antenna
602 OFDM signal reception unit
603 Downlink subframe processing unit
604 Downlink reference signal extraction unit
605 Transport block extraction unit
606 Control unit
607 Higher layer
608 Channel state measurement unit
609 Uplink subframe generation unit
610 Uplink control information generation unit
611, 612 SC-FDMA signal transmission unit
613, 614 Transmit antenna

The invention claimed is:

1. A terminal apparatus that communicates with a base station apparatus, the terminal apparatus comprising:
a receiver configured to receive a parameter from the base station apparatus;
a higher layer processor configured to set a type of transmission time interval (TTI) for a physical uplink control channel (PUCCH) based on the parameter; and
a transmitter configured to perform an uplink transmission using the PUCCH, wherein
a first PUCCH is used to transmit a first total number of Hybrid Automatic Repeat Request-Acknowledgements (HARQ-ACKs) in a first type of TTI in a first cell,
a second PUCCH is used to transmit a second total number of HARQ-ACKs in a second type of TTI in a second cell,
a length of the first type of TTI is longer than a length of the second type of TTI,
the first total number of HARQ-ACKs depends on the length of the first type of TTI,
the second total number of HARQ-ACKs depends on the length of the second type of TTI,
the first total number of HARQ-ACKs is smaller than the second total number of HARQ-ACKs in a certain duration, and
the transmitter is configured to drop a transmission of the first PUCCH with the first type of TTI in a case that the transmission of the first PUCCH with the first type of TTI collides with a transmission of the second PUCCH with the second type of TTI in a subframe.

2. The terminal apparatus according to claim 1, wherein the first type of TTI is associated with a first subcarrier spacing and a first OFDM symbol, and the second type of TTI is associated with a second subcarrier spacing and a second OFDM symbol.

3. A communication method of a terminal apparatus that communicates with a base station apparatus, the communication method comprising the steps of:
receiving a parameter from the base station apparatus,
setting a type of transmission time interval (TTI) for a physical uplink control channel (PUCCH) based on the parameter;
performing an uplink transmission using the PUCCH;
transmitting a first total number of Hybrid Automatic Repeat Request-Acknowledgements (HARQ-ACKs) in a first type of TTI using a first PUCCH in a first cell; and
transmitting a second total number of HARQ-ACKs in a second type of TTI using a second PUCCH in a second cell; wherein
a length of the first type of TTI is longer than a length of the second type of TTI,
the first total number of HARQ-ACKs depends on the length of the first type of TTI,
the second total number of HARQ-ACKs depends on the length of the second type of TTI,
the first total number of HARQ-ACKs is smaller than the second total number of HARQ-ACKs in a certain duration, and
a transmission of the first PUCCH with the first type of TTI is dropped in a case that the transmission of the first PUCCH with the first type of TTI collides with a transmission of the second PUCCH with the second type of TTI in a subframe.

* * * * *